(12) United States Patent
Tilton

(10) Patent No.: US 6,895,115 B2
(45) Date of Patent: May 17, 2005

(54) METHOD FOR IMPLEMENTATION OF RECURSIVE HIERARCHICAL SEGMENTATION ON PARALLEL COMPUTERS

(75) Inventor: James C. Tilton, Lanham, MD (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 716 days.

(21) Appl. No.: 09/839,147

(22) Filed: Apr. 23, 2001

(65) Prior Publication Data

US 2003/0081833 A1 May 1, 2003

(51) Int. Cl.[7] .................................................. G06K 9/34
(52) U.S. Cl. ..................................................... 382/180
(58) Field of Search ................................ 382/173, 180, 382/304, 302, 303

(56) References Cited

U.S. PATENT DOCUMENTS 4,791,486 A * 12/1988 Spriggs et al. ......... 375/240.08
5,995,668 A * 11/1999 Corset et al. ................ 382/233

OTHER PUBLICATIONS

Schachter et al, Some experiments in image segmentation by clustering of local feature values, Pattern Recognition, 1979, vol. 11, No. 1, pp. 19–28.*

Tilton et al, Segmentation of remotely sensed data using parallel region growing, Proceedings of the Ninth International Symposium on Machine Processing of Remotely Sensed Data, Jun. 1983, pp. 130–137.*

Beaulieu et al, Hierarchy in Picture Segmentation: A Stepwise Optimization Approach, IEEE Transactions on Pattern Analysis and Machine Intelligence, Feb. 1989, vol. 11, No. 2, pp. 150–163.*

J.A. Hird, Multiresolution object detection and segmentation using top–down algorithms, Third International Conference on Image Processing and its Applications, Jul. 18–20, 1989, pp. 416–420.*

J.C. Tilton, A recursive PVM implementation of an image segmentation algorithm with performance results comparing the HIVE and the Cray T3E, The Seventh Symposium on the Frontiers of Massively Parallel Computation, Feb. 21–25, 1999, pp. 146–153.*

* cited by examiner

Primary Examiner—Bhavesh M. Mehta
Assistant Examiner—Christopher Sukhaphadhana
(74) Attorney, Agent, or Firm—Keith L. Dixon

(57) ABSTRACT

A method, computer readable storage, and apparatus for implementing a recursive hierarchical segmentation algorithm on a parallel computing platform. The method includes setting a bottom level of recursion that defines where a recursive division of an image into sections stops dividing, and setting an intermediate level of recursion where the recursive division changes from a parallel implementation into a serial implementation. The segmentation algorithm is implemented according to the set levels. The method can also include setting a convergence check level of recursion with which the first level of recursion communicates with when performing a convergence check.

24 Claims, 7 Drawing Sheets

METHOD FOR IMPLEMENTATION OF RECURSIVE HIERARCHICAL SEGMENTATION ON PARALLEL COMPUTERS

ORIGIN OF THE INVENTION

The invention described herein was made by an employee of the United States Government, and may be manufactured and used by or for the Government for governmental purposes without the payment of any royalties thereon or therefore.

BACKGROUND OF THE INVENTION

1. Field of the Invention

The present invention relates to a method, apparatus, and computer readable storage for implementing a recursive hierarchical segmentation algorithm on parallel computers. More particularly, the present invention enables a computer system to utilize parallel processes to perform the hierarchical segmentation algorithm, therein decreasing computation time and enabling the creation of hierarchical segmentations on large data sets that would be impracticable just using serial processing.

2. Description of the Related Art

Image segmentation is a partitioning of an image into sections or regions. These regions may be later associated with ground cover type or land use, but the segmentation process simply gives generic labels (i.e. region 1, region 2, etc. . . . ) to each region. The regions consist of groups of multispectral or hyperspectral image pixels that have similar data feature values. These data feature values may be the multispectral or hyperspectral data values themselves and/or they may be derivative features such as band ratios or textural features.

FIG. 1 illustrates a satellite image of the Baltimore, Md. region. FIG. 2 illustrates the image of FIG. 1 after undergoing segmentation into two region sets. As can be seen by FIG. 2, like regions have been joined. The darker colored region corresponds to bodies of water, while the lighter colored region represents the land. FIG. 3 illustrates the image of FIG. 1 after undergoing segmentation into three region sets. As can be seen by FIG. 3, the image is colored into three image sets, each image set containing a like region. The dark colored region corresponds to land, the medium colored region corresponds to water, and the light colored regions correspond to the industrial or dense urban regions.

As can be seen by the FIGS. 1–3, the hierarchical image segmentations can be useful in a multitude of applications, including earth science applications where delineation of the spatial coverage of water or land is required. It can also be used as substitute ground reference data for the validation of the analysis of lower resolution global coverage remotely sensed data.

There are numerous algorithms for achieving image segmentation, including recursive algorithms. However, most of these algorithms do not employ any form of optimization in performing segmentations. The following is the classic definition of image segmentation:

Let X be a two-dimensional array representing an image. A segmentation of X can be defined as a partition of X into disjoint subsets $X_1, X_2, \ldots, X_N$, such that 1) $\bigcup_{i=1}^{N} X_i = X$ 2) $X_i$, i=1, 2, . . . , N is connected.

3) $P(X_i)$=TRUE for i=1, 2, . . . , N and

4) $P(X_i \cup X_j)$=FALSE for i≠j, where $X_i$ and $X_j$ are adjacent.

$P(X_i)$ is a logical predicate that assigns the value TRUE or FALSE to $X_i$, depending on the image data values in $X_i$.

S. W. Zucker, "Region growing: childhood and adolescence," *Computer Graphics and Image Processing*, Vol. 5, pp. 382–399, 1976, summarized the above definition as follows: The first condition requires that every picture element (pixel) must be in a region. The second condition requires that each region must be connected, i.e. composed of contiguous image pixels. The third condition determines what kind of properties each region must satisfy, i.e. what properties the image pixels must satisfy to be considered similar enough to be in the same region. The fourth condition specifies that, in the final segmentation result, any merging of any adjacent regions would violate the third condition.

A problem with this classic definition of image segmentation is that the segmentation so defined is not unique. The number, N and shape of the partitions, $X_1, X_2, \ldots, X_N$, depend on the order in which the image pixels are processed. In addition, there is no concept of optimality contained in this definition of image segmentation. Under this classic definition, all partitions that satisfy the conditions represent equally good or valid segmentations of the image.

An ideal definition of image segmentation would be as follows:

Let X be a two-dimensional array representing an image. A segmentation of X into N regions can be defined as a partition of X into disjoint subsets $X_1, X_2, \ldots, X_N$, such that 1) $\bigcup_{i=1}^{N} X_i = X$ 2) $X_i$, i=1, 2, . . . , N is connected.

3) $\sum_{i=1}^{N} G(X_i) = \text{MINIMUM}$ over all partitions into N regions and 4) $G(X_i \cup X_j) > G(X_i) + G(X_j)$ for i≠j, where $X_i$ and $X_j$ are adjacent.

$G(X_i)$ is a function that assigns a cost to partition $X_i$, depending on the image data values in $X_i$.

These conditions can be summarized as follows: The first condition requires that every picture element (pixel) must be in one of N regions. The second condition requires that each region must be connected, i.e. composed of contiguous image pixels. The third condition states that the partition must produce a minimum cost aggregated over all N regions. The fourth condition specifies that, in the final segmentation result, any merging of adjacent regions increases the minimum cost obtained in the third condition.

As a result of these conditions, the order dependence problem is eliminated because the global minimum solution is found and this solution is the optimal solution. In practice, this ideal image segmentation is difficult, if not impossible, to find. The third condition implies that all possible image partitions consisting of N regions must be searched to find the minimum cost. Further, the question of the proper value for N is left undetermined.

B. J. Schachter, L. S. Davis and A. Rosenfeld, "Some experiments in image segmentation by clustering of local feature vectors," *Pattern Recognition*, Vol. 11, No. 1, pp. 19–28, 1979, suggest that an iterative parallel region growing process be used to eliminate the order dependence problem. R. L. Kettig and D. A. Landgrebe, "Computer classification of remotely sensed multispectral image data by extraction and classification of homogeneous objects," *LARS Information Note* 050975, Laboratory for Applications of Remote Sensing, Purdue University, West Lafayette, Ind., 1975, suggest an alternative partitioning logic in which the most similar neighboring region is merged first, but found this approach too difficult to implement in a sequential manner with the computing resources they had at that time. J. C. Tilton and S. C. Cox, "Segmentation of remotely sensed data using parallel region growing," *Digest of the 1983 International Geoscience and Remote Sensing Symposium*, San Francisco, Calif., pp. 9.1–9.6, Aug. 31–Sep. 2, 1983, propose implementing an iterative parallel approach to region growing on parallel processors in order to overcome the computational demands of this approach. In their approach, the most similar pair(s) of spatially adjacent regions is (are) merged at each iteration. This approach solved the order dependence problem (assuming a deterministic tie-breaking method is employed), but did not fully address the optimal segmentation problem. Merging the most similar pair(s) of spatially adjacent regions at each iteration does not guarantee that the segmentation result at a particular iteration is the optimal partition of the image data for the number of partitions obtained at that iteration. J.-M. Beaulieu and M. Goldberg, "Hierarchy in picture segmentation: A stepwise optimization approach," *IEEE Trans. on Pattern Analysis and Machine Intelligence*, Vol. 11, No. 2, pp. 150–163, February 1989, provide a theoretical basis for Tilton and Cox's iterative parallel region growing approach in their theoretical analysis of their similar Hierarchical Stepwise Optimization algorithm (HSWO). They show that the HSWO algorithm produces the globally optimal segmentation result if each iteration is statistically independent. Even though each iteration will generally not be statistically independent for natural images, the HSWO approach is shown to still produce excellent results. Beaulieu and Goldberg also point out that the sequence of partitions generated by this iterative approach reflect the hierarchical structure of the imagery data: the partitions obtained in the early iterations preserve the small details and objects in the image, while the partitions obtained in the latter iterations preserve only the most important components of the image. They further note that these hierarchical partitions may carry information that may help in identifying the objects in the imagery data.

The definition of image segmentation as followed by the HSWO algorithm is defined recursively as follows:

Let X be a two-dimensional array representing an image and let $X_i, X_2, \ldots, X_{N-1}, X_N$ be a partition of X into N regions such that 1) $\bigcup_{i=1}^{N} X_i = X$ and 2) $X_i$, i=1, 2, . . . , N is connected.

Let $G(X_i)$ be a function that assigns a cost to partition $X_i$, depending on the image data values in $X_i$. Reorder the partition $X_i, X_2, \ldots, X_{N-1}, X_N$ such that $G(X_{N-1} \cup X_N) \leq G(X_i \cup X_j)$ for all i≠j where $X_{N-1}$ and $X_N$ are adjacent and $X_i$ and $X_j$, are adjacent. The segmentation of X into N–1 regions is defined as the partition $X'_1, X'_2, \ldots, X'_{N-1}$ where $X'_i = X_i$ for i=1, 2, . . . , N–2 and $X'_{N-1} = X_{N-1} \cup X_N$.

The initial partition may assign each image pixel to a separate region, in which case the initial value of N is the number of pixels in the image ($N_p$). Any other initial partition may be used, such as a partitioning of the image into n×n blocks, where $n^2 << N_p$, or any pre-segmentation with another algorithm.

The region growing approach utilized by the hierarchical image segmentation algorithm, HSEG, is the same as that employed by Beaulieu and Goldberg's HSWO algorithm except that HSEG may optionally alternate spectral clustering iterations with region growing iterations to merge non-adjacent regions. Such spectral clustering adds robustness to the segmentation result and eliminates the bookkeeping overhead of separately accounting for essentially identical non-adjacent regions.

A problem with implementing segmentation algorithms based on HSWO region growing is that these algorithms are processor intensive. A large high-resolution high-bit image can take a very long time to undergo segmentation using the prior art HSWO region growing algorithms and related technology.

An additional problem common to all recursive segmentation algorithms is the requirement of large amounts of memory, making it likely that large images may require more memory than available, preventing large images from being segmented.

SUMMARY OF THE INVENTION

Accordingly, it is an object of the present invention to implement a recursive hierarchical segmentation algorithm on a parallel-computing platform, decreasing computation time.

The foregoing object of the present invention is achieved by a method of implementing a recursive hierarchical segmentation algorithm on a parallel computing platform, including (a) setting a bottom level of recursion that defines where a recursive division of an image into sections stops dividing; (b) setting an intermediate level of recursion where the recursive division changes from a parallel implementation into a serial implementation; and (c) implementing the segmentation algorithm according to the set levels.

BRIEF DESCRIPTIONS OF THE DRAWINGS

These and other advantages of the invention will become apparent and more readily appreciated from the following description of the preferred embodiments, taken in conjunction with the accompanying drawings of which:

Figure 5:
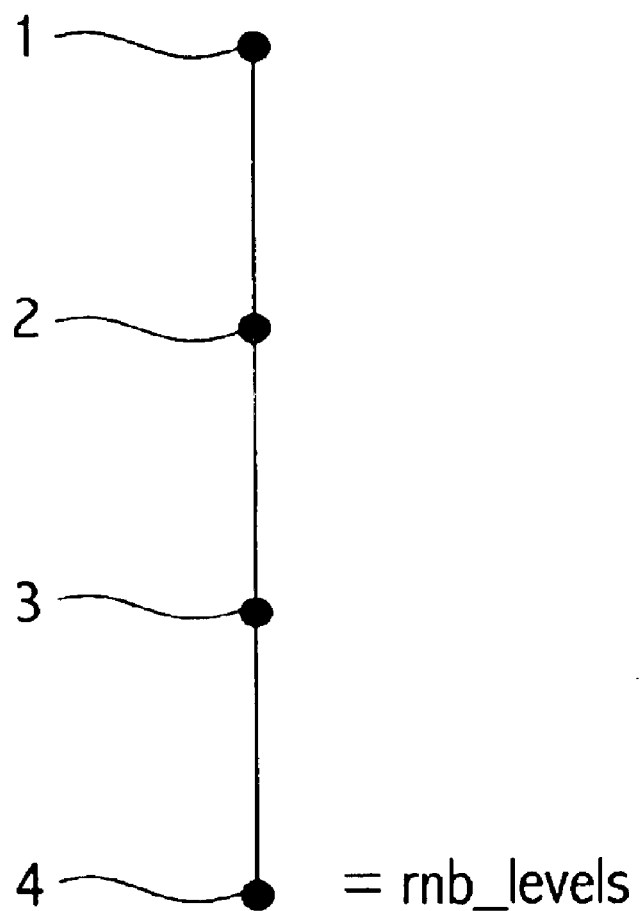
Figure 6:
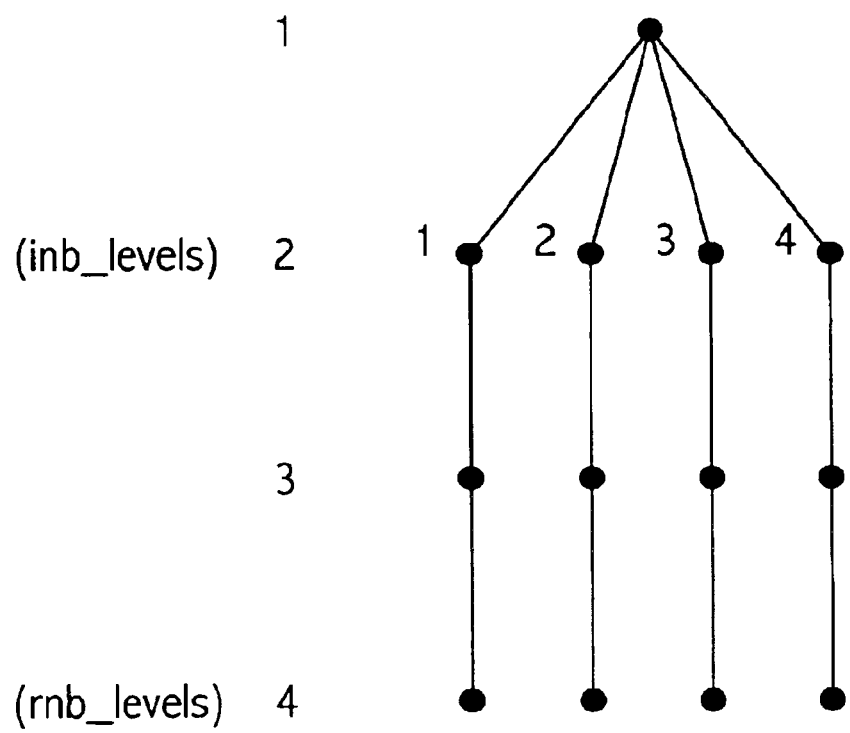
Figure 7:
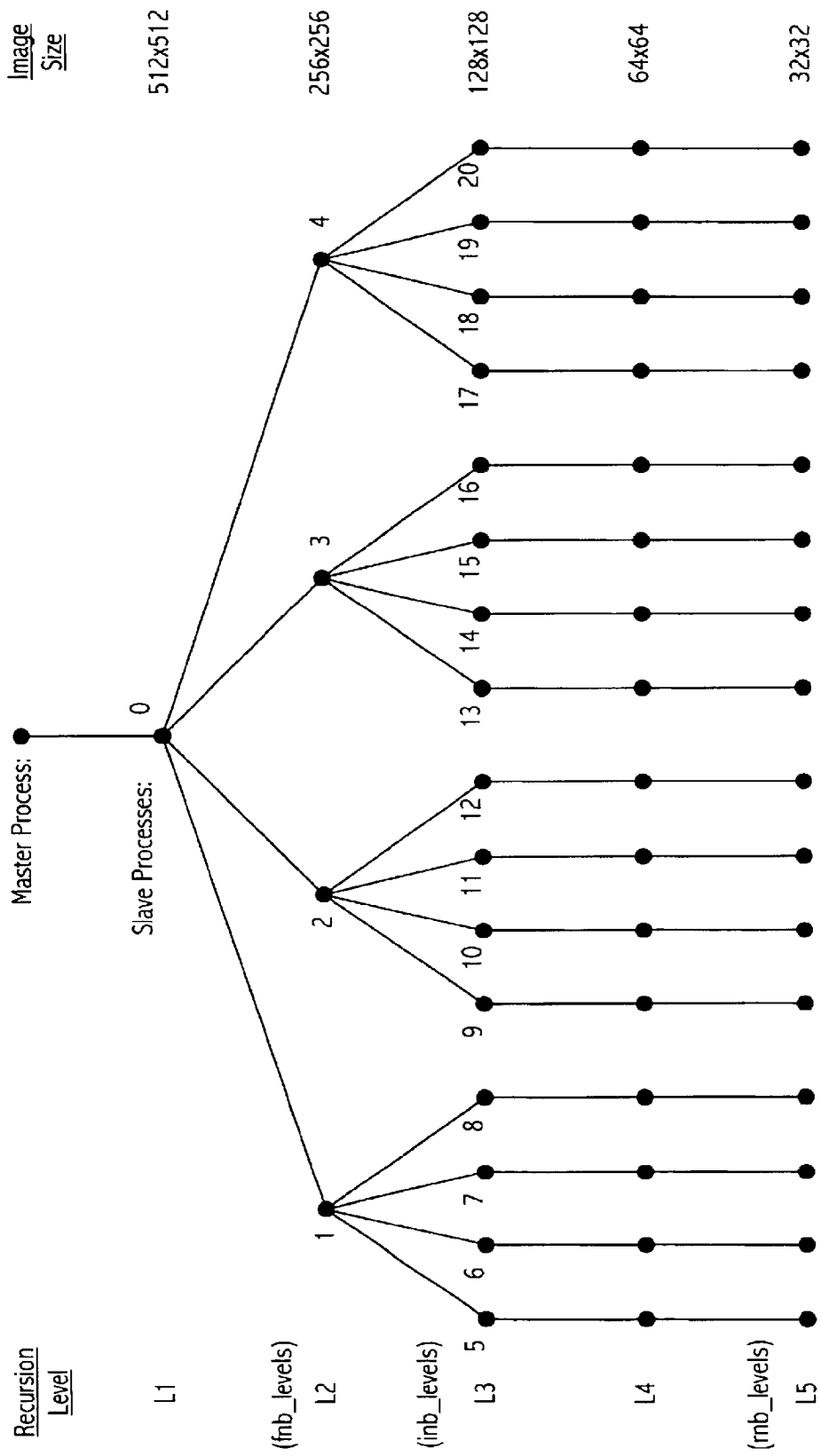

FIGS. 4A, 4B, 4C, and 4D are diagrams illustrating one example of how an image can be divided into quarters and sub-quarters recursively;

FIG. 5 is a diagram illustrating an example of serial implementation;

FIG. 6 is a diagram illustrating in more detail the significance of the inb_levels parameter;

FIG. 7 is a diagram illustrating an example of processing a 512 by 512 image with fnb_levels=2, inb_levels=3, and rnb_levels=5.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

The Basic Hierarchical Segmentation (HSEG) algorithm is as follows:

1. Give each image pixel a region label and set the global criterion value, critval, equal to zero. If a pre-segmentation is provided, label each image pixel according to the pre-segmentation. Otherwise, label each image pixel as a separate region.
2. Calculate the dissimilarity criterion value between each spatially adjacent region.
3. Find the smallest dissimilarity criterion value, and merge all pairs of spatially adjacent regions with this criterion value.
4. Calculate the dissimilarity criterion value between all pairs of non-spatially adjacent regions.
5. Merge all pairs of non-spatially adjacent regions with dissimilarity criterion value less than or equal to the criterion value found in operation 3.
6. If the number of regions remaining is less than the preset value chkregions, go to operation 7. Otherwise, go to operation 2.
7. Let prevcritval=critval. Calculate the current global criterion value and set critval equal to this value. If prevcritval=zero, go to operation 2. Otherwise calculate cvratio=critval/prevcritval. If cvratio is greater than the preset threshold convfact, save the region label map from the previous iteration as a "raw" segmentation result. Also, store the region number of pixels list, region mean vector list and region criterion value list for this previous iteration. (Note: The region criterion value is the portion of the global criterion value contributed by the image pixels covered by the region.) If the number of regions remaining is two or less, save the region label map from the current iteration as the coarsest instance of the final hierarchical segmentation result, and stop. Otherwise, go to operation 2.

Dissimilarity Criterion: The dissimilarity criterion can be any measure of distance between two vectors. The widely used vector norms, 1-norm, 2-norm and Infinity-norm (see G. W. Stewart, *Introduction to Matrix Computations*, p. 164, Academic Press: New York, N.Y., 1973), are implemented as options.

Global Criterion: The global criterion is used to identify significant changes in the segmentation results from one iteration to the next. This criterion is same as the dissimilarity criterion, except that it compares the original image data with the region mean image from the current segmentation. The value of the global criterion is calculated by computing the dissimilarity function at each image point between the original image values and the region mean image and averaging the result over the entire image.

The above algorithm can be implemented recursively using the Recursive Hierarchical Segmentation Algorithm (RHSEG) as follows:

1. Specify the number of levels of recursion required (rnb_levels), and pad the input image, if necessary, so that the width and height of the image can be evenly divided by $2^{rnb\_levels-1}$. (A good value for rnb_levels results in an image section at level=rnb_levels consisting of roughly 500 to 2000 pixels.) Set level=1.
2. Call recur_hseg(level,image).

Outline of recur_hseg(level,image):

A. If level<rnb_levels, divide the image data into quarters (in half in the width and height dimensions) and call recur_hseg(level+1,image/4) for each image quarter (represented as image/4). Otherwise, go to operation C.
B. After all four calls to recur_hseg( ) from operation A complete processing, reassemble the image segmentation results.
C. Execute the HSEG algorithm as described in the HSEG Basic Algorithm Description above (except that the reassembled segmentation results are used as the pre-segmentation when level<rnb_levels), but with the following modification: If level>1, terminate the algorithm when the number of regions reaches the preset value minregions, and do not check for critval or output any "raw" segmentation results.

Figure 1:
FIG. 1 is an example of a satellite image before segmentation.
Figure 2:
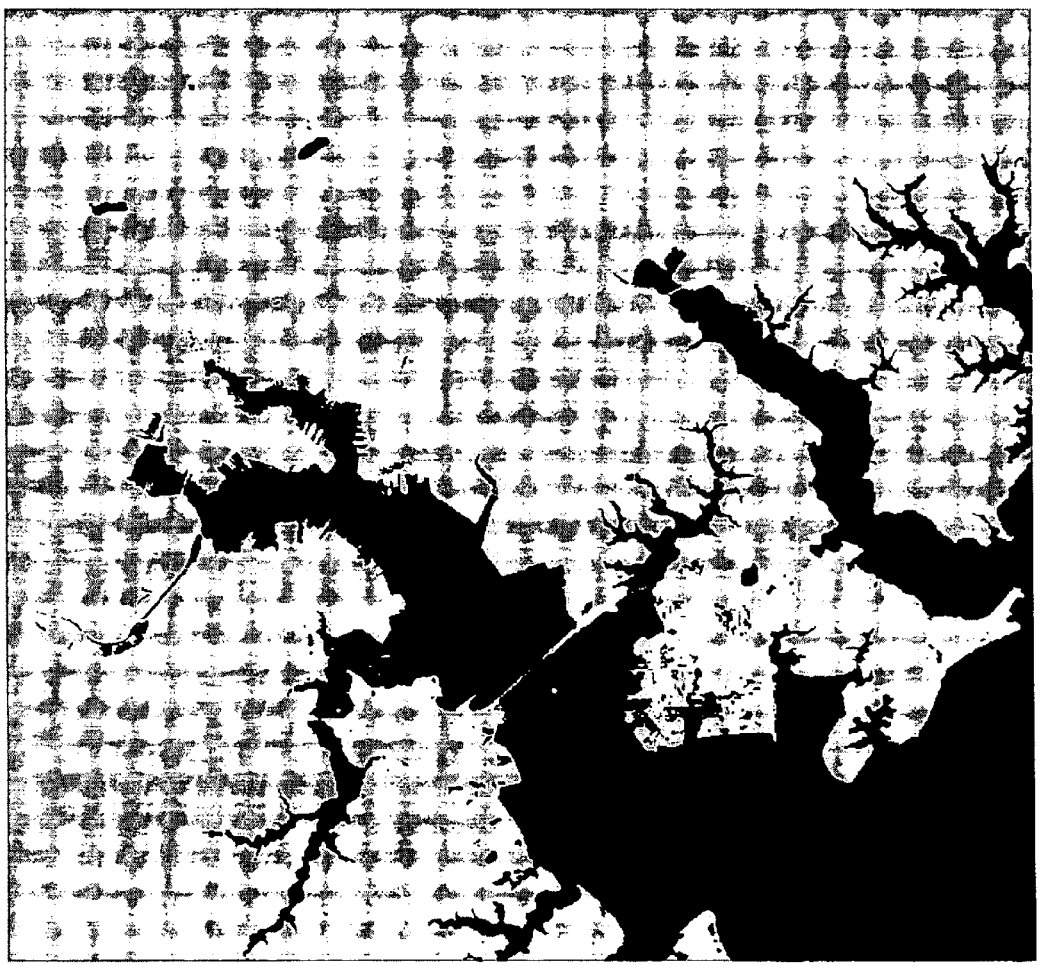
FIG. 2 is an example of the satellite image in FIG. 1 after segmentation into two region sets.
Figure 3:
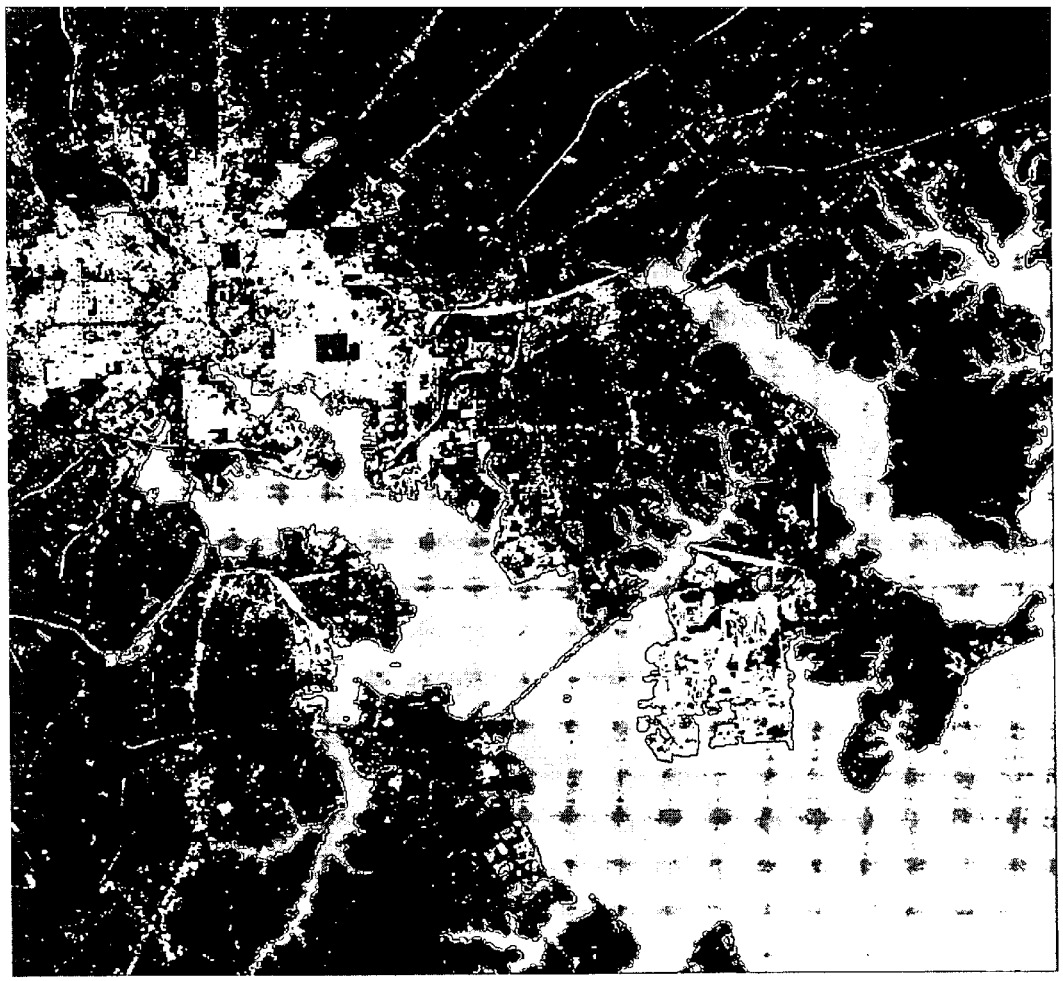
FIG. 3 is an example of the satellite image in FIG. 1 after segmentation into three region sets.
Figure 4A:
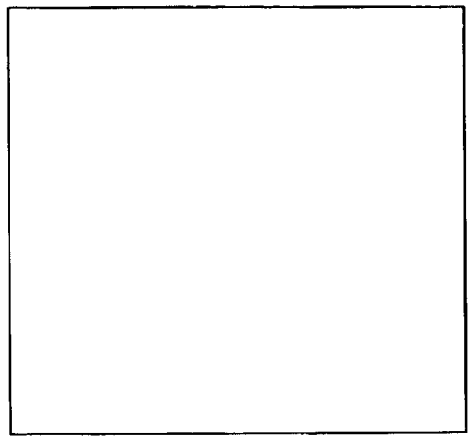
Figure 4B:
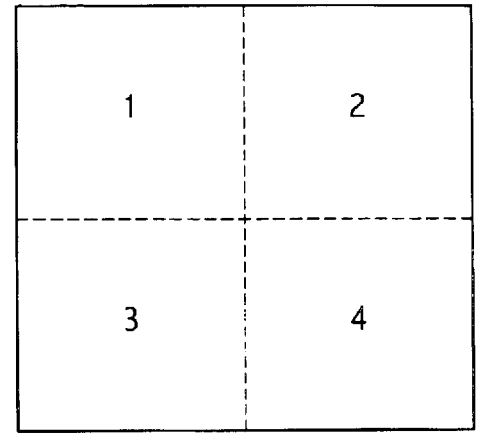
Figure 4C:
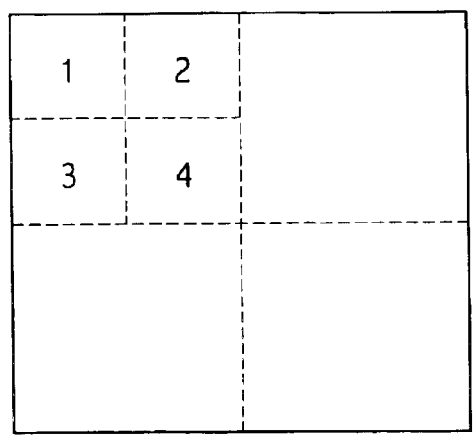
Figure 4D:
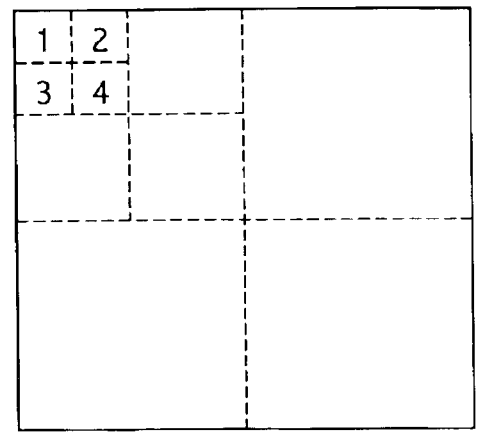

FIGS. 4A, 4B, 4C and 4D illustrate one example of how an image can be divided into quarters and sub-quarters recursively. FIG. 4A illustrates a starting image. FIG. 4B illustrates how an image is first divided into quarters labeled 1, 2, 3, and 4. FIG. 4C illustrates the subsequent level of recursion, where quarter 1 of FIG. 4B is divided up into sub-quarters labeled 5, 6, 7, and 8. FIG. 4D illustrates the subsequent level of recursion, where sub-quarter 5 of FIG. 4C is further divided up into additional sub-quarters labeled 9, 10, 11, 12. Note that while we use quarters to divide the image, the image could be divided using other shapes and other dividing methods as well.

In order to implement the segmentation algorithm recursively, the parameter rnb_levels should be specified, which indicates the number of levels of recursion to be processed. If rnb_levels is set to equal 4, then the above algorithm will divide the image as illustrated in FIG. 4A (level 1), FIG. 4B (level 2), FIG. 4C (level 3) and FIG. 4D (level 4). When the current level becomes 4, because 4 is not <rnb_levels (which is equal to 4), the recursive dividing will stop and then the lower recursion levels will subsequently return values to the higher levels, or the recursion will "come back up."

The algorithms described above can be implemented serially, using only one processor. FIG. 5 illustrates the serial implementation of the above example. Referring now to FIG. 5, item 1 represents the first level of recursion, which then goes to item 2 which represents the second level of recursion, which then goes to item 3 which represents the third level of recursion, which then goes to item 4 which represents the last level of recursion. The recursion "stops" at item 4, because rnb_levels is set to equal 4 in our example.

As stated previously, the serial implementation of the above algorithm requires a large amount of computing time and resources. The implementation of the RHSEG algorithm on a parallel-processing platform is superior to the serial method with regard to computation time and computing resources.

In the implementation of the RHSEG algorithm on a parallel computer, besides setting the above described rnb_levels (recursion levels), two other levels are specified, inb_levels (intermediate levels) and fnb_levels (final levels). It is required that fnb_levels<=inb_levels<=rnb_levels. Quarters and subsequent sub-quarters are initially processed in parallel, but when the level of recursion reaches inb_levels the sub-quarters are then processed serially instead of in parallel.

FIG. 6 illustrates in more detail the significance of the inb_levels parameter and the parallel processes. In FIG. 6, recursion levels 1, 2, 3, 4 are illustrated. The inb_levels parameter is set to 2, and the rnb_levels parameter is set to 4. As stated above, the rnb_levels parameter is where the recursion stops dividing the image, and returns to the higher levels using information calculated from the lower levels.

Recursion level 1 can be associated with FIG. 4A. Since recursion level 1 is less than 2 (inb_levels), the next level of recursion is performed in parallel. Thus, at recursion level 2 (inb_levels), four new processes are spawned which are performed in parallel. Recursion level 2 can be associated with FIG. 4B. At recursion levels 3 and 4, since these are higher than 2 (inb_levels), these levels of recursion are performed serially. Thus, at these levels, no new parallel processes are spawned. Instead, the previous process is used sequentially. Recursion level 3 can be associated with FIG. 4C, and recursion level 4 can be associated with FIG. 4D.

Thus, as illustrated in FIG. 6, there are four processes operating in parallel (five if you include the first process). Thus, the quarters labeled 1, 2, 3, and 4 in FIG. 4B are all initially processed in parallel. The sub-quarters labeled 5, 6, 7, 8 in FIG. 4C, and the sub-quarters labeled 9, 10, 11, 12 in FIG. 4D are all processed serially, using the process spawned to process section 1 of FIG. 4B. Note of course there are additional sub-quarters (and their processes), which have not been labeled in FIG. 4C and FIG. 4D, for simplicity.

As can be seen by FIG. 6, the parallel implementation of the RHSEG algorithm can save time by first spawning parallel processes until the inb_levels of recursion is reached, and then using those parallel processes to process the further levels of recursions serially until rnb_levels is reached. The inb_levels should be set after taking into consideration how many processes the current computing platform can simultaneously handle.

The third parameter to be specified in the parallel implementation of the RHSEG algorithm is fnb_levels. The fnb_levels parameter relates to the convergence checking (item #7 in the above Basic Hierarchical Segmentation (HSEG) algorithm). At the fnb_levels of recursion the passing of data to higher levels is different than before (more on this in the example given below). In addition, when the current level of recursion reaches the first level, the processes at fnb_levels calculate and send their contribution to the value of critval to level 1. The process running at level 1 computes the value of critval as the average dissimilarity value over the entire image and calculates cvratio=critval/prevcritval. If cvratio is greater than a preset threshold, then the slave tasks running at fnb_levels to send their region label map data to the master program. More on the convergence checking and fnb_levels will be presented later on.

FIG. 7 illustrates an example of processing a 512 by 512 image with fnb_levels=2, inb_levels=3, and rnb_levels=5.

As can be seen by FIG. 7, there are five (rnb_levels) recursion levels, L1, L2, L3, L3, and L5. In this example there are also 21 processes. Process 0 at recursion level L1 spawns processes 1, 2, 3, and 4 at recursion level L2. Process 1 spawns processes 5, 6, 7, and 8, while process 2 spawns processes 9, 10, 11, and 12, while process 3 spawns processes 13, 14, 15 and 16, while process 4 spawns processes 16, 18, 29 and 20. At L3 (inb_levels), each spawned process proceeds to process the lower levels of recursion serially. Therefore, when a new process is spawned to process another divided section of the image, this can be considered a parallel implementation. When a same process processes another divided section of the image, this can be considered a serial implementation.

Also illustrated in FIG. 7, the image size of recursion level L1 is 512×512, while the image size of recursion level L2 is 256×256, while the image size of recursion level L3 is 128×128, while the image size of recursion level L4 is 64×64, while the image size of recursion level L5 is 32×32.

Regarding convergence checking, since fnb_levels is equal to two, processes 1, 2, 3, and 4 will calculate the sum of the dissimilarity criterion over each region contained in the processing window, and send these values back to process 0 operating at recursion level L1. Process 0 computes critval as the average value of the values of dissimilarity function over the entire image from the dissimilarity function values obtained from processes 1, 2, 3 and 4 and calculates cvratio. If cvratio is greater than a preset threshold, the region map from the previous iteration is saved as a raw segmentation result.

The designation of fnb_levels<inb_levels reduces the amount of interprocessor communications required for the convergence criterion calculations. This is important for less expensive parallel processing systems such as the Beowulf systems constructed using relatively slow (but inexpensive) Ethernet connections to network off-the-shelf PCs together. In addition, the designation of fnb_levels>1 reduces the RAM requirements for the parallel processing system. While the optimal setting for inb_levels varies depending upon the computing platform being used, on a 201 processor HIVE system (one master process plus 200 slave nodes), the optimum value of inb_levels is 5.

We will now walk through an example of processing a large Landsat Thematic Mapper (TM) data set to illustrate how the system works. This TM data set has 7680 columns, 6912 rows and 6 spectral bands. Based on our prior experience with these parameters for the Hive Parallel System, we preset the values for the three levels of recursion as rnb_levels=9, inb_levels=5 and fnb_levels=3. When the master program on the parallel computing system calls the first slave task (the $0^{th}$ task), it sends to that task several task specific parameters. Included among these parameters are:

| | |
|---|---|
| first_sec | first data section to be processed by the slave task |
| last_sec | last data section to be processed by the slave task |
| calling_tid | current task ID |
| level | current level of recursion + 1 |
| ncols | number of columns in current section of data |
| nrows | number of rows in current section of data |

The first data section processed, first_sec, is the $0^{th}$ section. The last data section processed is determined by the value of inb_levels through the formula:

$$\text{last\_sec} = 4^{(inb\_levels-1)} - 1.$$

Since in this case, since inb_levels=5, last_sec=255 (i.e., the data is processed in 256 sections at the recursive level inb_levels). The calling_tid is the task ID of the master program (the first slave task uses this to determine where to send its results back to). The recursion level, level, is equal to 1 for the $0^{th}$ task (the master program is considered to at recursion level 0). For our TM data set, ncols=7680 and nrows=6912.

Since the slave program for the $0^{th}$ task is operating at a level of recursion less than inb_levels (its recursion level is "1" which is less than inb_levels=5), it sends a request to the master program for four branch slave task IDs. Upon receiving these four branch slave task IDs, the $0^{th}$ task slave program initiates the $1^{st}$, $2^{nd}$, $3^{rd}$ and $4^{th}$ tasks, respectively, on these four branch slave task IDs, with the task specific parameters again including first_sec, last_sec, calling_tid, level, ncols and nrows. The values of first_sec and last_sec are determined so as to process the $1^{st}$ quarter of the data sections on the $1^{st}$ task, the $2^{nd}$ quarter of the data sections on the $2^{nd}$ task, the $3^{rd}$ quarter of the data sections on the $3^{rd}$ task and the $4^{th}$ quarter of the data sections on the $4^{th}$ task. The calling_tid is the task ID of the recursion level=1 slave task (the called slave tasks use this to determine where to send their results back to). The recursion level, level, is equal to 2 for the $1^{st}$, $2^{nd}$, $3^{rd}$ and $4^{th}$ tasks. For our TM data set, ncols=3840 and nrows=3456 for the tasks at recursion level 2.

Since the slave programs operating at recursion level 2 are operating at a level of recursion less than inb_levels (=5), each of these tasks send a request to the master program for four branch slave task IDs. Upon receiving these four branch slave task IDs, each of the slave programs at recursion level 2 initiate 4 tasks, resulting in the initiation of 16 tasks (tasks 5 through 20). Each slave task at recursion level 2 calls 4 slave tasks at recursion level 3 with task specific parameters again including first_sec, last_sec, calling_tid, level, ncols and nrows. The values of first_sec and last_sec are determined so as to process the one-quarter of the data sections on each of the 4 tasks called. The calling_tid is the task ID of the recursion level=2 slave task (the called slave tasks use this to determine where to send their results back to). The recursion level parameter, level, for the branch tasks is equal to 3. For our TM data set, ncols=1920 and nrows=1728 for the tasks at recursion level 3.

Again, since the slave programs operating at recursion level 3 are operating at a level of recursion less than inb_levels (=5), each of these tasks send a request to the master program for four branch slave task IDs. Upon receiving these four branch slave task IDs, each of the slave programs at recursion level 3 initiate 4 tasks, resulting in the initiation of 64 tasks (tasks 21 through 84). Each slave task at recursion level 3 calls 4 slave tasks at recursion level 4 with task specific parameters again including first_sec, last_sec, calling_tid, level, ncols and nrows. The values of first_sec and last_sec are determined so as to process the one-quarter of the data sections on each of the 4 tasks called. The calling_tid is the task ID of the recursion level=3 slave task (the called slave tasks use this to determine where to send their results back to). The recursion level parameter, level, for the branch tasks is equal to 4. For our TM data set, ncols=960 and nrows=864 for the tasks at recursion level 4.

Yet again, since the slave programs operating at recursion level 4 are operating at a level of recursion less than inb_levels (=5), each of these tasks send a request to the master program for four branch slave task IDs. Upon receiving these four branch slave task IDs, each of the slave programs at recursion level 4 initiate 4 tasks, resulting in the initiation of 256 tasks (tasks 85 through 340). Each slave task at recursion level 4 calls 4 slave tasks at recursion level 5 with task specific parameters again including first_sec, last_sec, calling_tid, level, ncols and nrows. The values of first_sec and last_sec are determined so as to process the one-quarter of the data sections on each of the 4 tasks called. The calling_tid is the task ID of the recursion level=4 slave task (the called slave tasks use this to determine where to send their results back to). The recursion level parameter, level, for the branch tasks is equal to 5. For our TM data set, ncols=480 and nrows=432 for the tasks at recursion level 5.

For this example, the slave programs operating at recursion level 5 are operating at the intermediate recursion level, inb_levels (=5), each send a request to the master program for the input data for its section (section=first_sec=last_sec). Each of these programs then call the subroutine, lrhseg, which is a sequential implementation of the recur_hseg subroutine described above (for details on lrhseg see the section of this document entitled "IMPLEMENTING A RECURSIVE HIERARCHICAL SEGMENTATION ALGORITHM ON A COMPUTER. " At recursion level 6, lrhseg initiates the processing of the data with ncols=240 and nrows=216. At recursion level 7, lrhseg initiates the processing of the data with ncols=120 and nrows=108. At recursion level 8, lrhseg initiates the processing of the data with ncols=60 and nrows=54. Finally, at recursion level 9, lrhseg initiates the processing of the data with ncols=30 and nrows=27.

At recursion level 9, lrhseg calls the hseg subroutine, which is an implementation of the basic HSEG algorithm described above, but without convergence checking (for details on hseg see the section of this document entitled "IMPLEMENTING A RECURSIVE HIERARCHICAL SEGMENTATION ALGORITHM ON A COMPUTER. When the number of regions reaches minregions (a preset parameter), the results are returned to the lrhseg subroutine at recursion level 8. After all four calls are made and completed to lrhseg at recursion level 9, the lrhseg subroutine at recursion level 8 calls the hseg subroutine. After all four calls are made and completed to lrhseg at recursion level 8, the lrhseg subroutine at recursion level 7 calls the hseg subroutine. After all four calls are made and completed to lrhseg at recursion level 7, the lrhseg subroutine at recursion level 6 calls the hseg subroutine. After all four calls are made and completed to lrhseg at recursion level 6, the lrhseg subroutine at recursion level 5 calls the hseg subroutine.

When the slave programs operating at recursion level 5 complete their calls to the hseg subroutine, they each return their results and their input data to the slave programs that called them at recursion level 4. When the slave programs at recursion level 4 receive the results from each of their four branch tasks, each of them then call the hseg subroutine. When the slave programs operating at recursion level 4 complete their calls to the hseg subroutine, they each return their results and their input data to the slave programs that called them at recursion level 3.

When the slave programs at recursion level 3 receive the results from each of their four branch tasks, each of them then call the hseg subroutine. Now since these slave programs are operating at the final recursion level, fnb_levels=3, upon completion of the call to the hseg subroutine, they do not return their input data to the slave programs that called them at the recursion level 2, and only return their segmentation results except for the region label map.

When the slave programs at recursion level 2 receive the results from each of their four branch tasks, each of them then call the hseg subroutine. Upon completion of the call to the hseg subroutine, these slave programs make a special call to the slave programs at recursion level fnb_levels below them that updates the region label map based on the results from the hseg subroutine. Then these slave programs return their segmentations results (except for the region label map) to the slave program that called them at recursion level 1 (in this case, the slave program running task 0).

When the slave program at recursion level 1 (this is the slave program running task 0) receives the results from each of its four branch tasks it calls the hseg subroutine, with minregions reset to the value of chkregions (see the HSEG Basic Algorithm Description above). Upon completion of the call to the hseg subroutine, this slave program makes a special call to the slave programs at recursion level fnb_levels to update the region label map based on the results from the hseg program. Then this slave program calls the phseg subroutine, which is an implementation of the basic HSEG algorithm with convergence.

In lhseg the region label map data are not updated (the region label map data are updated all at once after lhseg exits). However, in phseg the region label map data, which is maintained by the slave programs running the tasks at recursion level fnb_levels, is updated after each group of region growing and spectral clustering merges (steps 2 through 5 of the basic HSEG algorithm described above). In addition, the global criterion value, critval, is calculated after each group of region growing and spectral clustering merges from information calculated by the slave programs running the tasks at recursion level fnb_levels and accumulated by the slave program running task 0 at recursion level 1. When a convergence iteration is found, phseg sends its results to the master program and causes the slave programs running the tasks at recursion level fnb_levels to send their region label map data to the master program.

If we had not used the above-described parallel implementation, it would not have been possible to process our example Landsat TM image on any presently available parallel computing platform. To simulate this situation, consider the case where rnb_levels=inb_levels=fnb_levels=9 and we try to process our 7680 columns by 6912 row Landsat TM image.

In this case, the initialization portions of the descriptions for recursion levels 1 through 4 will the same as above with the following exception: last_sec would equal 65,535 (the data would be processed in 65,536 sections at the new value for inb_levels). In addition, at recursion level 5 (the previous value of inb_levels), no request for input data would be made. Instead, a request would be made to the master program for four-branch slave task IDs. This would result in the initiation of 1024 tasks for recursion level 6. Similarly 4096 tasks would be initiated at recursion level 7, 16,384 tasks would be initiated at recursion level 8 and 65,636 tasks would be initiated at recursion level 9. This would result in a total of 87,381 slave tasks being initiated on the on the parallel computing system. This would either not be allowed by the parallel computing system, or would totally swamp the system, probably resulting in a system failure.

Consider also the significance of setting the value of fnb_levels to a value less than inb_levels. To simulate this situation, consider the case where rnb_levels=9, inb_levels=fnb_levels=5. In this case, the phseg subroutine would have to communicate with 256 slave tasks at recursion level 5 to update the region label map, perform convergence checking, or cause the region label map results to be sent to the master program. When fnb_levels=3 as in the original example, the phseg subroutine only has to communicate with 16 slave tasks at recursion level 3 to perform these tasks, significantly reducing the interprocessor communication requirements of the program.

Finally, consider yet another pathological situation where fnb_levels=1. In this case the slave task 0 would have to maintain in memory the full Landsat TM data set plus the full region label map. For our example, the data volume of just these items is about 425 megabytes. On the augmented HIVE system, if the RAM is distributed evenly among the processors, the Dell PCs have 125 megabytes RAM per processor, the Gateway PCs have 250 megabytes RAM per processor and the Pentium Pro PCs have just under 220 megabytes RAM per processor. Thus, slave task 0 would crash due to memory constraints on any of these processing nodes if fnb_levels was set to 1 for a Landsat TM data set of this size (7680 columns by 6912 rows).

The description that follows is intended to assist one of ordinary skill in the art implement the present invention. The following description is merely one approach, and it can be appreciated by one of ordinary skill in the art that numerous other approaches are possible as well. The below materials assume familiarity with the "C" programming language, and with programming parallel computers using "PVM" software.

While the implementation described here is the implementation for the HIVE, this implementation has also been applied, with minor modifications, to other MIMD parallel computers including the Cray T3E and IBM NetFinity computers. Based on this description, individuals should also be able to implement this approach using other programming languages and/or other system software for parallel computers on other parallel computers.

The recursive hierarchical image segmentation algorithm, RHSEG, is implemented in three distinct parts:
i. a generic interface program that sets up a remote call to a parallel computer, and which should be runable on any workstation running UNIX or many of its variants,
ii. a "master" program that runs on the front end of a parallel computer, accepts inputs from the part (i) program, calls many instances of the "slave" program (see below), provides the required inputs to the "slave" programs, accepts and assembles the results from the various "slave" programs, sending the assembled results back to the interface program of part (i), and
iii. the "slave" program, many instances of which run on the multiple processors of the parallel computer and perform the recursive version of the hybrid region growing and spectral clustering algorithm summarily described in Section I, Part B above, sending the results back to the "master" program of part (ii).

Note that part (i) of the RHSEG program could be run on the front end of the parallel computer, or combined with part (ii) of the parallel computer, if the parallel computer's host computer is running under a UNIX variant.

In addition, an optional graphical user interface (GUI) program, implemented under the KHOROS PRO 2000 Software Developer's Kit is available. This GUI program runs on any workstation running UNIX or many of its variants. It creates the parameter file and the headerless binary input data files required by the generic interface program (i). This GUI program is totally optional, as the parameter file and the headerless binary input data files required by the generic interface program (i) can be created manually. The optional user interface and data reformatting program outputs the results in the form of Khoros data objects. These Khoros data objects can be input to separate programs for further analysis.

RHSEG requires the specification of the name of an input parameter file as a UNIX command line argument (fully qualified with path, if not in the local directory). This input parameter file must specify of a number of file names and several parameters. A user's guide-like description of these file names and parameters is given below:

| | | |
|---|---|---|
| input | (required input file) | Input image data file |

The input image data file from which a hierarchical image segmentation is to be produced. This image data file is assumed to be a headerless binary image file in band sequential format. The number of columns, rows, spectral bands and the data type are specified by other required parameters (see below). Data types "unsigned char" and "unsigned short" are supported.

| | | | |
|---|---|---|---|
| mask | (optional input file) | Input data mask | (default = {none}) |

The optional input data mask must match the input image data in number of columns and rows. Even if the input image data has more than one spectral band, the input data mask need only have one spectral band. If the input data mask has more than one spectral band, only the first spectral band is used, and is assumed to apply to all spectral bands for the input image data. If the data value of the input data mask is "1" (TRUE), the corresponding value of the input image data object is taken to be a valid data value. If the data value of the input data mask object is "0" (FALSE), the corresponding value of the input image data object is taken to be invalid, and a region label of "0" is assigned to that spatial location in the output region label map data. The input data mask data type is assumed to be "unsigned char."

| | | | |
|---|---|---|---|
| rlblmap_in | (optional input file) | Input region label map | (default = {none}) |

The optional region label map must match the input image data in number of columns and rows. If provided, the image segmentation is initialized according to the input region label map instead of the default of each pixel as a separate region. Wherever a region label of "0" is given by the input region label map, the region labeling is assumed to be unknown, and the region label map is initialized to one pixel regions at those locations. The input region label map data type is assumed to be "unsigned short."

| | | |
|---|---|---|
| rlblmap | (required output file) | Output region label map data |

The hierarchical set of region label maps that are the main output of RHSEG. Region label values of "0" correspond to invalid input data values in the image data object. Valid region label values range from 1 through 65535. The data is of data type "unsigned short" and is stored in band sequential format, where band corresponds to the segmentation hierarchy level. If the optional region merges list, regmerges, is specified, only the first, most detailed, region label map from the segmentation hierarchy is stored.

| | | |
|---|---|---|
| rnpixlist | (required output file) | Output region number of pixels list |

The region number of pixels list is a required output of RHSEG. This list consists of the number of pixels (of data type "unsigned int") in each region stored as rows of values, with the column location (with counting starting at 1) corresponding to the region label value and the row location corresponding to the segmentation hierarchy level (with counting starting at 0).

| | | | |
|---|---|---|---|
| regmerges | (optional output file) | Output region merges list | (default = {none}) |

The region merges list is an optional output of RHSEG. This list consists of the renumberings of the region label map required to obtain the region label map for the second through the last (coarsest) level of the segmentation hierarchy from the region label map for the first (most detailed) level of the segmentation hierarchy (data type "unsigned short"). The data is stored as rows of values, with the column location (with counting starting at 1) corresponding to the region label value in the first (most detailed) level of the segmentation hierarchy and the row location corresponding to the segmentation hierarchy level (the $l^{th}$ row is the renumberings required to obtain the $(l+1)^{th}$ level of the segmentation hierarchy).

| | | | |
|---|---|---|---|
| rmeanlist | (optional output file) | Output region mean list | (default = {none}) |

The region mean list is an optional output of RHSEG. This list consists of the region mean value (of data type "float") of each region stored as rows of values and groups of rows, with the column location (with counting starting at 1) corresponding to the region label value, the row location (in each row group) corresponding the spectral band, and row group corresponding to the segmentation hierarchy level (with counting starting at 0).

| | | | |
|---|---|---|---|
| rcvlist | (optional output file) | Output region criterion value list | (default = {none}) |

The region criterion value list is an optional output of RHSEG. This list consists of the region's contribution to the global criterion value (of data type "float") stored as rows of values, with the column location (with counting starting at 1) corresponding to the region label value and the row location corresponding to the segmentation hierarchy level (with counting starting at 0).

| | | |
|---|---|---|
| oparam | (required output file) | output parameter file |

The required output parameter file contains (in binary form) the number of hierarchical segmentation levels (nslevels) in the hierarchical segmentation output, and the number of regions (onregions) in the hierarchical segmentation with the finest segmentation detail. These values are required to interpret the rnpixlist, regmerges, rmeanlist, and rcvlist output files.

| log_file | (required output file) | output log file |
|---|---|---|

The required output log file records program parameters and the number of regions and global criterion ratio value for each level of the region segmentation hierarchy.

| ncols | (required integer) | Number of columns in input image data |
|---|---|---|
| nrows | (required integer) | Number of rows in input image data |
| nbands | (required integer) | Number of spectral bands in input image data |
| dtype | (required integer) | Data type of input image data dtype = 4 designates "unsigned char" dtype = 16 designates "unsigned short" |
| normind | (optional list selection) | Image normalization type |

1 "No Normalization",
2 "Normalize Across Bands",
3 "Normalize Bands Separately" [default: 2 "Normalize Across Bands"]

Let $X_{bi}$ be the original value for the $i^{th}$ pixel (out of N pixels) in the $b^{th}$ band (out of B bands). The mean and variance of the $b^{th}$ band are $$\bar{x}_b = \frac{1}{N}\sum_{i=1}^{N} x_{bi}, \text{ and } \sigma_b^2 = \frac{1}{N-1}\sum_{i=1}^{N} (x_{bi} - \bar{x}_b)^2, \quad (1)$$

respectively. To normalize the data to have mean=$M_b$ and variance=$S^2$, set $$y_{bi} = \left[\frac{S}{\sigma_b}(x_{bi} - \bar{x}_b)\right] + M_b. \quad (2)$$

For convenience, the data is normalized so that $S^2$ (=S)=1. Since the entropy criterion requires that all data values be strictly positive, we set the mean value, $M_b$, of the normalized data to be the value that will produce a minimum value of 2 (so as to avoid computational problems calculating $\ln(y_{bi})$. That is, $$M_b = 2 - \min\left\{\left[\frac{1}{\sigma_b}(x_{bi} - \bar{x}_b)\right] : i = 1, 2, \ldots, N\right\}. \quad (3)$$

The above description of image normalization applies to option 3: "Normalize Bands Separately." For option 2: "Normalize Across Bands, " use $$\sigma = \max_b(\sigma_b)$$

for $\sigma_b$ in Equations (2) and (3), and perform the minimization in Equation (3) across all bands as well as across all image pixels.

| maxmdir | (optional integer) | Value equals number of nearest neighbors (Permissible values: 4, 8, 12 or 20; default = 8) |
|---|---|---|
| simcrit | (optional list selection) | Dissimilarity criterion |

1 "1-Norm",
2 "2-Norm",
3 "Infinity Norm", [default: 1 "1-Norm"]

Criterion for evaluating the dissimilarity of one region from another. The 1-Norm for regions j and k is (for B spectral bands)

$$1 - Norm = \sum_{b=1}^{B} |\bar{x}_b^j - \bar{x}_b^k|. \quad (4)$$

where $$2 - Norm = \left[\sum_{b=1}^{B}\left(\bar{x}_b^j - \bar{x}_b^k\right)^2\right]^{1/2}, \quad (5)$$

are the mean values for regions j and k, respectively, in spectral band b. Similarly, the 2-Norm is $$2\text{-Norm} = \left[\sum_{b=1}^{B}(\bar{x}_b^j - \bar{x}_b^k)^2\right]^{\frac{1}{2}}, \quad (5)$$

and the Infinity-Norm is $$\text{Infinity-Norm} = \max\{|\bar{x}_b^j - \bar{x}_b^k| : b = 1, 2, \ldots, B\}. \quad (6)$$

NOTE: Other dissimilarity criterion can be included as additional options without changing the nature of the RHSEG implementation.

| extmean | (optional Boolean) | Flag for extracting mean (default = TRUE) |
|---|---|---|

If this flag is set TRUE, the vector mean is subtracted from the spectral vectors before the dissimilarity criterion is calculated between two spectral vectors. The absolute difference between the two vector means is subsequently added back to the dissimilarity criterion. In the case of the 1-Norm, this is represented mathematically for regions j and k as follows (for B spectral bands):

Let $z_{bj} = x_{bj} - \bar{x}_j$ and $z_{bk} = x_{bk} - \bar{x}_k$, where $\bar{x}_j = \frac{1}{B}\sum_{b=1}^{B} x_{bj}$ and $\bar{x}_k = \frac{1}{B}\sum_{b=1}^{B} x_{bk}$.

Then $$1 - Norm(extmean == \text{TRUE}) = \sum_{b=1}^{B} |z_{bj} - z_{bk}| + |\bar{x}_j - \bar{x}_k|. \quad (7)$$

The extracted mean versions for the 2-Norm, Infinity-Norm and other dissimilarity criterion are defined similarly.

| spclust | (optional Boolean) | Spectral clustering flag (default = TRUE) |
|---|---|---|

If the spectral clustering flag is TRUE, spectral clustering is performed in-between each iteration of region growing. Otherwise, no spectral clustering is performed.

| | | |
|---|---|---|
| spatial_wght | (optional float) | Weight for spatial feature (spatial_wght >= 0.0, default = 0.0) |

If the value of spatial_wght is more than 0.0, the spatial_type parameter (below) determines whether the band maximum variance or standard deviation is used as a feature in the dissimilarity criterion in combination with the spectral band features. spatial_wght=1.0 weights the spatial feature equally with the spectral band features, spatial_wght<1.0 weights the spatial feature less and spatial_wght>1 weights the spatial feature more. If D is the dissimilarity function value before combination with the spatial feature value, the combined dissimilarity function value (comparing regions j and k), $D^C$, is:

$$D^C = D + spatial\_wght * |sf_j - sf_k| \qquad (8)$$

where $sf_j$ and $sf_k$ are the spatial feature values for regions j and k, respectively.

| | | |
|---|---|---|
| spatial_type | (optional list selection) | Spatial feature type |
| | 1 "Variance", | |
| | 2 "Standard Deviation" | [default: 2 "Standard Deviation" |

The (optional) spatial feature is either the spectral band maximum region variance or spectral band maximum region standard deviation. This parameter is ignored if spatial_wght=0.0.

For regions consisting of 9 or more pixels, the region variance for spectral band b is:

$$\sigma_b^2 = \frac{1}{N-1} \sum_{i=1}^{N} (x_{bi} - \overline{x}_b)^2 = \frac{1}{N-1}\left[\sum_{i=1}^{N} x_{bi}^2 - N\overline{x}_b^2\right], \qquad (9)$$

where N is the number of pixels in the region, and $\overline{x}_b$ is the region mean for spectral band b:

$$\overline{x}_b = \frac{1}{N} \sum_{i=1}^{N} x_{bi}.$$

The region spatial feature value is then defined as:

$$\sigma^2 = \max\{\sigma_b^2 : b=1,2,\ldots,B\} \qquad (10)$$

where B is the number of spectral bands.

For regions consisting only 1 pixel, the maximum over bands of the minimum local variance ($ml\sigma^2$) calculated over all possible 3×3 windows containing the pixel is used as a substitute for the band maximum region variance.

For regions consisting of 2 up through 8 pixels, a weighted average of the band maximum minimum local variance and the band maximum region variance is substituted for the band maximum region variance as follows:

$$\begin{aligned}
2 \text{ pixels regions:} & \quad 0.875 * ml\sigma^2 + 0.125 * \sigma^2 \\
3 \text{ pixels regions:} & \quad 0.75 * ml\sigma^2 + 0.25 * \sigma^2 \\
4 \text{ pixels regions:} & \quad 0.625 * ml\sigma^2 + 0.375 * \sigma^2 \\
5 \text{ pixels regions:} & \quad 0.50 * ml\sigma^2 + 0.50 * \sigma^2 \\
6 \text{ pixels regions:} & \quad 0.375 * ml\sigma^2 + 0.625 * \sigma^2 \\
7 \text{ pixels regions:} & \quad 0.25 * ml\sigma^2 + 0.75 * \sigma^2 \\
8 \text{ pixels regions:} & \quad 0.125 * ml\sigma^2 + 0.875 * \sigma^2
\end{aligned} \qquad (11)$$

If the spatial_type "Standard Deviation" is chosen, substitute the region standard deviation ($\sigma_b=\text{sqrt}(\sigma_b^2)$) for the region variance ($\sigma_b^2$) in the above discussion.

| | | |
|---|---|---|
| rnb_levels | (optional integer) | Total number of recursive levels (1 <= rnb_levels <= 9, default = 4) |
| inb_levels | (optional integer) | Recursive level of intermediate level (1 <= inb_levels <= 9, default = 4) |
| fnb_levels | (optional integer) | Number of recursive levels in final stage (1 <= fnb_levels <= 9, default = 4) |
| minregions | (optional integer) | Number of regions for convergence in recursive stages (2 <= minregions <= 4096, default = 384) |
| chkregions | (optional integer) | Number of regions at which convergence factor checking is initiated in final stage (2 <= chkregions <= 4096, default = 512) |
| convfact | (optional float) | Convergence factor (1 <= convfact <= 100, default = 1.01) |

NOTE:
It is required that fnb_levels <= inb_levels <= rnb_levels.

As specified in the HSEG Basic Algorithm Description, if the calculated cvratio is greater than convfact, "raw" segmentation results are output from the previous iteration. The set of such segmentation results output make up the hierarchical segmentation output. The value of cvratio is computed as the ratio between critval, the global criterion value for the current iteration, and prevcritval, the global criterion value for the previous iteration. The value of the global criterion is calculated by computing the dissimilarity function at each image point between the original image values and the region mean image and averaging the result over the entire image.

| | | |
|---|---|---|
| process | (optional list selection) 1 "All Stages Locally", 2 "All Stages on HIVE", 3 "All Stages on Cray T3E", 4 "All Stages on NetFinity" | Processing options flag |
| nb_pes | (optional integer) | Maximum number of tasks or Cray PEs to be utilized (default = 384) |
| cray_time_limit | (optional list selection) 1 "20 minutes: pipe queue", 2 "60 minutes: all_60_queue", 3 "4.4 hours: t3e_all_queue" | Cray time limit used to select queue [default: 1 "20 minutes: pipe queue", |
| host | (required string) | Workstation hostname (default = {none}) |
| tmpdir | (optional string) | Path name to directory in which temporary files are to be stored (default = $TMPDIR) |

| | | |
|---|---|---|
| tempfile | (optional string) | Prefix for temporary file names (default RHSEG########, where the # are random characters) |

Previous disclosures did not reveal a number of implementation details revealed by the above user's guide description of RHSEG. The variables inb_levels, and fnb_levels did not exist in implementations previously disclosed. In these previously disclosed implementations, a single variable, rnb_levels (or nb_levels), took the place of these new variables. This is a key distinction between previously disclosed implementations and the implementation described in this patent application which enables RHSEG to run significantly faster on a parallel computer, such as the HIVE. See FIG. 7 for a graphical depiction of how the values of rnb_levels, inb_levels, and fnb_levels control how processes are allocated and utilized on a parallel computer.

FIG. 7 is a graphical representation of the "master" process and "slave" processes executing the RHSEG program on a parallel computer. In this case, fnb_levels is 2 (2×2), inb_levels is 3 (4×4) and rnb_levels is 5 (16×16), and the input image has 512 columns and 512 rows. Slave tasks at the highest level of recursion (here rnb_levels 5) process 32-by-32 pixel sections of data. A total of 21 slave processes (tasks) are utilized. The number next to each slave process node is the slave task number. Slave tasks at level>=inb_levels make serial recursive calls within the same task and slave tasks at level<inb_levels make parallel recursive calls to different slave tasks (branch tasks). Data is inputted at level=inb_levels and the region label map output is made from level=fnb_levels.

C. Functional Operation

Description of part (i) of the RHSEG implementation: Part (i) of the RHSEG program was implemented in "C" under the gcc version 2.8.1 compiler. It was developed under the Solaris 7 operating system on a SUN Workstation, but it should both compile and run with other "C" compilers and under other UNIX-type operating systems, possibly with minor modification.

The RHSEG program initially determines the name of the parameter file from the command line input, and reads in the parameters from the file using the function read_param( ). If a prefix for the temporary filenames in not provided in the parameter file, the program generates a character string to used at a prefix for file names for temporary files required by the program. The "C" library function tempnam( ) is used for this purpose. For the discussion below, this prefix is assumed to be "RHSEG0000 ."

At this point the RHSEG main program opens the log file and outputs to it the program parameters using the function print_param( ). The following parameters are declared as external variables, and can be utilized in the main program and any "C" functions called subsequently.

| | |
|---|---|
| inputf | A char array containing the name of the input image data file |
| maskf | A char array containing the name of the mask data file, if it exists. If no mask data file exists, maskf has the value "NULL." |
| rlblmap_inf | A char array containing the name of the input region label map data file, if it exists. If no mask data file exists, rlblmap_inf has the value "NULL." |
| rlblmapf | A char array containing the name of the output region label map data file. |
| rnpixlistf | A char array containing the name of the output region number of pixels list data file. |
| regmergesf | A char array containing the name of the output region merges list data file, if requested. If the output region merges list data file is not requested, regmergesf has the value "NULL." |
| rmeanlistf | A char array containing the name of the output region mean list data file, if requested. If the output region mean list data file is not requested, rmeanlistf has the value "NULL." |
| rcvlistf | A char array containing the name of the output region criterion value list data file, if requested. If the output region criterion value list data file is not requested, rcvlistf has the value "NULL." |
| oparamf | A char array containing the name of the output parameter file. |
| log_file | A char array containing the name of the output log file. |
| host | A char array containing the name of the workstation running part (i) of the RHSEG implementation. |
| tmpdir | A char array containing the path name to the directory where temporary files are to be stored. |
| tempfile | A char array containing the prefix for temporary file names. |
| mask_flag | An int variable which has value TRUE if mask data exist (FALSE otherwise). |
| rlblmap_in_flag | An int variable which has value TRUE if input region label map data is given (FALSE otherwise). |
| regmerges_flag | An int variable which has value TRUE if the output region merges list is requested (FALSE otherwise). |
| rmeanlist_flag | An int variable which has value TRUE if the output region mean list is requested (FALSE otherwise). |
| rcvlist_flag | An int variable which has value TRUE if the output region criterion value list is requested (FALSE otherwise). |
| spclust_flag | An int variable that is TRUE if spectral clustering is to be performed (FALSE otherwise). |
| process | An int variable that specifies the computing platform to be utilized. Currently "1" signifies the local workstation, "2" signifies the HIVE, "3" signifies the Cray T3E and "4" signifies the IBM NetFinity. |
| nb_pes | An int variable specifying the maximum number of PEs (processing elements) to be requested on the Cray T3E. Utilized only if process = 3. |
| cray_time_limit | An int variable specifying the processing time limit to be used in determining which queue to request on the Cray T3E. Utilized only if process = 3. |
| nbands | An int variable containing the number of spectral bands in the input image data. |
| dtype | An int variable containing an indicator of the data type of the input image data. (dtype == 4 designates unsigned char and dtype == 16 designates unsigned short). |
| maxmdir | An int variable containing the number of nearest neighbors considered. |
| normind | An int variable containing an indicator of the type of normalization requested. (normind == 1 designates "No Normalization," normind == 2 designates "Normalization Across Bands," and normind == 3 designates "Normalize Bands Separately"). |
| simcrit | An int variable indicating the dissimilarity criterion to be used. |
| extmean | An int variable that is TRUE if the vector mean is subtracted from the spectral vectors before the dissimilarity criterion is calculated, FALSE otherwise. |

-continued

| | |
|---|---|
| spatial_type | An int variable indicating the spatial feature type employed (1 => "Variance", and 2 => "Standard Deviation"). |
| rnb_levels | An int variable containing the total number of recursive levels to be utilized |
| inb_levels | An int variable containing the recursive level of the intermediate level |
| fnb_levels | An int variable containing the number of recursive levels used in the final stage |
| sub_ncols | An int variable containing the number of columns of input data to be processed at the highest level of recursion |
| sub_nrows | An int variable containing the number of rows of input data to be processed at the highest level of recursion |
| minregions | An int variable containing the number of regions for convergence in the recursive stages |
| chkregions | An int variable containing the number of regions at which convergence factor checking is initiated. |
| max_nregions | An int variable containing the maximum number of regions that will be encountered in processing the data. |
| spatial_wght | A float variable which contains the value of the weight for the spatial feature (a value of 0.0 indicates the spatial feature is not employed). |
| convfact | A float variable containing the value of the convergence factor for detecting natural convergence points. |
| scale | A float array containing the multispectral scale factor(s) for normalization. |
| offset | A float array containing multispectral offset factor(s) for normalization. |

The program next sets the number of columns (sub_ncols) and number of rows (sub_nrows) of the image data sections to be processed at the highest level of recursion, based on the value of rnb_levels.

The RHSEG program must perform some preprocessing of the input data prior to calling part (ii) of the RHSEG implementation (on the parallel computer's host computer). If the input data set is very large, the input data will need to be sectioned for processing. At this point in the program, the RHSEG program checks to see if a large enough buffer can be allocated to handle the input data and other associated data arrays. If not, it recursively decreases the buffer size by a factor of 2 until the allocation can be made. This determines the value of proc_nsecs, the number of sections in which the data is processed in the preprocessing portion of part (i).

The RHSEG main program next continues into a preprocessing stage in which it computes image statistics. If image normalization is requested, the image sum, sum of squares and minimum values in each band are computed, along with the number of image pixels. If image normalization is not requested, only the number of image pixels is found. If image normalization is requested, the sum_stat, sumsq_stat and min_stat arrays are declared and allocated as follows:

| Data Array | Data Type | Size | To Contain: |
|---|---|---|---|
| sum_stat | double | nbands | Sum of the input image data in each band |
| sumsq_stat | double | nbands | Sum of the squares of input image data in each band |
| min_stat | double | nbands | The minimum input image data value in each band |

If required, the sum_stat and sumsq_stat arrays are initialized to "0", and the min_stat array is initialized to "MAX-FLOAT" (the maximum floating point value on the system).

If proc_nsecs==1, the RHSEG main program continues in the manner described in the section of this document labeled, "IMPLEMENTING A RECURSIVE HIERARCHICAL SEGMENTATION ALGORITHM ON A COMPUTER."

by allocating the input_data, mask_data (if necessary) and rlblmap_data data arrays, calling the function read_data( ) to read the input data into the allocated arrays, and calling the function find_stats( ) to compute the number of image pixels, npixels, and, if normalization is requested, the image statistics sum_stat, sumsq_stat and min_stat.

If proc_nsecs>1, the RHSEG main program must stage through the data to compute the image statistics. To do so, RHSEG allocates memory for the input_data array and, if necessary, for the mask_data array using proc_nrows (the number of rows in each section processed) instead of nrows for the rows dimension:

| Data Array | Data Type | Size | To Contain: |
|---|---|---|---|
| input_data | unsigned short | ncols*proc_nrows*nbands | Input image data |
| mask_data | unsigned char | ncols*proc_nrows | Input mask data (if any) |

The input data files are opened, the variable npixels is initialized to zero (0), and a loop is entered which is repeated proc_nsecs times. In this loop, proc_nrows of the input data is read, and the function find_stats( ) is called with the following parameters and array variables:

| | |
|---|---|
| input_data | An unsigned short array containing proc_nrows of the input image data |
| mask_data | An unsigned char array containing proc_nrows of the mask data (if any) |
| ncols | An int variable containing the number of columns in the input image data. |
| maxnrow | An int variable containing the number of rows in this section of input image data (equal to proc_nrows). |
| sum_stat | A double array containing the sum of the (possibly masked) input image data in each band for the portion of data previously processed. |
| sumsq_stat | A double array containing the sum of square of the (possibly masked) input image data in each band for the portion of data previously processed. |
| min_stat | A double array containing the minimum value of the (possibly masked) input image data in each band for the portion of data previously processed. |

The global variables mask_flag, nbands and normind are also used as inputs by find_stats( ). The following arrays are output by find_stats( ):

| | |
|---|---|
| sum_stat | A double array containing the sum of the (possibly masked) input image data in each band for all portions of data processed. |
| sumsq_stat | A double array containing the sum of square of the (possibly masked) input image data in each band for all portions of data processed. |
| min_stat | A double array containing the minimum value of the (possibly masked) input image data in each band for all portions of data processed.. |

The number of input pixels in this section of input data is returned as the value of the function find_stats( ), and is added to the current value of npixels. If image normalization is not requested, and no mask data is provided, the find_ stats( ) function simply calculates the image number of pixels as ncols*maxrow and returns. If image normalization is not requested, and mask data is provided, the find_stats( ) function finds the image number of pixels by counting the number of non-zero entries in mask_data and returns. If image normalization is requested, the function find_stats( ) scans through the input image data, taking the image masking in account if provided, and accumulates the sum, sum of squares and minimum data values for each band, along with the image number of pixels, and then returns.

After the program exits the loop over proc_nsecs, the input files are closed.

The RHSEG main program now proceeds to allocate and compute the scale and offset arrays for image normalization. This is done in the same manner described in the section of this document entitled, "IMPLEMENTING A RECURSIVE HIERARCHICAL SEGMENTATION ALGORITHM ON A COMPUTER."

Depending on the parallel processor being utilized, the RHSEG main program allocates and initializes a character array, platform. For the HIVE, platform "hive", for the Cray T3E, platform="t3e", and for the IBM Netfinity, platform="netf". This platform array is arbitrary, and is used to flag which files need to be copied over to the parallel platform's host computer.

If spatial_wght>0.0, the RHSEG main program now proceeds to compute and write to a file (RHSEG0000.spatial.platform, where platform was defined in the previous paragraph) the minimum over a 3×3 window of the maximum over the spectral bands of the spatial feature (variance or standard deviation) calculated over a 3×3 window. The input variable spatial_wght is multiplied by nbands so that the spatial feature will have the same weighting and the spectral features when the initial input value of spatial_wght is 1.0.

If proc_nsecs=1, the spatial feature data array is computed in the same manner as described in the section of this document entitled, "IMPLEMENTING A RECURSIVE HIERARCHICAL SEGMENTATION ALGORITHM ON A COMPUTER," with a single call to the function compute_sptatial( ). If proc_nsecs>1, the program must stage through the input data in doing this computation, as described in the next few paragraphs.

In setting up the staged approach of computing and writing the spatial feature file, the input data array, and, if necessary, the mask data array are reallocated. In addition, the spatial feature data array and some temporary arrays are allocated. These arrays end up being allocated as follows:

| Data Array | Data Type | Size | To Contain: |
| --- | --- | --- | --- |
| input_data | unsigned short | ncols* (proc_nrows + 1)* nbands | Input image data |
| input_sub | unsigned short | 3*ncols*nbands | Temporary array to buffer 3 lines of input data |
| mask_data | unsigned char | ncols* (proc_nrows + 1) | Input mask data (if any) |
| mask_sub | unsigned char | 3*ncols | Temporary array to buffer 3 lines of mask data (if any) |
| spatial_init | float | ncols* (proc_nrows + 1) | Spatial feature data (local image variance or standard deviation) |

The input files, and an output file (RHSEG0000.max) are opened, and the following variables are initialized: init_flg=TRUE, last_flg=FALSE, nelements=ncols*(proc_nrows+1) and marrow=proc_nrows. Then a loop is entered, which is repeated proc_nsecs times. Each time through the loop, nelements of input data are read. The last time through the loop, nelements is readjusted to be ncols*(maxrow-1), and last_flg set equal to TRUE. Other times through the loop (except the first), nelements is readjusted to be ncols*proc_nrows and initflg is set equal to FALSE. Each time through the loop, the maximum over spectral bands of the local spatial feature values over 3×3 pixel areas is now calculated by calling the function compute_sptatial( ) with the following input arrays and parameters:

| | |
| --- | --- |
| input_data | An unsigned short array containing the current section of input image data. |
| input_sub | An unsigned short array to buffer 3 lines of input image data. |
| mask_data | An unsigned char array containing the current section of mask data (if any). |
| mask_sub | An unsigned char array to buffer 3 lines of mask data (if any). |
| init_flg | An int variable that is TRUE if this is the first section of data processed, and FALSE otherwise. |
| last_flg | An int variable that is TRUE if this is the last section of data processed, and FALSE otherwise. |
| ncols | An int variable containing the number of columns in the input image data. |
| maxrow | An int variable containing the number of rows processed in this section of the input image data. |
| num_points | An int variable containing the size of data element offset between bands of input image data. Equal to nelements in this case. |

The global parameters mask_flag, nbands, scale, and offset are also used as inputs to compute_spatial( ). The following data array is output by compute spatial( ):

| | |
| --- | --- |
| spatial_init | A float array containing the maximum over spectral bands of the spatial feature calculated over a 3 × 3 window for the current section of data. |

Note that when mask_data is provided, the value of spatial init is set equal to MAXFLOAT (the maximum floating point value) whenever ANY data point in the 3×3 window is masked out. Also, spatial_init is set equal to MAXFLOAT for the first and last data rows and columns. (Internal to the compute_spatial( ) function, the three line buffers, input_sub and mask_sub, if necessary, are maintained such that the middle line of the three line buffers correspond to the line currently being calculated of the spatial_init array.)

After each call to compute_sptatial( ), ncols*maxrow elements of the spatial_init are written to the file RHSEG0000.max. After the program exits the loop over proc_nsecs, the input and output files are closed. The input_sub and mask_sub arrays are also freed.

An additional data array is now allocated:

| Data Array | Data Type | Size | To Contain: |
| --- | --- | --- | --- |
| spatial_init_sub | float | 3*ncols | Temporary array to buffer 3 lines of spatial feature data |

The computation of the spatial feature data array continues with the finding of the minimum over 3×3 pixel areas of the data array computed above by the function compute_ spatial( ). If proc_nsecs=1, the spatial feature data array is computed in the same manner as described in the section of this document entitled, "IMPLEMENTING A RECURSIVE HIERARCHICAL SEGMENTATION ALGORITHM ON A COMPUTER," with a single call to the function find_min( ). If proc_nsecs>1, the program must stage through the data in doing this computation, as described in the next few paragraphs.

The input file (RHSEG000.max), and the output file (RHSEG0000.spatial.platform) are opened, and the following variables are initialized: init_flg=TRUE, last_flg= FALSE, nelements=ncols*(proc_nrows+1) and maxrow= proc_nrows. Then a loop is entered, which is repeated proc_nsecs times. Each time through the loop, nelements of input data are read. The last time through the loop, nelements is readjusted to be ncols*(maxrow-1) and last_flg is set equal to TRUE. Other times through the loop (except the first), nelements is readjusted to be ncols*proc_nrows and init_flg is set equal to FALSE. Each time through the loop, the minimum over 3×3 pixel areas of maximum over spectral bands of the local spatial feature values over 3×3 pixel areas is found by calling the function find_min( ) with the following input arrays and parameters:

| | |
|---|---|
| spatial_init | A float array containing the maximum over spectral bands of the spatial feature calculated over a 3 × 3 window for the current section of data. |
| spatial_init_sub | An float array to buffer 3 lines of spatial feature data. |
| init_flg | An int variable that is TRUE if this is the first section of data processed, and FALSE otherwise. |
| last_flg | An int variable that is TRUE if this is the last section of data processed, and FALSE otherwise. |
| ncols | An int variable containing the number of columns in the input image data. |
| maxrow | An int variable containing the number of rows processed in this section of the input image data. |

The following data array is output by find_min( ):

| | |
|---|---|
| spatial_init | A float array containing the minimum over a 3 × 3 window of the maximum over spectral bands of the spatial feature calculated over a 3 × 3 window for the current section of data. |

(Internal to the find_min( ) function, the three line buffer, spatial_init_sub is maintained such that the middle line of the three line buffer corresponds to the line currently being calculated of the output spatial_init array.)

After each call to the function find_min( ), ncols*maxrow elements of the spatial_init are written to the file RHSEG0000.spatial.platform. After the program exits the loop over proc_nsecs, the input and output files are closed. The spatial_init and spatial_init_sub arrays are also freed.

The RHSEG main program continues by copying the input data file, inputf, to RHSEG0000.input.platform, and if provided, the mask data file, mask to RHSEG0000.mask.platform, and the input region label map data file, rlblmap_inf, to RHSEG0000.rlblmap.platform. (If the Cray T3E, Netfinity or other parallel machine besides the HIVE is to be utilized, substitute the appropriate string for "hive".)

The maximum number of regions, max_nregions, that will be encountered in processing any subsection of data is now computed as equal to the maximum of 4* minregions and sub_ncols*sub_nrows.

The actual call to the parallel computer system is made through a call to the function call_parallel( ), with ncols and nrows as input parameters. The functional description of call parallel( ) is given in a later section. The global variables log_file, host, tmpdir, tempfile, mask_flag, rlblmap_in_ flag, regmerges_flag, spclust_flag, process, nb_pes, cray_ time_limit, nbands, dtype, maxmdir, simcrit, extmean, spatial_type, rnb_levels, inb_levels, fnb_levels, sub_ ncols, sub_nrows, minregions chkregions, max_nregions, spatial_wght, convfact, scale, and offset are also utilized by the function call_parallel( ).

After the function call parallel( ) returns, the output parameter file (output from the part (ii) of the program, run on the parallel machine host), RHSEG0000.oparam, is read to determine the number of hierarchical segmentation levels, nslevels, and maximum region label in the finest segmentation, onregions, that were produced on the parallel computing platform by part (ii) of the RHSEG implementation. Besides the log file, RHSEG0000.log, the other files output from part (ii) of the RHSEG implementation are RHSEG0000.npix.il (l=0 to nslevels-1), RHSEG0000.mean.sbb.il (b=0 to nbands-1; l=0 to nslevels-1), and RHSEG0000.critval.il (l=0 to nslevels-1). If regmerges_flag==FALSE, RHSEG0000.rlblmap.il (l=0 to nslevels-1) are also output, and if regmerges_flag==TRUE, RHSEG0000.rlblmap.i0 and RHSEG0000.regmerges.il (l=1 to nslevels-1) are also output. These files are concatenated together appropriately to form the files rlblmap, regmerges, rnpixlist, rmeanlist, and rcvlist, which were described previously.

Functional description of the call_parallel( ) function: The call_parallel( ) function first determines the number of parallel tasks required based on the value of inb_levels. (Note that this is one less than the total number of tasks as listed in Table 1 of Section 1.C.) The number of parallel tasks, inb_tasks, is related mathematically to inb_levels, by the equation:

$$inb\_tasks = \sum_{i=1}^{inb\_levels} 2^{2(i-1)}. \quad (12)$$

For the 200 processor HIVE, inb_levels values of 4 or 5 are most appropriate, resulting in 85 or 341 tasks, respectively. The available processors are somewhat underutilized with 85 tasks, but 341 tasks require some multitasking (up to 2 tasks per processor). However, due to the recursive structure of the implementation, a maximum of 256 tasks out of the 341 are actually performing computations at any particular instance of time for inb_levels=5.

A parameter file, "RHSEG0000.iparam," is now generated through which the required parameters are transferred to the parallel program. The required parameters are:

| | |
|---|---|
| mask_flag | TRUE if a mask data file exists |
| rlblmap_in_flag | TRUE if an input region label data file exists |
| regmerges_flag | TRUE if an output region merges list file is requested |
| ncols | input image number of columns |
| nrows | input image number of rows |
| nbands | input image number of spectral bands |
| dtype | input image data type (4 => "unsigned byte", 16 => "unsigned short") |
| maxmdir | value equals number of nearest neighbors |
| simcrit | dissimilarity criterion (1 => "1-norm", 2 => "2-norm", and 3 => "Infinity-norm".) |
| extmean | TRUE if vector mean is to be subtracted |

-continued

| | |
|---|---|
| spclust_flag | TRUE if spectral clustering is to be performed |
| spatial_wght | weight for spatial feature |
| spatial_type | spatial feature type (1 => "variance", and 2 => "standard deviation") |
| rnb_levels | total number of recursive levels |
| inb_levels | recursive level of intermediate level |
| inb_tasks | number of parallel tasks required |
| fnb_levels | number of recursive levels used in the final stage |
| sub_ncols | number of columns of image data section processed at the highest level of recursion |
| sub_nrows | number of rows of image data section processed at the highest level of recursion |
| minregions | number of regions for convergence in recursive stages |
| chkregions | number of regions at which convergence factor checking is initiated |
| convfact | convergence factor |
| scale | multispectral scale factor(s) for normalization |
| offset | multispectral offset factor(s) for normalization |

Also required for the HIVE and NetFinity implementations are the following:

| | |
|---|---|
| host | Hostname of the workstation setting up the parallel call |
| tmpdir | Directory for temporary files on the calling workstation |

The files RHSEG0000.iparam, RHSEG0000.input.platform, RHSEG0000.mask.platform and RHSEG0000.spatial.platform are remotely copied with the UNIX "rcp" command to the parallel computing platform, and a UNIX remote shell call is execute to start the parallel program implementing part (ii) of the RHSEG implementation. After the parallel program completes, the output files are remotely copied from the parallel-computing platform. Besides the log file, RHSEG000.log, and the output parameter file, RHSEG0000.oparam, the other files output from part (ii) of the RHSEG implementation are RHSEG0000.npix.il (l=0 to nslevels-1), RHSEG0000.mean.sbb.il (b=0 to nbands-1; l=0 to nslevels-1), and RHSEG0000.critval.il (l=0 to nslevels-1). If reg-merges$_{13}$ flag==FALSE, RHSEG0000.rlblmap.il (l=0 to nslevels-1) are also output and if regmerges flag==TRUE, RHSEG0000.rlblmap.i0 and RHSEG0000.regmerges.il (l=1 to nslevels-1) are also output.

Description of part (ii) of the RHSEG implementation: As mentioned in previously, part (ii) of the RHSEG implementation is a "master" program that accepts inputs from part (i), and calls many instances of the part (iii) "slave" program, provides the required inputs to the "slave" programs, aggregates the results from the "slave" programs, and sends the results back to part (i).

The master program first determines the parameter file name from the command line and reads in the program parameters. Then, based on the values of rnb_levels, inb_levels, sub_ncols and sub_nrows, the program determines isub_ncols and isub_nrows, the number of columns and rows at the intermediate level of recursion. The program also similarly determines fsub_ncols and fsub_nrows based on the values of inb_levels, fnb_levels, isub_ncols and isub_nrows.

Based on the values of ncols and sub_ncols, the master program finds the smallest full image size (pad_ncols and pad_nrows) that is an integer multiple of ncols and nrows. Note that pad_ncols>=ncols and pad_nrows>=nrows.

The master program then determines the total number of processing sections for the final stage, tot_nb_secs=(ncols/fsub_ncols)$^2$, and the task, processing section correspondence array (task-sec) at the final stage recursive level.

On the HIVE, NetFinity and similar parallel computing platforms, the master program then spawns the required number of tasks (inb_tasks), using the "pvm_spawn" command to spread the tasks across the available slave processors. The task IDs of the spawned tasks are recorded in an array (bee_tid[*]). On the Cray T3E, the "start_pes" command is used to start processes on ibn_tasks+1 processors, and the rest of the master program is run on the last processor. The master program is provided with the task IDs of the slave tasks by the slave tasks explicitly sending their processor number and task IDs to the master program with a "pvm_send" call.

Special note: For load balancing purposes on the HIVE, the tasks are allocated to PCs as follows: Tasks 0–4 are allocated to Dell PCs 5–9. Tasks 5–52 are spread evenly across the 16 Gateway PCs. Tasks 53–84 are spread evenly across the 10 Dell PCs. Tasks 85 through 340 are first spread across the Pentium Pro PCs until 2 tasks are allocated to each available Pentium Pro PC. Then the remaining tasks are spread evenly across the Gateway and Dell PCs. This load balancing strategy takes into account that the clock speeds of the Dell and Gateway PCs are twice as fast as the Pentium Pro PCs, and that the Pentium Pro PCs and Gateway PCs have two processors per PC and the Dell PCs have four processors per PCs. The load balancing strategy should be modified accordingly for different heterogeneous Beowulf-type clusters. Such tailored load balancing strategies are not necessary on homogeneous clusters such as the Cray T3E and NetFinity.

The master program then multicasts the common parameters to all slave tasks with the pvm_mcast routine. The common parameters are:

| | |
|---|---|
| mask_flag | TRUE if a mask file exists or if padding is required |
| rlblmap_in_flag | TRUE if an input region label map is provided |
| regmerges_flag | TRUE if an output region merge list file is requested |
| spatial_wght | weight for spatial feature |
| spatial_type | spatial feature type (1 => "variance", and 2 => "standard deviation") |
| nbands | input image number of spectral bands |
| sub_ncols | number of columns of image data section processed at the highest level of recursion |
| sub_nrows | number of rows of image data section processed at the highest level of recursion |
| isub_ncols | number of columns of image data section processed at the intermediate level |
| isub_nrows | number of rows of image data section processed at the intermediate level |
| fsub_ncols | number of columns of image data section processed in the final stage |
| fsub_nrows | number of rows of image data section processed in the final stage |
| scale | multispectral scale factor(s) for normalization |
| offset | multispectral offset factor(s) for normalization |
| simcrit | dissimilarity criterion (1 => "1-norm", 2 => "2-norm", and 3 => "Infinity-norm".) |
| extmean | TRUE if vector mean is to be subtracted |
| maxmdir | value equals number of nearest neighbors |
| spclust_flag | TRUE if spectral clustering is to be performed |
| minregions | number of regions for convergence in recursive stages |
| chkregions | number of regions at which convergence factor checking is initiated |
| fnb_levels | number of recursive levels used in the final stage |
| inb_levels | recursive level of intermediate level |
| rnb_levels | total number of recursive levels |
| ntasks | number of parallel tasks required (equal to inb_tasks) |
| slave_tid | task IDs of all slave tasks |
| tot_nb_secs | number of data sections employed in final stage |
| task_sec | task-section correspondence in final stage |

The master program then initiates the recursive stage of the program by sending task specific parameters to the $0^{th}$ slave task. These task specific parameters are:

| | |
|---|---|
| runtype | slave task run type (equal to "1" in this case) |
| first_sec | first section to be processed by slave task (equal to 0 in this case) |
| last_sec | last section to be processed by slave task (equal to nb_secs-1 in this case. If ratio = ncols/isub_ncols, nb_secs = ratio*ratio) |
| calling_tid | current task ID (master task ID in this case) |
| level | current level of recursion + 1 (equal to "1" in this case) |
| ncols | number of columns in current section of data |
| nrows | number of rows in current section of data |
| convfact | convergence factor |

The master program then waits for branch task ID requests from tasks at recursive levels 1 through inb_levels-1. Tasks at these levels make 4 separate recursive calls to 4 separate tasks, for which the master program must provide task IDs.

After all branch task ID requests are made and satisfied, the master program waits for input data requests from the tasks at recursive level inb_level. When a slave program sends an input data request to the master program, it sends its own task ID (request_tid) and the section number (sec) it is requesting data for. The sections are numbered in a recursive manner as illustrated in Table I.

The offset locations for each section in the recursive order numbering scheme can be found in the following manner. On the PCs of the HIVE or Netfinity, declare the following structure and union:

```
typedef struct
{
    unsigned b00:1;              typedef union
    unsigned b01:1;              {
    unsigned b02:1;                  unsigned short sec;
    unsigned b03:1;                  ushort_bit_field bits;
    unsigned b04:1;              } gb_union;
    unsigned b05:1;
    unsigned b06:1;
    unsigned b07:1;
    unsigned b08:1;
    unsigned b09:1;
    unsigned b10:1;
    unsigned b11:1;
    unsigned b12:1;
    unsigned b13:1;
    unsigned b14:1;
    unsigned b15:1;
} ushort_bit_field;
```

TABLE I

Numbering of sections in recursive order sequence for inb_levels = 4. Each section is of size inb_cols × fbn_rows.

| 0 | 1 | 4 | 5 | 16 | 17 | 20 | 21 |
|---|---|---|---|---|---|---|---|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

On the Cray T3E, the above declarations are made differently as follows:

```
typedef struct
{
    unsigned b31:1;              typedef union
    unsigned b30:1;              {
    unsigned b29:1;                  unsigned short sec;
    unsigned b28:1;                  ushort_bit_field bits;
    unsigned b27:1;              } gb_union;
    unsigned b26:1;
    unsigned b25:1;
    unsigned b24:1;
    unsigned b23:1;
    unsigned b22:1;
    unsigned b21:1;
    unsigned b20:1;
    unsigned b19:1;
    unsigned b18:1;
    unsigned b17:1;
    unsigned b16:1;
    unsigned b15:1;
    unsigned b14:1;
    unsigned b13:1;
    unsigned b12:1;
    unsigned b11:1;
    unsigned b10:1;
    unsigned b09:1;
    unsigned b08:1;
    unsigned b07:1;
    unsigned b06:1;
    unsigned b05:1;
    unsigned b04:1;
    unsigned b03:1;
    unsigned b02:1;
    unsigned b01:1;
    unsigned b00:1;
} ushort_bit_field;
```

In the master program the following variable declarations are made:
  int recur_sec, sub_coff, sub_roff, c_sec, r_sec;
  gb_union getbits;

The offsets for the recursive order section numbering (recur_sec) are then found as follows:

```
getbits.sec = recur_sec;
c_sec = getbits.bits.b00 + 2*getbits.bits.b02 + 4*getbits.bits.b04 +
    8*getbits.bits.b06 + 16*getbits.bits.b08 + 32*getbits.bits.b10 +
    64*getbits.bits.b12 + 128*getbits.bits.b14;
r_sec = getbits.bits.b01 + 2*getbits.bits.b03 + 4*getbits.bits.b05 +
    8*getbits.bits.b07 + 16*getbits.bits.b09 + 32*getbits.bits.b11 +
    64*getbits.bits.b13 + 128*getbits.bits.b15;
sub_coff = c_sec*isub_ncols;
sub_roff = r_sec*isub_ncols;
```

If pad_ncols!=ncols or pad_nrows!=nrows, the input data and, if present, the mask data and spatial feature data are padded as necessary with zero ("0") values just before being sent to the requesting slave task.

After all the input data requests are received and satisfied for the input image data (and mask data and/or spatial feature data), the master program determines the correspondence between the recursive order number scheme (Table I, using fnb_levels rather than inb_levels) and the raster order numbering scheme (Table II) for use in proper outputting of the region label maps that will be generated.

In the master program the following variable declarations are made:
  int ratio, tot_nb_secs, sec, c_sec, r_sec, recur_sec,
      *raster_sec; gb_union getbits;

The recursive section numbering order (recur_sec) and the raster section numbering order (raster_sec) are then associated as follows:

```
ratio = pad_ncols/fsub_ncols;
tot_nb_secs = ratio*ratio;
sec_inv = (int *) malloc((size_t)(tot_nb_secs*sizeof(int)));
for (sec = 0; sec < tot_nb_secs; sec++)
{
        getbits.sec = recur_sec;
        c_sec = getbits.bits.b00 + 2*getbits.bits.b02 + 4*getbits.bits.b04 +
           8*getbits.bits.b06 + 16*getbits.bits.b08 + 32*getbits.bits.b10 +
           64*getbits.bits.b12 + 128*getbits.bits.b14;
        r_sec = getbits.bits.b01 + 2*getbits.bits.b03 + 4*getbits.bits.b05 +
           8*getbits.bits.b07 + 16*getbits.bits.b09 + 32*getbits.bits.b11 +
           64*getbits.bits.b13 + 128*getbits.bits.b15;
        raster_sec = r_sec*ratio + c_sec;
        sec_inv[raster_sec] = recur_sec;
}
```

The raster_sec-recur_sec association is stored for later use in the sec_inv array.

TABLE II

Numbering of sections in raster order sequence for fnb_levels = 4. Each section is of size fnb_cols × fnb_rows.

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

The master program now waits for the recursive processing to complete, and the final stage processing to initiate on the $0^{th}$ slave task. When the $0^{th}$ slave task finishes the calculation of the initial global criterion value, this value is reported back to the master program, where this value is output to the log file.

When the $0^{th}$ slave task detects a cvratio>convfact, it sends the cvratio, the number of regions and the region number of pixels, region means and region criterion values to the master program. The master program, prints the cvratio, the number of regions and hierarchical segmentation level, l, to the log file RHSEG0000.log. Then program then performs byte-swapping on the region number of pixels and writes the result to the file RHSEG0000.npix.il, performs byte-swapping on the regions means and writes the result to the files RHSEG0000.mean.sbb.il (b=0 to nbands-1), and performs byte-swapping on the region criterion values and writes the result to the file RHSEG0000.critval.il. It then requests the region label map section by section in raster section order (based on the recursive section—raster section numbering correspondence stored in the sec_inv array) from the tasks at the recursive level fnb_levels (using the task-section correspondence stored in the task_sec array). If regmerges_flag==FALSE or l==0, the region label map data is byte-swapped and written in raster section order to the file RHSEG0000.rlblmap.il. If regmerges_flag ==TRUE and l!=0, the region merges list data is byte-swapped and written to the file RHSEG0000.regmerges.il.

Description of part (iii) of the RHSEG implementation: As mentioned previously, part (iii) of the RHSEG implementation is a set of identical "slave" programs that request and accept inputs from the part (ii) "master" program, performs the hybrid region and growing and spectral clustering algorithm on a particular section of data, and returns results back to the "master" program. Most of these "slave" programs also send and receive inputs from other "slave" programs.

On the HIVE, NetFinity and similar parallel computing platforms, the slave program can determine the task ID of the master program through using the "pvm_parent" command. However, this is not the case on the Cray T3E. Instead the master program must broadcast its task ID to all the other tasks. Upon receiving this broadcast, each slave program (or task) sends back to the master program its own task ID.

Once each slave task has the task ID of the master program task, it waits for the multicast of the common parameters from the master task. These common parameters are listed above in the description of part (ii) of the RHSEG implementation. Upon receiving the common parameters each task determines its own task number by finding the index of the slave_tid array whose task ID number (tid) matches its own process ID. Once the common parameters are received, each slave task then waits for task specific parameters for its particular processing task. Only one slave task (task 0) receives its task specific parameters from the master task. All other slave tasks receive their task specific parameters from another slave task. These task specific parameters were listed under the description of part (ii) of the RHSEG implementation.

Upon receiving its task specific parameters, each slave task determines the maximum number of regions the task must handle at any particular time, max_nregions. In most cases, max_nregions=4*minregions. However, if sub_ncols*sub_nrows>4*minregions, then max_nregions= sub_ncols*sub_nrows.

Each slave task now allocates data arrays as necessary, depending the recursive level, level, it is running at. For level>=fnb_levels, the following data arrays are allocated to hold the input and output data:

| Data Array  | Data Type      | Size                   | To Contain:                                                                                    |
|-------------|----------------|------------------------|------------------------------------------------------------------------------------------------|
| input_data  | unsigned short | ncols*nrows* nbands    | Input image data                                                                               |
| mask_data   | unsigned char  | ncols*nrows            | Input mask data (if any)                                                                       |
| spatial_init| float          | ncols*nrows            | Spatial feature data (local image variance or standard deviation, if any)                      |
| rlblmap_data| unsigned short | ncols*nrows            | Input region label map data (if any) and output region label map data                          |

Note that ncols and nrows are the number of columns and rows in the section of data being processed by the given task, NOT the total number of columns and rows in the complete data set. The above data arrays are used in runs of runtype=1, 2 and 7. The rlblmap_data data array is also used in runs of runtype=4, 8 and 10.

For level=fnb_levels, the following data arrays are allocated:

| Data Array      | Data Type | Size   | To Contain:                                                                         |
|-----------------|-----------|--------|-------------------------------------------------------------------------------------|
| region_sum      | double    | nbands | Region sum values for a particular region                                           |
| cmp_region_sum  | double    | nbands | Region sum values for a the region being compared to region with values in region_sum |

-continued

| Data Array | Data Type | Size | To Contain: |
|---|---|---|---|
| rlblmap_prev | unsigned short | ncols*nrows | Region label map values from previous iteration |
| rlabel_tmp | unsigned short | max_nregions | Region label values (temporary) |
| npix_tmp | unsigned int | max_nregions | Region number of pixels (temporary) |
| sum_tmp | double | max_nregions* nbands | Region sum of normalized input data values in each band (temporary) |
| spatial_tmp | double | max_nregions | Region spatial data value (temporary) (only if spatial_wght > 0.0) |
| cv_data | float | max_nregions | Convergence criterion values |
| cv_tmp | float | max_nregions | Convergence criterion values (temporary) |

The above data arrays, except for rlblmap_prev, are only required when a task is performing a run of runtype=7. The data array rlblmap_prev is required when a task is performing runs of runtype=6, 8 or 9.

For level<=fnb_levels, the following data arrays are allocated:

| Data Array | Data Type | Size | To Contain: |
|---|---|---|---|
| first_col | unsigned short | nrows | First column of region label values |
| last_col | unsigned short | nrows | Last column of region label values |
| first_row | unsigned short | ncols | First row of region label values |
| last_row | unsigned short | ncols | Last row of region label values |

The above data arrays are required when a task is performing runs of runtype=1, 2 and 4.

The data arrays npix_data and sum_data are allocated for all recursion levels. If spatial_wght>0.0, the data arrays sumsq_data and spatial_data are also allocated for all recursion levels. However, for level<rnb_levels AND level==inb_levels, these data arrays are allocated in a special manner, along with an additional data array, nghbr_sub:

| Data Array | Data Type | Size | To Contain: |
|---|---|---|---|
| npix_data | unsigned int | factor* max_nregions | Region number of pixels |
| sum_data | double | factor* max_nregions* nbands | Region sum of normalized input data values in each spectral band |
| sumsq_data | double | factor* max_nregions* nbands | Region sum of the square of the normalized input data values in each band (if spatial_wght > 0.0) |
| spatial_data | double | factor* max_nregions | Region spatial feature value (if spatial_wght > 0.0) |
| nghbr_sub | unsigned char | (factor-1)* max_nregions$^2$ | Subset of region adjacency mask | where factor = (rnb_levels − inb_levels + 1).
For all other recursive levels, nghbr_sub is not allocated and the other data arrays (npix_data, sum_data, sumsq_data and spatial_data are declared with factor = 1. The nghbr_sub data array is required only for tasks performing runs of runtype = 1 and 2. The other data arrays are required when a task is performing runs of runtype = 1, 2 and 7.

For level<rnb_levels AND level>=fnb_levels, the following data arrays are allocated:

| Data Array | Data Type | Size | To Contain: |
|---|---|---|---|
| input_sub | unsigned short | ncols*nrows* nbands/factor | Subset of input image data |
| mask_sub | unsigned char | ncols*nrows/factor | Subset of input mask data (if any) |
| spatial_init_sub | float | ncols*nrows/factor | Subset of spatial feature data (if spatial_wght > 0.0) |
| rlblmap_sub | unsigned short | ncols*nrows/factor | Subset of region label map data | where factor = 2 if level == inb_levels and factor = 4 otherwise. These data arrays are required only when a task is performing runs of runtype = 1 and 2.

The following data arrays are allocated, as follows, for all levels of recursion:

| Data Array | Data Type | Size | To Contain: |
|---|---|---|---|
| rlabel_data | unsigned short | max_nregions | Region label values |
| relabel_list | unsigned short | 2*max_nregions | Region label relabelings (renumberings) |
| nghbr_mask | unsigned char | max_nregions$^2$ | Region adjacency mask |
| nghbr_tmp | unsigned char | max_nregions | Temporary region adjacency mask |
| rlblmap_4cols | unsigned short | 4*nrows | Selected four columns of region label map data |
| rlblmap_4rows | unsigned short | 4*ncols | Selected four rows of region label map data |
| region_store | reg_struct | max_nregions | Structure containing information about each region |
| region_list | reg_list | max_nregions + 1 | Structure for linking region_store structures together |

-continued

| Data Array | Data Type | Size | To Contain: |
|---|---|---|---|
| sort_store | reg_list | max_nregions | Structure for ordered linking of region_store structures |
| nbsort_store | reg_list | max_nregions | Structure for ordered linking of region_store structures |

All of the above data arrays are required when a task is performing runs of runtype=1 and 2. In addition, the relabel_list data array is required when a task is performing runs of runtype=6 and 7, and the rlblmap_4cols and rlblmap_4rows data arrays are required when a task is performing runs of runtype=4.

The reg_struct (REGION) and reg_list (R_LIST) structures are defined in the section of this document entitled, "IMPLEMENTING A RECURSIVE HIERARCHICAL SEGMENTATION ALGORITHM ON A COMPUTER." This related disclosure also details how the region_list structure array is initialized (by pointing to sequential elements of the region_store structure array).

From this point on, slave tasks running with different values of runtype perform different tasks. Slave tasks of runtype==1 or runtype==2 perform recursive hierarchical image segmentation on the portion of data input to the task, down to minregions number of regions. The main difference between these two runtypes is that runtype==1 also performs the final stage hierarchical image segmentation with convergence checking down to cvnbregs (usually 2 regions). The other difference is the a slave task of runtype==1 returns to the master task (part (ii) of the RHSEG implementation) and a slave task of runtype==2 returns to another slave task.

Slave tasks of runtype==4 pass back to the calling slave task the first and last rows and columns of the region label map from its section of data. This is needed to update the nghbr_mask for the newly adjoined sections of data when four sections of data are joined together for processing at the next lower level of recursion.

Slave tasks of runtype=6, 7, 8, 9 and 10 only get activated for tasks running at a recursive level equal to fnb_levels. Slave tasks of runtype==6 update the section of region label map stored by the task, based on a list of merges performed, relabel_list, that is sent from the calling task. Slave tasks of runtype==7 compute the contribution to the convergence criterion from the section of data held by the task, based on updated region information provided by the calling task (always slave task 0). Slave tasks of runtype=8 store the current values of the section of the region label map array, rlblmap_data, which is stored by the task, to the "previous" region label map array, rlblmap_prev (always called from slave task 0). Slave tasks of runtype=9 copy their section of rlblmap_prev array data to the calling task (always the master task), while slave tasks of runtype=10 copy their section of rlblmap_data array data to the calling task (always the master task).

The following sections give more a more detailed description of part (iii) of the RHSEG implementation for slave tasks of running with different values of runtype.

Slave tasks of runtype==1 or runtype==2 continue as follows: If level==inb_levels the task requests the input data (input_data, and if provided, mask data, rlblmap_data and spatial_init) from the master task. This input data is byte swapped as necessary.

If level==inb_levels==rnb_levels, the function region data_init( ) is called in exactly the same manner as it is called in the description of the HSEG main program in the section of this document entitled, "IMPLEMENTING A RECURSIVE HIERARCHICAL SEGMENTATION ALGORITHM ON A COMPUTER."

If level==inb_levels<rnb_levels, the function lrhseg( ) is called in exactly the same manner as it is called in the description of the RHSEG main program in the section of this document entitled, "IMPLEMENTING A RECURSIVE HIERARCHICAL SEGMENTATION ALGORITHM ON A COMPUTER."

If level<inb_levels, the slave ask requests four branch slave task IDs from the master task. Once these branch slave task IDs are received, the slave task calls the function call_recur2( ) with the following input variable and array data:

| | |
|---|---|
| ncols | An int variable containing the number of columns in the current section of input image data |
| nrows | An int variable containing the number of rows in the current section of input image data |
| level | An int variable containing the value of the current level of recursion |
| my_tid | An int variable containing the ID of the current slave task. |
| branch_tid | An int array containing the IDs of the four slave tasks that the current slave task will initiate in the function call_recur2( ). |
| slave_tid | An int array containing the IDs of all of the slave tasks. |
| old_first_sec | An int variable containing the section number of the first section to be processed by the current slave task |
| old_last_sec | An int variable containing the section number of the last section to be processed by the current slave task |
| task_sec | An int array containing the task IDs of the slave tasks processing each section of data in the final stage of RHSEG |

The global variables nbands, spatial_wght, inb_levels and fnb_levels are also used as inputs by call_recur2( ). Certain variables and arrays are output by call_recur2( ). They are as follows:

| | |
|---|---|
| nregions | An int variable containing the number of regions in the segmentation of the section of data processed. |
| input_data | An unsigned short array containing the current section of input image data |
| mask_data | An unsigned char array containing the current section of mask data (if any) |
| rlblmap_data | An unsigned short array containing the output region label map for the current section of data. This region label map specifies the spatial distribution of the regions. |
| spatial_init | A float array containing the current section of input spatial feature data (local image variance or standard deviation - if any) |
| npix_data | An unsigned int array containing the current region number of pixels list stored as a vector. The $j^{th}$ element of the vector is the number of pixels in region j + 1. |
| sum_data | A double array containing the current sum of the normalized input data values over all pixels in each region. Element j + nregions*b is the sum value for region j + 1 and band b (first band is band number 0). |

| | |
|---|---|
| sumsq_data | A double array containing the current sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the current region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating, for the current section of data, whether or not a pair of regions are spatially adjacent (i.e., neighbors). The value of the mask at array element j + max_nregions*k is TRUE if and only if regions j + 1 and k + 1 are spatially adjacent. |

Other data arrays are passed into call_recur2( ) for use as work space. These are input_sub, mask_sub, rlblmap_sub, spatial_init_sub, rlabel_data, and group_tid.

The purpose of the call_recur2( ) function is to initiate slave tasks for each quadrant. The results from each slave task are assembled together by call_recur2( ) and returned to the calling function. The internal operations of the function call_recur2( ) are described in a later section.

If level<rnb_levels, the neighbor mask, nghbr_mask, must be updated to account for neighbors across the seams of the data sections processed either by the branch slave tasks or the recursive calls in the function lrhseg( ). If level>=fnb_levels, the region labels at the pair of rows and columns adjacent to the seams of the quarters of the image processed by the branch slave task are read directly from the rlblmap_data array, which is present in the current slave task's memory. If level<fnb_levels, the required region labels must be propagated up from level=fnb_levels, where the region label map data is stored. This is done through a call to the function call_recur4( ), with the following input variables and array data:

| | |
|---|---|
| ncols | An int variable containing the number of columns in the current section of input image data |
| nrows | An int variable containing the number of rows in the current section of input image data |
| level | An int variable containing the value of the current level of recursion |
| my_tid | An int variable containing the ID of the current slave task. |
| branch_tid | An int array containing the IDs of the four slave tasks that the current slave task will initiate in the function call_recur4( ). |
| first_sec | An int variable containing the section number of the first section to be processed by the current slave task |
| last_sec | An int variable containing the section number of the last section to be processed by the current slave task |

Other data arrays are passed into call_recur4( ) for use as work space. These are first_col, last_col, first_row, and last_row. Prior to the call to call_recur4( ), the values of first_sec and last_sec must be adjusted so that they are based on fnb_levels rather than inb_levels. This is done in "C" code as follows:

```
cur_nb_secs = last_sec - first_sec + 1;
for (index = fnb_levels; index < inb_levels; index++)
{
    cur_nb_secs /= 4;
    first sec /= 4;
}
last_sec = first_sec + cur_nb_secs - 1;
```

If level>=fnb_levels (where call_recur4( ) is not called), the values of first_sec and last_sec must also be adjusted. In this case this adjustment is based on the current recursive level, level, rather that inb_levels or fnb_levels. This is done in "C" code as follows:

```
cur_nb_secs = last_sec - first_sec + 1;
for (index = level; index < inb_levels; index++)
{
    cur_nb_secs /= 4;
    first_sec /= 4;
}
last_sec = first_sec + cur_nb_secs - 1;
```

Back to the level<fnb_levels case, the following data arrays are output by call_recur4( ):

| | |
|---|---|
| rlblmap_4cols | An unsigned short array containing the first, last and middle two columns of region label map data for the current section of data. |
| rlblmap_4rows | An unsigned short array containing the first, last and middle two rows of region label map data for the current section of data. |

The functional description of call_recur4( ) is given in a later section.

In all cases for level<rnb_levels, the array rlblmap_4cols contains the first, middle two and last columns from rlblmap_data, and the array rlblmap_4rows contains the first, middle two and last rows from rlblmap_data. The function update_nghbr_mask( ) is now called in exactly the same manner as it is called in the section of this document entitled, "IMPLEMENTING A RECURSIVE HIERARCHICAL SEGMENTATION ALGORITHM ON A COMPUTER." In this call to update_nghbr_mask( ), the middle two rows and columns in rlblmap_4cols and rlblmap_4rows is used to modify the neighbor mask, ngbr_mask, to reflect the neighborhood relationships across the seams of the four sections of data assembled together to form the current of data being processed. The functional description of update_nghbr_mask( ) is given in the section of this document entitled, "IMPLEMENTING A RECURSIVE HIERARCHICAL SEGMENTATION ALGORITHM ON A COMPUTER."

The function region_list_init( ) is now called to initialize the region_list structure. This call is made in the same manner as it is called in the description of the RHSEG main program in section of this document entitled, "IMPLEMENTING A RECURSIVE HIERARCHICAL SEGMENTATION ALGORITHM ON A COMPUTER." The functional description of region_list_init( ) is also given in the section of this document entitled, "IMPLEMENTING A RECURSIVE HIERARCHICAL SEGMENTATION ALGORITHM ON A COMPUTER."

After the call to region_list_init( ) is completed, the following parameters are set: init_flg=TRUE and onregions=nregions. If runtype==1, cvnbregs is set to chkregions and if runtype==2, cvnbregs is set to minregions (note that chkregions and minregions are user set parameters). The program now proceeds in the same manner as in the description of the HSEG main program in the section of this document entitled, "IMPLEMENTING A RECURSIVE HIERARCHICAL SEGMENTATION ALGORITHM ON A COMPUTER" with calls to the functions lhseg( ) and read_region_list( ). If nregions<=chkregions, the calls to the functions lhseg( ) and read_region_list( ) are skipped and, if nregions>2 and runtype==1, the program proceeds to call the function phseg( ). The function lhseg( ) performs iterations of region growing and spectral clustering without convergence checking while the function phseg( ) performs iterations of region growing and spectral clustering with convergence checking. The functional description of lhseg( ) is given in the section of this document entitled, "IMPLEMENTING A RECURSIVE HIERARCHICAL SEGMENTATION ALGORITHM ON A COMPUTER," while the functional description of phseg( ) is given in a later section of the current document. Note that the variable init_flag is set to FALSE after the function lhseg( ) is called, if it is called.

If lhseg( ) and read region_list are called, the region label map, rlblmap_data must be updated to reflect the merges that occurred in lhseg( ). Note that the rlblmap_data array is NOT updated as the merges occur in the lhseg( ) function. Instead, a list of region label merge pairs is maintained from which the rlblmap_data is updated after the lhseg( ) function exits. If level>=fnb_levels, the rlblmap_data array is updated directly through a call to the function update_rlblmap( ) in the same manner as in the description of the HSEG main program in the section of this document entitled, "IMPLEMENTING A RECURSIVE HIERARCHICAL SEGMENTATION ALGORITHM ON A COMPUTER." If level<fnb_levels, this region label merge pairs list is sent to the underlying tasks at level=fnb_levels, through a runtype=6 call, and the rlblmap_data array is updated at that level. This is done with a call to the function call_runtype6( ) with the following input parameters and data arrays:

| | |
|---|---|
| first_sec | An int variable containing the section number of the first section to be processed by the current slave task |
| last_sec | An int variable containing the section number of the last section to be processed by the current slave task |
| task_sec | An int array containing the task IDs of the slave tasks processing each section of data in the final stage of RHSEG |
| my_tid | An int variable containing the ID of the current slave task. |
| slave_tid | An int array containing the IDs of all of the slave tasks. |
| nelements | An int variable containing the number of elements in the relabel_list array |
| relabel_list | An unsigned short array containing the list of pairs of region labels that were merged in the previous call to lhseg( ). |

The group_tid data array is passed into call_runtype6( ) for use as work space. There are no outputs from call_runtype6( ). The functional description of call_runtype6( ) is given in a later section.

The preceding has described the process followed by the slave tasks for runtype==1 or runtype==2. At this point the processing for these two runtypes diverges. For runtype==1, the following parameters are set: cvnbregs=2 and onregions=nregions. The slave task does not exit, but instead waits for additional processing requests. Then the function phseg( ) is called with the following parameters and array data:

| | |
|---|---|
| init_flag | An int variable which is TRUE if the region_list has just been initialized and FALSE otherwise. |
| ncols | An int variable containing the number of columns in the input image data |
| nrows | An int variable containing the number of rows in the input image data |
| onregions | An int variable containing the number of regions existing when lhseg( ) is initially called. |
| cvnbregs | An int variable indicating the number of regions at which that this call to fhseg( ) will converge (exit). |
| my_tid | An int variable containing the ID of the current slave task. |
| calling_tid | An int variable containing the ID of the task that called the current slave task |
| tot_nb_secs | An int variable containing the total number of sections the data is processed in at the recursive level fnb_levels. |
| slave_tid | An int array containing the IDs of all of the slave tasks. |
| task_sec | An int array containing the task IDs of the slave tasks processing each section of data in the final stage of RHSEG |
| rlabel_data | An unsigned short array containing the region label corresponding to the region for index j. This is initialized to be rlabel_data[j] = j + 1; |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables regmerges_flag, nbands, scale, offset, spclust_flag, spatial_wght, convfact, and max_nregions are also used as inputs to phseg( ). The arrays group_tid, relabel_list, sort_store, and nbsort_store as also passed to the phseg( ) functions for use as work space. The purpose of the phseg( ) function is to perform multiple iterations of region growing intermixed with spectral clustering (if requested) until the number of regions becomes less than or equal to cvnbregs (in this case, 2), and output segmentation results when natural convergence points are detected. See a later section for a functional description of the phseg( ) function.

For runtype==2, and different process is followed. Here, the current values of nregions, npix_data, sum_data, and nghbr_mask are sent back to the calling slave task. If spatial_wght>0.0, the current values of spatial_data and sumsq_data are also sent. In addition, if level>fnb_levels, the current values of input_data, and rlblmap_data are also sent. Further, if level>fnb_levels and mask_flag==TRUE, the current values for mask_data are sent and if level>fnb_levels and spatial_wght>0.0, the current values for spatial_init are sent. The slave task does not exit, but instead waits for additional processing requests.

This concludes the description of the slave task processing for runtype==1 or runtype==2. The initial processing request for all slave tasks is of runtype==1 or 2. All slave tasks at recursion level<=fnb_levels receive additional processing requests with other values for runtype. (Slave tasks at level>fnb_levels could exit after the initial processing request, but this is not done in the current version.)

Slave tasks running at 1<level<=fnb_levels will get called with runtype==4. A runtype==4 slave task determines the region label map data in the first and last columns and the first and last rows of the section of data processed by the task (first_col, last_col, first_row, and last_row) and sends this information back to the calling task. If level==fnb_levels, first_col, last_col, first_row, and last_row are determined directly from the rlblmap_data array, which is contained in memory at this level. If level<fnb_levels, first_col, last_col, first_row, and last_row are determined from rlblmap_4cols, and rlblmap_4rows obtained through a call to call_recur4( ) with the following input variables and data arrays:

| | |
|---|---|
| ncols | An int variable containing the number of columns in the current section of input image data |
| nrows | An int variable containing the number of rows in the current section of input image data |
| level | An int variable containing the value of the current level of recursion |
| my_tid | An int variable containing the ID of the current slave task. |
| branch_tid | An int array containing the IDs of the four slave tasks that the current slave task will initiate in the function call_recur4( ). |
| first_sec | An int variable containing the section number of the first section to be processed by the current slave task |
| last_sec | An int variable containing the section number of the last section to be processed by the current slave task |

Other data arrays are passed into call_recur4( ) for use as work space. These are first_col, last_col, first_row, and last_row. The following data arrays are output by call_recur4( ):

| | |
|---|---|
| rlblmap_4cols | An unsigned short array containing the first, last and middle two columns of region label map data for the current section of data. |
| rlblmap_4rows | An unsigned short array containing the first, last and middle two rows of region label map data for the current section of data. |

The functional description of call_recur4( ) is given in a later section.

Slave tasks running at level==fnb_levels will get called with runtype==6. A runtype==6 updates the region label map data for the section of data processed by this task. After receiving the update information from the calling task (nelements and relabel_list) the region label map is updated through a call to the function update_rlblmap( ). A description of the calling of update_rlblmap( ) and a functional description of this function is given in the section of this document entitled, "IMPLEMENTING A RECURSIVE HIERARCHICAL SEGMENTATION ALGORITHM ON A COMPUTER."

Slave tasks running at level==fnb_levels will also get called with runtype==7. A runtype==7 computes the contribution to the global convergence criterion from the section of data processed by the task. The first runtype==7 call to each task must provide a full update of the npix_data, sum_data and if spatial_wght>0.0, the spatial_data arrays. Subsequent calls need only update these arrays with any data that changed from the previous call, and also update the rlblmap_data array in a manner similar to that used under runtype==6. Once the data arrays are initialized or updated, the slave task scans through each data point in the section of data processed by the task, accumulating into the cv_data array the value of the global convergence criterion for the processed section of data. If this is the initial run of runtype==7, the cv_data array is computed for all regions and sent back to the calling task. If this is a subsequent run of runtype==7, the cv_data array is computed only for those regions that changed since the previous runtype==7 call, and only those elements of the cv_data array are sent back to the calling task.

Slave tasks running at level==fnb_levels will also get called with runtype==8, 9 and 10. These tasks are very simple. For runtype==8, the rlblmap_prev array is update to equal the current value of the rlblmap_data array. For runtype==9, the rlblmap_prev array is sent to the calling task (always the master task), and for runtype ==10, the rlblmap_data array is sent to the calling task (always the master task).

Functional description of the function call_recur2( ): The function call_recur2( ) first determines task specific parameters it will send to each slave branch task, namely:

| | |
|---|---|
| runtype | branch slave task run type (equal to "2" in this case) |
| first_sec | first section to be processed by branch slave task |
| last_sec | last section to be processed by branch slave task |
| calling_tid | current task ID |
| level | current level of recursion + 1 |
| ncols | number of columns in section of data processed by branch slave task (equal to ½ of the number of columns processed by the current task) |
| nrows | number of rows in section of data processed by branch slave task (equal to ½ of the number of rows processed by the current task) |

The first and last sections to be processed by each branch slave task are determined as illustrated by the following "C" extracts:

```
/* Initiate processing of first subsection (of 4) */
nb_secs=old_last_sec-old_first_sec+1;
nb_secs=nb_secs/4;
first sec=old_first_sec;
last_sec=old_first_sec+nb_secs-1;
. . .
/* Initiate processing of second subsection (of 4) */
first_sec=old_first_sec+nb_secs;
last_sec=old_first_sec+2*nb_secs-1;
. . .
/* Initiate processing of third subsection (of 4) */
``` first_sec=old_first_sec+2*nb_secs;
last_sec=old_first_sec+3*nb_secs−1;
/* Initiate processing of fourth subsection (of 4) */
first_sec=old_first_sec+3*nb_secs;
last_sec=old_first_sec+4*nb_secs−1;
where "old_first_sec" and "old_last_sec" are the current ("old") first section and last sections, respectively. After all four branch slave tasks are initiated through the sending of the task specific parameters to each branch slave task, the slave task waits for the first branch slave task to complete.

Certain region parameters, arrays and vectors are produced by each of the slave tasks by combining the results produced by the four branch slave tasks. They are as follows:

| | |
|---|---|
| nregions | the number of regions in the section of data processed. |
| rlblmap_data | an array of numbers specifying the spatial distribution of the regions (data type unsigned short). |
| npix_data | the region number of pixels list stored as a vector. The $j^{th}$ element of the vector is the number of pixels in region j + 1 (data type unsigned int). |
| sum_data | a vector containing the sum of the normalized input data values over all pixels in each region. Element j + nregions*b is the sum value for region j + 1 and band b (first band is band number 0) (data type double). |
| nghbr_mask | an array of numbers designating whether or not a pair of regions are spatially adjacent (i.e., neighbors). The value of the mask at array element j + max_nregions*k is TRUE if and only if regions j + 1 and k + 1 are spatially adjacent (data type unsigned char). |
| spatial_data | the region spatial feature value list stored as a vector. The $j^{th}$ element of the vector is the spatial feature value for region j + 1 (data type double). |
| sumsq_data | a vector containing the sum of the square of the normalized input data values over al pixels in each region. Element j + nregions*b is the sum square value for region j + 1 and band b (first band is band number 0) (data type double). |

The slave task now waits for each branch slave task to complete in turn (branch slave tasks t=0 through t=3 in numerical order.) When the $t^{th}$ branch slave task completes, the slave task receives the number of regions (sub_nregions[t]) resulting from processing the $t^{th}$ branch slave task's data sections with the RHSEG algorithm. If sub_nregions[t]>0, the slave task receives the region parameters npix_sub, sum_sub and nghbr_sub (and if spatial_wght>0, also spatial_sub and sumsq_sub) for the subsection of data processed. If sub_nregions[t]>0 and level>=fnb_levels, the slave task also receives the input data, input_sub (and also the input mask data, mask_sub, if mask_flag==TRUE, and the input spatial feature data, spatial_init_sub, if spatial_wght>0.0), and the region label map result, rlblmap_sub for the subsection of data processed.

The data output from each branch slave task must be combined appropriately to form the input data for the calling slave task's eventual running of the HSEG algorithm. If level>=fnb_levels, the calling slave task array rlblmap_data is formed from the rlblmap_sub arrays by using the array offsets sub_coff=0 and sub_roff=0 for t=0, sub_coff=ncols and sub_roff=0 for t=1, sub_coff=0 and sub_roff=nrows for t=2, and sub_coff=ncols and sub_roff=nrows for t=3, where ncols and nrows are the number of columns and rows, respectively, processed by each branch slave task. For branch slave tasks t=1 through t=3, the rlblmap_data values are also offset by the value from the values in rlblmap_sub by the value sum_nregions[t−1], where $$\text{sum\_nregions}[t] = \sum_{\tau=0}^{t} \text{sum\_nregions}[\tau].$$

This region label offset is applied to differentiate region j from branch slave task t from region j in branch slave task t', where t≠t'. If the branch slave task data outputs input_sub, mask_sub and spatial_init_sub are received, these data are placed with the same spatial offsets into the calling slave task data arrays input_data, mask_data and spatial_init, but with no offset in data value.

If level<=fnb_levels and branch slave task t>0, calls of runtype=6 are made to the tasks at level=fnb_levels, that are under the calling slave task in the recursive tree, that causes the rlblmap_data data values stored by those slave tasks to be offset by the value sum_nregions[t−1]. These calls of runtype==6 are made through the function call_runtype6( ). However, before these calls can be made, the values of "old_first_sec", "old_last_sec" and "nb_secs" must be adjusted to be based on fnb_levels rather than inb_levels. This is done through the following "C" code extract:

```
if (level <= fnb_levels)
{
/* Adjust old_first_sec, old_last_sec and nb_secs */
  nb_secs = old_last_sec − old_first_sec + 1;
  for (index = fnb_levels; index < inb_levels; index ++)
  {
    nb_secs /= 4;
    old_first_sec /= 4;
  }
  old_last_sec = old_first_sec + nb_secs − 1;
  nb_secs /= 4;
}
```

Then calls to call_runtype6( ) are made with the following parameters:

| | |
|---|---|
| first_sec | An int variable containing the section number of the first section to be processed |
| last_sec | An int variable containing the section number of the last section to be processed |
| task_sec | An int array containing the task IDs of the slave tasks processing each section of data in the final stage of RHSEG |
| my_tid | An int variable containing the ID of the current slave task. |
| slave_tid | An int array containing the IDs of all of the slave tasks. |
| nelements | An int variable containing the number of elements in the relabel_list array. Equal to "1" in this case. |
| relabel_list | An unsigned short array containing one element equal to the offset to be added to the rlblmap_data array. |

In the above calls to call_runtype6( ), first_sec and last_sec must be specified differently for each value of t. For t=0, a call to call_runtype6( ) is not required. For t=1, first_sec=old_first_sec+nb_secs and last_sec=old_first_sec+2*nb_secs−1. For t=2, first_sec=old_first_sec+2*nb_secs and last_sec=old_first_sec+3*nb_secs−1. For t=3, first_sec=old_first_sec+3*nb_secs and last_sec=old_first_sec+4*nb_secs−1. The group_tid data array is passed into call_runtype6( ) for use as work space. There are no outputs from call runtype6( ). The functional description of call_runtype6( ) is given in a later section.

For the first branch slave task (t=0), the data from npix_sub, and sum_sub (along with spatial_sub and sumsq_sub if spatial_wght>0) are simply placed in the storage locations for npix_data and sum_data (and for spatial_data and sumsq_data if spatial_wght>0). For branch slave task t=1 through 3, the data from npix_sub, and sum_sub (along with spatial_sub and sumsq_sub if spatial_wght>0) are placed in the storage locations npix_data[sum_nregions[t−1]] and sum_data[sum_nregions[t−1]*nbands] (and at spatial_data[sum_nregions[t−1]] and sumsq_data[sum_nregions[t−1]*nbands] if spatial_wght>0). Thus, for these output data from the branch slave tasks the data is simply concatenated together to form the input data for the calling slave task.

The calling slave task input data nghbr_mask is also formed by concatenation of the branch slave task output data nghbr_sub, but in a manner that takes into account the region label data value offset that was applied.

The calling slave task's initial number regions is $$nregions = \sum_{\tau=0}^{3} sub\_nregions[\tau].$$

Functional description of the function call_recur4( ): The recursive call of runtype=4 is initiated in a manner similar to that used for runtype=1 or runtype=2. The task specific parameters for each branch slave task are the same, except that runtype=4. After the recursive runtype=4 are made to the four branch slave tasks, the slave task waits for each branch slave task to complete in turn (branch slave tasks t=0 through t=3 in numerical order). When the $t^{th}$ branch slave task completes, the slave task receives the region label data from the first and last columns and rows of the branch slave task. This data is loaded into arrays that, when the data from all branch slave tasks is received, will contain the region label data from the first, last and middle two columns and rows of the region label data for the section of the image covered by the slave task.

Functional description of the function call_runtype6( ): The function call_runtype6( ) is constructed differently than the functions call_recur2( ) or call_recur4( ). While call_recur2( ) and call_recur4( ) initiate recursive calls to 4 branch slave tasks, call_runtype6( ) initiates a non-recursive call directly to all slave tasks at level=fnb_levels under the current task in the recursive tree used by call_recur2( ) and call_recur4( ). Included in the inputs to call_runtype6( ) are the task_sec array, which contains the correspondence between sections and tasks, and slave_tid array, which contains the correspondence between tasks and process task IDs. Using information from these two arrays, calls of runtype==6 are made to the slave tasks that hold the data corresponding to the appropriate sections. The group_tid array is constructed to contain the process task IDs of these slave tasks, and the nelements parameter and the relabel_list array is broadcast to each of these slave tasks. Finally, call_runtype6( ) returns to the calling function after waiting for each task to report back that it has finished the task of updating the rlblmap_data array for its section of data.

Functional description of the function phseg( ): Finally, we now describe the phseg( ) subroutine that implements the HSEG algorithm for the case when the global convergence criterion values IS calculated. The phseg( ) subroutine is identical to the lhseg( ) function except for the added code we discuss below (for a description of the lhseg( ) function see the section of this document entitled, "IMPLEMENTING A RECURSIVE HIERARCHICAL SEGMENTATION ALGORITHM ON A COMPUTER.") Also, phseg( ) terminates when the number of region (nregions) is less than or equal to cvnbregs (normally equal to 2). Note also that phseg( ) is not called until the number of regions is less than or equal to chkregions.

In Section I, part B the basic HSEG algorithm was described. In step 7, it was noted that at certain iterations, the region information from the previous iteration must be saved. Accordingly, phseg( ) allocates and initializes and updates data arrays to store this information. The data array rlblmap_prev is initialized and updated through runtype=8 calls to the tasks at level=fnb_levels, as that is where the rlblmap_data array is maintained. Also, prevcritval is initialized to 0.0, and the current value of the global criterion value, critval, is calculated through a runtype=7 call to the tasks at level=fnb_levels. This initial global criterion value is sent to the master program. (The runtype==7 and runtype==8 calls are performed through functions calls to the functions call_runtype7( ) and call_runtype8( ), respectively, in a similar manner as done for call_runtype6( ).)

In lhseg( ) the rlblmap_data is not updated. However, in phseg( ) the rlblmap_data is updated after each group of region growing and spectral clustering merges (steps 2 through 5 of the basic HSEG algorithm description in Section I, part B). In addition, the region number of pixels and region sum vectors are updated. If spatial_wght>0.0, the region sum square vectors and region spatial feature values are updated. This is all accomplished through a runtype=7 call to the tasks at level=fnb_levels. Returned from this call are the changes in the global criterion value for each changed region. This information is used to update the global criterion value, critval.

The value of cvratio=critval/prevcritval is now calculated. If cvratio>convfact, then the region information for the previous iteration (prior to the current group of region growing and spectral clustering merges) is sent to the master program. This information includes the number of regions, the region number of pixels list, the region mean vector list and the region criterion value list. (Upon receipt of this information, the master program requests the previous iteration region label map, rlblmap_prev, directly from the slave tasks at level=fnb_levels.)

At this point, phseg( ) finds the value of minbcomp in the same manner as lhseg( ) and initiates another iteration of region growing and spectral clustering.

After the number of regions reaches cvnbregs, after a set of spectral clustering merges, phseg( ) sends the region information for the current iteration to the master program. This information includes the number of regions, the region number of pixels list, the region mean vector list and the region criterion value list. Upon receipt of this information, the master program requests the current iteration region label map, rlblmap_data, directly from the slave tasks at level=fnb_levels.

Part (i) of the RHSEG program is written in the "C" programming language, compiled under the gcc version 2.8.1 compiler(since upgraded to version 2.95.2), under the Solaris 7 operating system (since upgraded to Solaris 8) on a SUN Workstation. However, this software should both compile and run using other "C" compilers under other UNIX-type operating systems, possibly with minor modifications.

Parts (ii) and (iii) of the RHSEG program are written in the "C" programming language, with additional function calls to routines available from the "PVM" software package. On the HIVE the program is compiled under the gcc version egcs-2.91.66 compiler, with PVM version 3.4.2, under RedHat LINUX operating system version 6.1 (since upgrade to version 6.2). On the Cray T3E the program is compiled under Cray Standard C Version 6.2.0.0, with PVM version 3.3.10 (Cray PVM for UNICOS Version 3.2.0.0), under the UNICOS version 10 operating system. However, this software should both compile and run using other "C" compilers under other UNIX-type operating systems, possibly with minor modifications. The most efficient running of parts (ii) and (iii) of the RHSEG program requires an appropriate number of processors depending on the size of the image being processed.

Although a few preferred embodiments of the present invention have been shown and described, it would be appreciated by those skilled in the art that changes may be made in these embodiments without departing from the principles and spirit of the invention, the scope of which is defined in the claims and their equivalents.

Implementing a Recursive Hierarchical Segmentation Algorityhm on a Computer

This section is provided to help enable a reader to implement a recursive algorithm on a computer. The description below does not discuss the parallel implementation, and is one example of a typical serial implementation of a recursive hierarchical segmentation algorithm.

The high-level description of the HSEG and RHSEG was provided earlier. The following full-description of the sequential version of the algorithm should be sufficient for duplication of the algorithm by individuals with adequate background in image processing and "C" language programming.

Both HSEG and RHSEG require the specification of the name of an input parameter file as a UNIX command line argument (fully qualified with path, if not in the local directory). This input parameter file must specify of a number of file names and several parameters. A user's guide-like description of these file names and parameters is given below. The detailed description of a parameter is omitted wherever it is identical to that given previously for the parallel implementation.

| input | (required input file) | Input image data file |
|---|---|---|
| mask | (optional input file) | Input data mask (default = {none}) |
| rlblmap_in | (optional input file) | Input region label map (default = {none}) |
| rlblmap | (required output file) | Output region label map data |
| rnpixlist | (required output file) | Output region number of pixels list |
| regmerges | (optional output file) | Output region merges list (default = {none}) |
| rmeanlist | (optional output file) | Output region mean list (default = {none}) |
| rcvlist | (optional output file) | Output region criterion value list (default = {none}) |
| oparam | (required output file) | Output parameter file |
| log_file | (required output file) | Output log file |
| ncols | (required integer) | Number of columns in input image data |
| nrows | (required integer) | Number of rows in input image data |
| nbands | (required integer) | Number of spectral bands in input image data |
| dtype | (required integer) | Data type of input image data dtype = 4 designates "unsigned char" dtype = 16 designates "unsigned short" |
| normind | (optional list selection) 1 "No Normalization", 2 "Normalize 3 "Normalize Bands Separately" | [default: 2 "Normalize Across Bands"] |
| maxmdir | (optional integer) | Value equals number of nearest neighbors (Permissible values: 4, 8, 12 or 20; default = 8) |
| simcrit | (optional list selection) 1 "1-Norm", 2 "2-Norm", 3 "Infinity Norm", | Dissimilarity criterion [default: 1 "1-Norm"] |
| extmean | (optional Boolean) | Flag for extracting mean (default = TRUE) |
| spclust | (optional Boolean) | Spectral clustering flag (default = TRUE) |
| spatial_wght | (optional float) | Weight for spatial feature (spatial_wght >= 0.0, default = 0.0) |
| spatial_type | (optional list selection) 1 "Variance", 2 "Standard Deviation" | Spatial feature type [default: 2 "Standard Deviation"] |
| rnb_levels | (optional integer) | Total number of recursive levels (only for RHSEG) (1 <= rnb_levels <= 9, default = 4) |
| minregions | (optional integer) | Number of regions for convergence in recursive stages (only for RHSEG) (2 <= minregions <= 4096, default = 384) |
| chkregions | (optional integer) | Number of regions at which convergence factor checking is initiated (2 <= chkregions <= 4096, default = 512) |
| convfact | (optional float) | Convergence factor (1 <= convfact <= 100, default = 1.01) |
| tmpdir | (optional string) | Path name to directory in which temporary files are to be stored (default = $TMPDIR) |
| tempfile | (optional string) | Prefix for temporary file names (default = HSEG######### for HSEG and RHSEG######## for RHSEG, where the # are random characters) |

Previous disclosures also did not reveal the variations on the dissimilarity criterion discussed above under the extmean, spatial_type and spatial_wght optional parameters. These dissimilarity criterion variations facilitate a more effective separation of regions of interest in certain Earth science applications.

An optional graphical user interface (GUI) program, implemented under the Khoros Pro 2000 Software Developer's Kit is available. This GUI program runs on any workstation running Unix or many of its variants. It creates the parameter file and the headerless binary input data files required by the HSEG and RHSEG programs. This GUI program is totally optional, as the parameter file and the headerless binary input data files required by HSEG and RHSEG can be created manually. The optional user interface and data reformatting program outputs the results in the form of Khoros data objects. These Khoros data objects can be input to separate programs for further analysis. This optional GUI program is not a part of this "Disclosure of Invention and New Technology."

Functional operation

The HSEG and RHSEG programs were implemented in "C" under the gcc version 2.8.1 compiler. They were developed under the Solaris 7 operating system on a SUN Workstation, but they should both compile and run with other "C" compilers and under other UNIX-type operating systems, possibly with minor modification.

In the this section, the HSEG and RHSEG programs main programs are described, followed by description of functions called by the HSEG and RHSEG main programs. RHSEG calls all the functions called by HSEG, but not vice versa.

Functional Description of the HSEG Main Program: The HSEG main program initially determines the name of the parameter file from the command line input, and reads in the parameters from the file using the function read_param( ). If a prefix for the temporary filenames in not provided in the parameter file, the program generates a character string to used at a prefix for file names for temporary files required by the program. The "C" library function tempnam( ) is used for this purpose. For the discussion below, this prefix is assumed to be "HSEG0000 ."

At this point the HSEG main program opens the log file and outputs to it the program parameters using the function print_param( ). The following parameters are declared as external variables, and can be utilized in the main program and any "C" functions called subsequently.

| | |
|---|---|
| inputf | A char array containing the name of the input image data file |
| maskf | A char array containing the name of the mask data file, if it exists. If no mask data file exists, maskf has the value "NULL." |
| rlblmap_inf | A char array containing the name of the input region label map data file, if it exists. If no mask data file exists, rlblmap_inf has the value "NULL." |
| rlblmapf | A char array containing the name of the output region label map data file. |
| rnpixlistf | A char array containing the name of the output region number of pixels list data file. |
| regmergesf | A char array containing the name of the output region merges list data file, if requested. If the output region merges list data file is not requested, regmergesf has the value "NULL." |
| rmeanlistf | A char array containing the name of the output region mean list data file, if requested. If the output region mean list data file is not requested, rmeanlistf has the value "NULL." |
| rcvlistf | A char array containing the name of the output region criterion value list data file, if requested. If the output region criterion value list data file is not requested, rcvlistf has the value "NULL." |
| oparamf | A char array containing the name of the output parameter file. |
| log_file | A char array containing the name of the output log file. |
| tmpdir | A char array containing the path name to the directory where temporary files are to be stored. |
| tempfile | A char array containing the prefix for temporary file names. |
| mask_flag | An int variable which has value TRUE if mask data exist (FALSE otherwise). |
| rlblmap_in_flag | An int variable which has value TRUE if input region label map data is given (FALSE otherwise). |

| | |
|---|---|
| regmerges_flag | An int variable which has value TRUE if the output region merges list is requested (FALSE otherwise). |
| rmeanlist_flag | An int variable which has value TRUE if the output region mean list is requested (FALSE otherwise). |
| rcvlist_flag | An int variable which has value TRUE if the output region criterion value list is requested (FALSE otherwise). |
| spclust_flag | An int variable that is TRUE if spectral clustering is to be performed (FALSE otherwise). |
| nbands | An int variable containing the number of spectral bands in the input image data. |
| dtype | An int variable containing an indicator of the data type of the input image data. (dtype == 4 designates unsigned char and dtype == 16 designates unsigned short). |
| maxmdir | An int variable containing the number of nearest neighbors considered. |
| normind | An int variable containing an indicator of the type of normalization requested. (normind == 1 designates "No Normalization," normind == 2 designates "Normalization Across Bands," and normind == 3 designates "Normalize Bands Separately"). |
| simcrit | An int variable indicating the dissimilarity criterion to be used. |
| extmean | An int variable that is TRUE if the vector mean is subtracted from the spectral vectors before the dissimilarity criterion is calculated, FALSE otherwise. |
| spatial_type | An int variable indicating the spatial feature type employed (1 => "Variance", and 2 => "Standard Deviation"). |
| chkregions | An int variable containing the number of regions at which convergence factor checking is initiated. |
| max_nregions | An int variable containing the maximum number of regions that will be encountered in processing the data. |
| spatial_wght | A float variable which contains the value of the weight for the spatial feature (a value of 0.0 indicates the spatial feature is not employed). |
| convfact | A float variable containing the value of the convergence factor for detecting natural convergence points. |
| scale | A float array containing the multispectral scale factor(s) for normalization. |
| offset | A float array containing multispectral offset factor(s) for normalization. |

The HSEG main program now allocates memory for the input_data array and, if necessary, for the mask_data and rlblmap_data arrays. These data arrays are declared and allocated as follows:

| Data Array | Data Type | Size | To Contain: |
|---|---|---|---|
| input_data | unsigned short | ncols*nrows*nbands | Input image data |
| mask_data | unsigned char | ncols*nrows | Input mask data (if any) |
| rlblmap_data | unsigned short | ncols*nrows | Input region label map data (if any) and output region label map data |

The HSEG main program then calls the read_data( ) function with the following input variables:

| | |
|---|---|
| proc_nsecs | An int variable containing the number of sections in which the input data is to be processed in memory. Since HSEG will always be used with relatively small data sets, this variable is set to "1". |
| ncols | An int variable containing the number of columns in the input image data. |
| nrows | An int variable containing the number of rows in the input image data. |
| pad_ncols | An int variable containing the number of columns in the padded input image data. Since padding is not required for HSEG, pad_ncols = ncols. |
| pad_nrows | An int variable containing the number of rows in the padded input image data. Since padding is not required for HSEG, pad_nrows = nrows. |

The global variables inputf, mask_flag, rlblmap_in_flag, nbands, dtype and spatial_wght are also used as inputs by read_data( ). The following arrays are output by read_data( ):

| | |
|---|---|
| input_data | An unsigned short array containing the input image data |
| mask_data | An unsigned char array containing the mask data (if any) |
| rlblmap_data | An unsigned short array containing the input region label map data (if any). |
| spatial_init | A float array containing the input spatial feature data (local image variance or standard deviation - if any). Since no spatial feature data has been generated at this point in the program, this is just a NULL array here. |

The purpose of the read_data( ) function is to read the input data into the allocated data arrays.

The HSEG main program next computes image statistics. If image normalization is requested, the image sum, sum of squares and minimum values in each band are computed, along with the number of image pixels. If image normalization is not requested, only the number of image pixels is found. If image normalization is requested, the sum_stat, sumsq_stat and min_stat arrays are declared and allocated as follows:

| Data Array | Data Type | Size | To Contain: |
|---|---|---|---|
| sum_stat | double | nbands | Sum of the input image data in each band |
| sumsq_stat | double | nbands | Sum of the squares of input image data in each band |
| min_stat | double | nbands | The minimum input image data value in each band |

If required, the sum_stat and sumsq_stat arrays are initialized to "0", and the min_stat array is initialized to "MAX-FLOAT" (the maximum floating point value on the system). Then the find_stats( ) function is called with the following parameters and array variables:

| | |
|---|---|
| input_data | An unsigned short array containing the input image data |
| mask_data | An unsigned char array containing the mask data (if any) |
| ncols | An int variable containing the number of columns in the input image data. |
| nrows | An int variable containing the number of rows in the input image data. |

The global variables mask_flag, nbands and normind are also used as inputs by find_stats( ). The following arrays are output by find_stats( ):

| | |
|---|---|
| sum_stat | A double array containing the sum of the (possibly masked) input image data in each band. |
| sumsq_stat | A double array containing the sum of square of the (possibly masked) input image data in each band. |
| min_stat | A double array containing the minimum value of the (possibly masked) input image data in each band. |

The number of input pixels, npixels, is returned as the value of the function find_stats( ). If image normalization is not requested, and no mask data is provided, the find_stats( ) function simply calculates the image number of pixels as ncols*nrows and returns. If image normalization is not requested, and mask data is provided, the find_stats( ) function finds the image number of pixels by counting the number of non-zero entries in mask_data and returns. If image normalization is requested, the function find_stats( ) scans through the input image data, taking the image masking in account if provided, and finds the sum, sum of squares and minimum data values for each band, along with the image number of pixels, and then returns.

The HSEG main program now allocates memory for the scale and offset arrays as follows:

| Data Array | Data Type | Size | To Contain: |
|---|---|---|---|
| scale | float | nbands | Scale factors for the input image data in each band |
| offset | float | nbands | Offset values for the input image data in each band |

If image normalization is not requested each element of the scale array is set to "1" and each element of the offset array is set to "0." If image normalization is requested, the find_scale_offset( ) function is called with the following parameter and array variables:

| | |
|---|---|
| npixels | An int variable containing the number of pixels in the input image data (after masking, if provided). |
| sum_stat | A double array containing the sum of the (possibly masked) input image data in each band. |
| sumsq_stat | A double array containing the sum of the squares of the (possibly masked) input image data in each band. |
| min_stat | A double array containing the minimum value of the (possibly masked) input image data in each band. |

The global parameters nbands and normind are also used as inputs to find_scale_offset( ). The find_scale_offset( ) function first computes the image variance, var_stat ($\sigma^2$), for each image band through the formula:

$$\sigma^2 = \left(ss - \frac{s^2}{N}\right) / (N-1) \quad (12)$$

where ss is sum of the squares of the data (sumsq_stat), s is the sum of the data (sum_stat) and N is the number of pixels in the data (npixels).

If normind==2 ("Normalize Across Bands") is chosen, the minimum of the band minimum value (min_stat) is set as the minimum for each band, and the maximum of the band variance value (var_stat) is set as the variance value for each band. Then the values for the scale and offset arrays are calculated such that the normalized image data will have unitary variance and minimum value of "2." (Minimum value of "2" is used rather than "0" because certain dissimilarity criterion require the computation of logarithms, which encounter computational difficulties for arguments near the value "1".) This is done for each band through the equations:

scale[band]=((float) (1.0/sqrt(var_stat[band]))); (13a)

offset[band]=((float) (2.0−(min_stat[band]/sqrt (var_stat[band])))); (13b)

(The normalized input image data is not calculated at this time.) The main outputs of the find_scale_offset( ) function are the scale and offset global array parameters, which are the factors required to normalize the input data as designated by the normind global parameter.

Next, the input variable spatial_wght is multiplied by nbands so that the spatial feature will have the same weighting and the spectral features when the initial input value of spatial_wght is 1.0. If spatial_wght>0.0, the spatial_init array and the following temporary arrays are allocated:

| Data Array | Data Type | Size | To Contain: |
|---|---|---|---|
| spatial_init | float | ncols*nrows | Spatial feature data (local image variance or standard deviation, if any) |
| input_sub | unsigned short | 3*ncols*nbands | Temporary array to buffer 3 lines of input data |
| mask_sub | unsigned char | 3*ncols | Temporary array to buffer 3 lines of mask data |
| spatial_init_sub | float | 3*ncols | Temporary array to buffer 3 lines of spatial feature data |

If spatial_wght>0.0, the maximum over spectral bands of the local spatial feature values over 3×3 pixel areas is now calculated by calling the function compute_spatial( ) with the following input arrays and parameters:

| | |
|---|---|
| input_data | An unsigned short array containing the input image data. |
| input_sub | An unsigned short array to buffer 3 lines of input image data. |
| mask_data | An unsigned char array containing the mask data (if any). |
| mask_sub | An unsigned char array to buffer 3 lines of mask data (if any). |
| init_flg | An int variable that is TRUE if this is the first section of data processed, and FALSE otherwise. TRUE in this case. |
| last_flg | An int variable that is TRUE if this is the last section of data processed, and FALSE otherwise. TRUE in this case. |
| ncols | An int variable containing the number of columns in the input image data. |
| maxrow | An int variable containing the number of rows processed in this section of the input image data. Equal to nrows in this case. |
| num_points | An int variable containing the size of data element offset between bands of input image data. Equal to ncols*nrows in this case. |

The global parameters mask_flag, nbands, scale, and offset are also used as inputs to compute_spatial( ). (The compute_spatial( ) function is designed to process the data in sections as required for large input data sets. Since practical processing times for HSEG and can only be obtained with small and moderately sized data sets, we assume the entire data is processed in one section in this case.) The following data array is output by compute_spatial( ):

| | |
|---|---|
| spatial_init | A float array containing the maximum over spectral bands of the spatial feature calculated over a 3 × 3 window |

Note that when mask_data is provided, the value of spatial_init is set equal to MAXFLOAT (the maximum floating point value) whenever ANY data point in the 3×3 window is masked out. Also, spatial_init is set equal to MAXFLOAT for the first and last data rows and columns.

If spatial_wght>0.0, the minimum over 3×3 pixel areas of maximum over spectral bands of the local spatial feature values over 3×3 pixel areas is found by calling the function find_min( ) with the following input arrays and parameters:

| | |
|---|---|
| spatial_init | A float array containing the maximum over spectral bands of the spatial feature calculated over a 3 × 3 window. |
| spatial_init_sub | An float array to buffer 3 lines of spatial feature data. |
| init_flg | An int variable that is TRUE if this is the first section of data processed, and FALSE otherwise. TRUE in this case. |
| last_flg | An int variable that is TRUE if this is the last section of data processed, and FALSE otherwise. TRUE in this case. |
| ncols | An int variable containing the number of columns in the input image data. |
| maxrow | An int variable containing the number of rows processed in this section of the input image data. Equal to nrows in this case. |

(The find_min( ) function is designed to process the data in sections as required for large input data sets. Since practical processing times for HSEG and can only be obtained with small and moderately sized data sets, we assume the entire data is processed in one section in this case.) The following data array is output by find_min( ):

| | |
|---|---|
| spatial_init | A float array containing the minimum over a 3 × 3 window of the maximum over spectral bands of the spatial feature calculated over a 3 × 3 window. |

The maximum number of regions, max_nregions, that will be encountered in processing any subsection of data is now computed as equal to ncols*nrows.

The HSEG main program continues by allocating various additional data arrays as listed below:

| Data Array | Data Type | Size | To Contain: |
|---|---|---|---|
| rlabel_data | unsigned short | max_nregions | Region label values |
| npix_data | unsigned int | max_nregions | Region number of pixels |
| sum_data | double | max_nregions*nbands | Region sum of normalized input data values in each spectral band |
| sumsq_data | double | max_nregions*nbands | Region sum of the square of the normalized input data values in each band (if spatial_wght > 0.0) |
| spatial_data | double | max_nregions | Region spatial feature value (if spatial_wght > 0.0) |
| nghbr_mask | unsigned char | max_nregions$^2$ | Region adjacency mask |
| nghbr_tmp | unsigned char | max_nregions | Temporary region adjacency mask |
| relabel_list | unsigned short | 2*max_nregions | Region label relabelings (renumberings) |
| region_store | reg_struct | max_nregions | Structure containing information about each region |
| region_list | reg_list | max_nregions + 1 | Structure for linking region_store structures together |
| sort_store | reg_list | max_nregions | Structure for ordered linking of region_store structures |
| nbsort_store | reg_list | max_nregions | Structure for ordered linking of region_store structures |

The reg_struct (REGION) and reg_list (R_LIST) structures listed above have the following declarations:

```
typedef struct REGION
{
    unsigned short         label;
    struct REGION          *bnghbr;
    float                  bncomp;
    struct REGION          *bregion;
    float                  brcomp;
    struct REGION          *mgreg;
} reg_struct;
typedef struct R_LIST
{
    struct REGION          *link;
    struct R_LIST          *next;
    unsigned char          active_flag;
} reg_list;
```

The members of the reg_struct (REGION) structure are:

| | |
|---|---|
| label | region label |
| bnghbr | pointer to structure containing information for the most similar neighboring region |
| bncomp | dissimilarity value between the region and the most similar neighboring region |
| bregion | pointer to structure containing information for the most similar non-neighboring region |
| brcomp | dissimilarity value between the region and the most similar non-neighboring region |
| mgreg | if the region was merged into another region, this is a pointer to the structure containing information for the region this region was merge with |

The members of the reg_list (R_LIST) structure are:

| | |
|---|---|
| link | pointer to REGION structure containing information for a particular region |
| next | pointer to R_LIST structure for next region in the list |
| active_flag | TRUE only if the R_LIST element is valid. |

Upon declaration, the link members of the region_list structure variable are initialized to point one after the other to the elements of the region_store structure (i.e., region_list[j].link=&region_store[j]), and the next members of the region_list structure variable are initialized to point to the next member of the region_list structure (i.e., region_list[j].next=&region_list[j+1]). The elements region_list[max_nregions].link and region_list[max_nregions].next are set to "NULL" initially. All of the active_flag members of region_list are set initially to "FALSE."

The function region_data_init( ) is now called with the following input variable and array data:

| | |
|---|---|
| input_data | An unsigned short array containing the input image data |
| mask_data | An unsigned char array containing the mask data (if any) |
| rlblmap_data | An unsigned short array containing the input region label map data (if any). (Will be overwritten by the output region label map data.) |
| spatial_init | A float array containing the input spatial feature data (local image variance or standard deviation - if any) |
| ncols | An int variable containing the number of columns in the input image data |
| nrows | An int variable containing the number of rows in the input image data |

The global variables mask_flag, rlblmap_in_flag, nbands, max_nregions, scale, offset, maxmdir, spatial_wght and spatial_type are also used as inputs by region_data_init( ). The following variables and arrays are output by region_data_init( ):

| | |
|---|---|
| nregions | An int variable containing the initial number of regions in the section of data processed. |
| rlblmap_data | An unsigned short array containing the initial output region label map. This region label map specifies the initial spatial distribution of the regions. |

-continued

| | |
|---|---|
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The array rlabel_data is also passed to the function region_data_init( ) for use as work space. See a later section for a functional description of the region_data_init( ) function. The purpose of the region_data_init( ) function is to initialize the variables and arrays output by the region_data_init( ) function based on the input variable and array data.

After the call to region_data_init( ) is completed, the following parameters are set: init_flg=TRUE, onregions= nregions (as output from region_data_init( )) and cvnbregs=chkregions (note that chkregions is a user set parameter). If nregions<=chkregions, the calls below to the functions lhseg( ) and read_region_list( ) are skipped and, if nregions>2, the program proceeds to call the function lhseg( ) (see below). Otherwise, call the function lhseg( ) with the following input variable and array data:

| | |
|---|---|
| init_flag | An int variable which indicates whether or not the region_list has just been initialized (in this case init_flag = TRUE). |
| onregions | An int variable containing the number of regions existing when lhseg( ) is initially called. |
| cvnbregs | An int variable indicating the number of regions at which that this call to lhseg( ) will converge (exit). |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables nbands, max_nregions, simcrit, extmean, spclust, spatial_wght, and spatial_type are also used as inputs to lhseg( ). The following variables and arrays are modified and output by lhseg( ):

| | |
|---|---|
| nregions | An int variable containing the number of regions in the section of data processed. |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The arrays sort_store, and nbsort_store are also passed to the lhseg( ) function to use as work space. See a later section for a functional description of the lhseg( ) function. The purpose of the lhseg( ) function is to perform multiple iterations of region growing intermixed with spectral clustering (if requested) until the number of regions becomes less than or equal to cvnbregs (in this case, chkregions).

After the lhseg( ) function exits, the parameter init_flg is set to FALSE, and the function read_region_list( ) is called with the following input variable and array data:

| | |
|---|---|
| nregions | An int variable containing the number of regions in the section of data processed. |
| npix_data | An unsigned int array containing the region number of pixels list stored as a vector. The $j^{th}$ element of the vector is the number of pixels in region j + 1. |

-continued

| | |
|---|---|
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables nbands, max_regions and spatial_wght are also used as input by read_region_list( ). The following variables and arrays are modified and/or output by read_region_list( ):

| | |
|---|---|
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |
| relabel_list | An unsigned short array consisting of pairs of region labelings representing a renumbering of the region map labeling. |

The array nghbr_tmp is also passed to the read_region_list( ) function for use as work space. The read_region_list( ) function finds a renumbering (relabel_list) of the current region map labeling into the smallest possible range of labels starting at label "1," and adjusts the various data arrays and structures accordingly (npix_data, sum_data, nghbr_mask, region_list, and, if necessary, sumsq_data and spatial_data).

After the read_region_list( ) function exits, the variable nelements is found as the number of non-zero elements in the relabel_list array output by read_region_list( ), and the function update_rlblmap( ) is called with the following input variable and array data:

| | |
|---|---|
| ncols | An int variable containing the number of columns in the input image data |
| nrows | An int variable containing the number of rows in the input image data |
| nelements | An int variable containing the number of non-zero elements in the relabel_list array |
| relabel_list | An unsigned short array consisting of pairs of region labelings representing a renumbering of the region map labeling. |
| rlblmap_data | An unsigned short array containing the region label map data as it existed prior to the call to lhseg( ). |

The following data array is modified by update_rlblmap( ):

| | |
|---|---|
| rlblmap_data | An unsigned short array containing the region label map data renumbered according to relabel_list. |

The update_rlblmap( ) function renumbers the rlblmap_data array according to the input relabel_list array. This updates the rlblmap_data to reflect the merges performed by the call to lhseg( ) and the compacting of the region labeling representation performed by the function read_region_list( ).

After update_rlblmap( ) exits, the variable cvnbregs is set equal to 2. Then if cvnbregs>nregions, the function fhseg( ) is called with the following input variable and array data:

| | |
|---|---|
| init_flag | An int variable which is TRUE if the region_list has just been initialized and FALSE otherwise. |
| input_data | An unsigned short array containing the input image data |
| mask_data | An unsigned char array containing the mask data (if any) |
| rlblmap_data | An unsigned short array containing the region label map. This region label map specifies the initial spatial distribution of the regions. |
| spatial_init | A float array containing the input spatial feature data (local image variance or standard deviation - if any) |
| ncols | An int variable containing the number of columns in the input image data |
| nrows | An int variable containing the number of rows in the input image data |
| onregions | An int variable containing the number of regions existing when lhseg( ) is initially called. |
| cvnbregs | An int variable indicating the number of regions at which that this call to fhseg( ) will converge (exit). |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |

-continued

| | |
|---|---|
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables mask_flag, regmerges_flag, nbands, scale, offset, simcrit, extmean, spclust, spatial_wght, spatial_type, convfact, max_regions, tmpdir and tempfile are also used as inputs to fhseg( ). The following variable is returned by fhseg( ):

| | |
|---|---|
| nslevels | An int variable containing the number of hierarchical segmentation levels found by the fhseg( ) function. |

The arrays rlabel_data, sort_store, and nbsort_store as also passed to the fhseg( ) functions for use as work space. The fhseg( ) function also outputs data to a number of files. These data output are the region number of pixels list (npix_data), the region means list, the region criterion value list, and, if requested, the region merges list for the iterations corresponding to the detected natural convergence points. If the region merges list is requested, the region label map data (rlblmap_data) is output only for the first detected natural convergence point. Otherwise the region label map data is output for all the detected natural convergence points.

See a later section for a functional description of the fhseg( ) function. The purpose of the fhseg( ) function is to perform multiple iterations of region growing intermixed with spectral clustering (if requested) until the number of regions becomes less than or equal to cvnbregs (in this case, 2), and output segmentation results when natural convergence points are detected.

The HSEG main program is now nearly finished. After the fhseg( ) function exits, the program writes into a output parameter file, HSEG0000.oparam, the number of hierarchical segmentation levels, nslevels, and the number of regions that existed prior to the call to the fhseg( ) function. These are the values that define the dimensions of the output files. Finally, the output files rlblmap, rnpixlist, regmerges (if requested), rmeanlist (if requested), and rcvlist (if requested) are created by concatenating together the corresponding output files from fhseg( ) for all the hierarchical segmentation levels. The output log_file is now closed and the program exits.

Functional Description of the RHSEG Main Program: The RHSEG main program initially determines the name of the parameter file from the command line input, and reads in the parameters from the file using the function read_param( ). If a prefix for the temporary filenames in not provided in the parameter file, the program generates a character string to used at a prefix for file names for temporary files required by the program. The "C" library function "tempnam" is used for this purpose. For the discussion below, this prefix is assumed to be "RHSEG0000."

At this point the RHSEG main program opens the log file and outputs to it the program parameters using the function print_param( ). In addition to the parameters declared as external variables for the HSEG program, the following parameters as declared as external variables for the RHSEG program:

| | |
|---|---|
| rnb_levels | An int variable containing the total number of recursive levels to be utilized |
| minregions | An int variable containing the number of regions for convergence in the recursive stages |
| sub_ncols | An int variable containing the number of columns of input data to be processed at the highest level of recursion |
| sub_nrows | An int variable containing the number of rows of input data to be processed at the highest level of recursion |

The program next sets the number of columns (sub_ncols) and number of rows (sub_nrows) of the image data sections to be processed at the highest level of recursion, based on the value of rnb_levels. If the full image size (ncols by nrows) is not an integer multiple of sub_ncols by sub_nrows, the values of pad_ncols (>ncols) and pad_nrows (>nrows) are set to be the number of columns and rows the full image would have to have in order to be an integer multiple size of the subimage size at the highest level of recursion. If the image size is already an integer multiple size of the subimage size at the highest level or recursion, pad_ncols and pad_nrows are set to ncols and nrows, respectively. If sub_ncols=pad_ncols, this particular run of RHSEG degenerates to a run of HSEG (see above).

The RHSEG main program now continues in the same manner as the HSEG main program by reading in the input data. If an input data mask is not provided and ncols!=pad_ncols, the mask_data array is initialized to all "1's" (TRUE) for upper left ncols*nrows section of the array, and mask_flag is set to TRUE. If ncols!=pad_ncols, the mask_data array and all other input arrays are padded with "0" values for columns greater than ncols and rows greater than nrows.

The RHSEG main program continues on as in the HSEG main program by finding npixels and values for the scale and offset arrays with calls to the find_stats( ) and find_scale_offset( ) functions. If spatial_wght>0.0, calls are also made to the compute_spatial( ) and find_min( ) functions.

The maximum number of regions, max_nregions, that will be encountered in processing any subsection of data is now computed. This is the maximum of 4*minregions and sub_ncols*sub_nrows.

The various data arrays are now allocated as for the HSEG main program, except that pad_ncols and pad_nrows replaces ncols and nrows in the allocations. Also, the arrays npix_data, sum_data, sumsq_data, and spatial_data are allocated with size rnb_levels*max_nregions rather than just max_nregions. In the RHSEG main program, the following additional data arrays are allocated:

| Data Array | Data Type | Size | To Contain: |
|---|---|---|---|
| input_sub | unsigned short | (pad_ncols*pad_nrows*nbands)/2 | Subset of input image data |
| mask_sub | unsigned char | (pad_ncols*pad_nrows)/2 | Subset of input mask data (if any) |

-continued

| Data Array | Data Type | Size | To Contain: |
|---|---|---|---|
| rlblmap_sub | unsigned short | (pad_ncols*pad_nrows)/2 | Subset of input region label map data (if any) and output region label map data |
| spatial_init_sub | float | (pad_ncols*pad_nrows)/2 | Subset of input spatial feature data (local image variance or standard deviation, if any) |
| nghbr_sub | unsigned char | (rnb_levels − 1)* max_nregions$^2$ | Region adjacency mask at other levels of recursion |
| rlblmap_4cols | unsigned short | 4*pad_nrows | Selected four columns of region label map data |
| rlblmap_4rows | unsigned short | 4*pad_ncols | Selected four rows of region label map data |

The function lrhseg( ) is now called with the following input variable and array data:

| | |
|---|---|
| input_data | An unsigned short array containing the current section of input image data |
| mask_data | An unsigned char array containing the current section of mask data (if any) |
| rlblmap_data | An unsigned short array containing the current section of input region label map data (if any). (Will be overwritten by the output region label map data.) |
| spatial_init | A float array containing the current section of input spatial feature data (local image variance or standard deviation - if any) |
| ncols | An int variable containing the number of columns in the current section of input image data (initially pad_ncols) |
| nrows | An int variable containing the number of rows in the current section of input image data (initially pad_nrows) |
| level | An int variable containing the value of the current level of recursion (initially equal to 1) |

The global variables mask_flag, rlblmap_in_flag, nbands, sub_ncols, sub_nrows, max_nregions, scale, offset, maxmdir, simcrit, extmean, spclust, spatial_wght, spatial_type, rnb_levels and minregions are also used as inputs by lrhseg( ). Certain variables and arrays are output by lrhseg( ). They are as follows:

| | |
|---|---|
| nregions | An int variable containing the number of regions in the segmentation of the section of data processed. |
| rlblmap_data | An unsigned short array containing the output region label map for the current section of data. This region label map specifies the spatial distribution of the regions. |
| npix_data | An unsigned int array containing the current region number of pixels list stored as a vector. |

| | |
|---|---|
| | The j$^{th}$ element of the vector is the number of pixels in region j + 1. |
| sum_data | A double array containing the current sum of the normalized input data values over all pixels in each region. Element j + nregions*b is the sum value for region j + 1 and band b (first band is band number 0). |
| sumsq_data | A double array containing the current sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the current region spatial feature value list stored as a vector. (Actually contains values only if spatial_wght > 0.0.) The j$^{th}$ element of the vector is the spatial feature value for region j + 1. |
| nghbr_mask | An unsigned char array of numbers designating, for the current section of data, whether or not a pair of regions are spatially adjacent (i.e., neighbors). The value of the mask at array element j + max_nregions*k is TRUE if and only if regions j + 1 and k + 1 are spatially adjacent. |

Other data arrays are passed into lrhseg( ) for use as work space. These are input_sub, mask_sub, rlblmap_sub, spatial_init_sub, rlabel_data, region_list, relabel_list, nghbr_sub, nghbr_tmp, rlblmap_4cols, rlblmap_4 rows, sort_store and nbsort_store.

The purpose of the lrhseg( ) function is to divide up the input data into four equal quadrants and to call the function recur_hseg( ) for each quadrant. The results from recur_hseg( ) are assembled together by lrhseg( ) and returned to the calling function. The internal operations of the function lrhseg( ) are described in a later section.

The arrays rlblmap_4cols and rlblmap_4rows are now loaded with values from rlblmap_data . The array rlblmap_4cols contains the first, middle two and last columns from rlblmap_data, and the array rlblmap_4rows contains the first, middle two and last rows from rlblmap_data. The function update_nghbr_mask( ) is now called with the following input variables and data:

| | |
|---|---|
| ncols | An int variable containing the number of columns in the current section of input image data |
| nrows | An int variable containing the number of rows in the current section of input image data |
| nregions | An int variable containing the current value of the number of regions is the current section of segmented data |
| rlblmap_4cols | An unsigned short array containing the first, middle two and last columns of the current region label map data. |
| rlblmap_4rows | An unsigned short array containing the first, middle two and last rows of the current region label map data. |
| nghbr_mask | An unsigned char array of numbers designating, for the current section of data, whether or not a pair of regions are spatially adjacent (i.e., neighbors). The value of the mask at array element j + max_nregions*k is TRUE if and only if regions j + 1 and k + 1 are spatially adjacent. |

The function update_nghbr_mask( ) modifies the input nghbr_mask array so that it includes the neighbor relationship across the middle two columns and rows of the current region label map. The nghbr_mask array had been previously lacking this information. See a later section for a functional description of update_nghbr_mask( ).

The function region_list_init( ) is now called with the following input variable:

| nregions | An int variable containing the number of regions in the current section of segmented data |

The following data array is output by region_list_init( ):

| region_list | A reg_list (R_LIST) structure array pointing to a sequence of reg_struct (REGION) structure elements containing label and comparative information about each region. |

See a later section for a functional description of the region_list_init( ) function. The purpose of the region_list_init( ) function is to initialize the region_list structure.

After the call to region_list_list( ) is completed, the following parameters are set: init_flg=TRUE, onregions=nregions and cvnbregs=chkregions (note that chkregions is a user set parameter). As in the HSEG program, if nregions<=chkregions, the calls to the functions lhseg( ) and read_region_list( ) are skipped and, if nregions>2, the program proceeds to call the function fhseg( ). Otherwise, call the function lhseg( ) is called in exactly same manner it was called in the HSEG program. From this point the RHSEG program proceeds in exactly the same manner as the HSEG program.

Functional description of the region_data_init( ) function: The first operation performed by this function is to initialize the region label map, rlblmap_data. If input region label map data is provided, the maximum label, max_reglbl, in the input region label map data is found, and the elements of rlblmap_data with input value "0," that are at non-masked out locations (according to mask_data), are sequentially given unique labels higher than max_reglbl. The region label map is then renumbered so that the regions have unique labels running from 1 to nregions (the number of regions in this section of data). If input region label map data is not provided, each non-masked out location in rlblmap_data is given a unique label, running from 1 to nregions.

Next the first nregions elements of region_list, and the reg_struct structures linked to these elements of region_list, are initialized such that the active_flag is set to "TRUE," the label's run sequentially from 1 to nregions, the pointers bnghbr, bregion and mgreg are set to "NULL," and the values bncomp and brcomp are set to "MAXFLOAT" (the maximum floating point value). In addition, the first nregions elements of the npix_data (and spatial_data, if spatial_wght>0.0) array(s) are initialized to 0.0 and the first nregions of the nbands sum_data (and sumsq_data, if spatial_wght>0.0) array(s) are initialized to 0.0.

Next the npix_data, sum_data, spatial_data (if spatial_wght>0.0), and sumsq_data (if spatial_wght>0.0) are calculated by scanning through rlblmap_data, input_data, spatial_init (if spatial_wght>0.0) and mask_data (if provided). The value of npix_data[j] is the number of pixels in region j+1 and the value of sum data[b+j*nbands] is the sum of the normalized input data for band b and region j+1. If (spatial_wght>0.0), the value of spatial_data[j] is the sum of the input spatial_init values for region j+1 and the value of sumsq_data[b+j*nbands] is the sum of the squares of the normalized input data for band b and region j+1.

In the above initialization, if spatial_wght>0.0, spatial_data is set to be the sum of the input spatial_init values in each region. However, this is not the correct final value for spatial_data. If npix_data[j]≧9, spatial_data[j] should be the maximum over the spectral bands of the variance or standard deviation of region j+1, depending on the user specified value of the spatial_type flag. If npix_data[j]<9, spatial_data[j] should be a weighted average of the maximum over the spectral bands of the variance or standard deviation of region j+1 with the average spatial_init values for the pixels in the region.

For spatial_wght>0.0, npix_data[j]≧9, and spatial_type==1 ("Variance"), spatial_data[j] for region j+1 is calculated as follows (see also Equations (9) and (10) above):

$$\text{var\_data}[j] = \max_b \left\{ \frac{\text{sumsq\_data}[b+jB] - \dfrac{\text{sum\_data}[b+jB] * \text{sum\_data}[b+jB]}{\text{npix\_data}[j]}}{\text{npix\_data}[j] - 1} \right\} \quad (14)$$

where B is the number of spectral bands. If spatial_type==2 ("Standard Deviation"), the square root is taken before the band maximum is found. Note that Equation (14) is mathematically equivalent to the combination of Equations (9) and (10). For npix_data[j]==1, spatial_data[j] is set equal to the input spatial_init value for the pixel in question. For npix_data[j]>1 and npix_data[j]<9, spatial_data[j] is set equal to a weighted sum of the spatial_data[j] value calculated from Equation (14) and the average spatial_init values for the pixels in region j+1 as per Equation (11).

Finally, the ngbr_mask is initialized by scanning rlblmap_data. nghbr_mask [j+k*max_nregions] is set to the value TRUE (or 1) if and only if region j is a neighbor of region k. Whether of not a pixel is considered to be a neighbor of another pixel is determined by the value of maxmdir. If a pixel is one of the maxmdir nearest neighbors of another pixel, then it is a neighbor of that pixel.

Functional description of the lhseg( ) function: If init_flg TRUE upon entering the lhseg( ) function, the dissimilarity function values for all neighboring regions of each region are calculated, and bnghbr and bncomp are updated for each region. Then a sorted structure of type R_LIST, pointed to by the pointer head_nbsorted_list, is created such that is ordered by the value of bncomp. If there is more than one region with the same value of bncomp, the regions are secondarily ordered by region label value (lower to higher). The value of the variable minbcomp is set equal to the value of bncomp of the first element of this sorted list. If init_flg=FALSE upon entering the lhseg( ) function, the dissimilarity function values for all neighboring regions need not be calculated (they had been previously calculated), and sorted lists of type R_LIST, pointed to by the pointers head_nbsorted_list and head_sorted_list, are sorted by the value of bncomp and brcomp, respectively. When ties occur in the values of bncomp and brcomp, the regions are secondarily ordered by region label value (lower to higher).

Next the region pointed to by the head_nbsorted_list, and its most similar neighboring region, are merged. The merged region is given the label of the region with the lower valued label. The values for the new region in the npix_data, sum_data, and the nghbr_mask arrays are updated, as are the sumsq_data and spatial_data arrays, if necessary. The value of mgreg is updated for the region with the higher region label value. The list pointed to by the pointer head_nbsorted_list is resorted as necessary. If the region pointed to by the resorted head_nbsorted_list has bncomp<=minbcomp, the indicated regions are also merged. This continues until the region pointed to by the resorted head_nbsorted_list has bncomp>minbcomp. This constitutes an iteration of region growing.

If init_flg==TRUE, the dissimilarity function values for all non-neighboring regions of each region are now calculated, and bregion and breomp are updated for each region. Then a sorted structure of type R_LIST, pointed to by the pointer head_sorted_list, is created such that is ordered by the value of brcomp. If there is more than one region with the same value of brcomp, the regions are secondarily ordered by region label value (lower to higher). The value of init_flg is now set to FALSE. If init_flg was previously equal to FALSE, these dissimilarity function values were previously calculated and sorted.

If the region pointed to by the head_sorted_list, and its most similar neighboring region, are merged if its value of brcomp<minbcomp (minbcomp was obtained from the merges of neighboring regions). The merged region is given the label of the region with the lower valued label. The values for the new region in the npix_data, sum_data, and the nghbr_mask arrays are updated, as are the sumsq_data and spatial_data arrays, if necessary. The value of mgreg is updated for the region with the higher region label value. The lists pointed to by the pointer head_sorted_list and head_nbsorted_list are resorted as necessary. If the region pointed to by the resorted head_sorted_list has brcomp<=minbcomp, the indicated regions are also merged. This continues until the region pointed to by the resorted head_nbsorted_list has brcomp>minbcomp. This constitutes an iteration of spectral clustering.

If the current number of region (nregions) is less than cvnbregs, the lhseg( ) function exits. Otherwise, additional alternate iterations of region growing (based on bncomp and bnghbr) and spectral clustering (based on brcomp and bregion) are performed until nregions<=minregions. In these additional iterations, the exhaustive calculation of dissimilarity function values for neighboring and non-neighboring regions is not required, as these values are updated at each merge. Note that lhseg( ) does not exit if nregions<cvnbregs after a region growing iteration. The function can only exit after a spectral clustering iteration.

Functional description of the fhseg( ) function: The fhseg( ) function is identical to the lhseg( ) function except for additional code for detecting the natural convergence points and code to output the segmentation results at the natural convergence points.

The basic HSEG algorithm was described earlier in the description of the parallel implementation. In step 7, it was noted that at certain iterations, the region information from the previous iteration must be saved. Accordingly, fhseg( ) allocates and initializes and updates data arrays to store this information. The data array prev_rlblmap is initialized to equal the current value of rlblmap_data, and prevcritval is initialized to 0.0, and the current value of the global criterion value, critval, is calculated through a call to the function compute_cv( ).

In lhseg( ) the rlblmap_data is not updated. However, in f hseg( ) the rlblmap_data is updated after each group of region growing and spectral clustering merges (steps 2 through 5 of the basic HSEG algorithm description). In addition, the region number of pixels and region sum vectors are updated. If spatial_wght>0.0, the region sum square vectors and region spatial feature values are also updated.

After each region growing and spectral clustering (if requested) iteration, the value of cvratio=critval/prevcritval is calculated. If cvratio>convfact, then the region information for the previous iteration (prior to the current group of region growing and spectral clustering merges) is sent to files. This information includes the number of regions, the region number of pixels list, the region mean vector list and the region criterion value list, and, if requested, the region merges list. If the region merges list is not requested, the region label map is output each time. If the region merges list is requested, the region label map is output only the first time region information is output.

If after an iteration of spectral clustering merges, the number of regions is less than cvnbregs, the fhseg( ) function outputs the current region segmentation information to files and then exits.

Functional description of the lrhseg( ) function: Upon entering the lrhseg( ) function, the ncols and nrows variables are divided by 2 and the level variable is incremented by one. (This sets these variables to the proper values for the next set of recursive calls to recur_hseg( ), described below.) Then the nghbr_mask array is initialized to all FALSE values, and the npix_sub, sum_sub, sumsq_sub, and spatial_sub arrays are initialized to npix_data, sum_data, sumsq_data, and spatial_data, respectively. Next, the data array starting points for the next level of recursion are saved into "_sub_sub" arrays as follows:

```
input_sub_sub = input_sub + ncols*nrows*nbands;
if (mask_flag)
    mask_sub_sub = mask_sub + ncols*nrows;
if(spatial_wght > 0.0)
    spatial_init_sub_sub = spatial_init_sub + ncols*nrows;
rlblmap_sub_sub = rlblmap_sub + ncols*nrows;
nghbr_sub_sub = nghbr_sub + max_nregions*max_nregions;
```

Processing is now initiated for the first subsection of data (out of four). The data arrays input_sub, mask_sub (if provided), spatial_init_sub (if provided), and rlblmap_sub (if provided) and loaded with data from the upper left quadrant of the input data arrays input_data, mask_data, spatial_init, and rlblmap_data, respectively.

The function recur_hseg( ) is now called with the following input variable and array data:

| | |
|---|---|
| input_sub | An unsigned short array containing the current section of input image data. Is renamed input_data internal to recur_hseg( ). |
| mask_sub | An unsigned char array containing the current section of mask data (if any). Is renamed mask_data internal to recur_hseg( ). |
| rlblmap_sub | An unsigned short array containing the current section of input region label map data (if any). (Will be overwritten by the output region label map data.) Is renamed rlblmap_data internal to recur_hseg( ). |
| spatial_init_sub | A float array containing the current section of input spatial feature data (local image variance or standard deviation - if any). Is renamed spatial_init internal to recur_hseg( ). |
| ncols | An int variable containing the number of columns in the current section of input image data |
| nrows | An int variable containing the number of rows in the current section of input image data |
| level | An int variable containing the value of the current level of recursion |
| roffset | An int variable containing the offset value required for the region labels to keep them distinct from the region labels in the previous quarter(s) of data (for the first quarter, roffset = 0) |

The global variables mask_flag, rlblmap_in_flag, nbands, sub_ncols, sub_nrows, max_nregions, scale, offset, maxmdir, simcrit, extmean, spclust, spatial_wght, spatial_type, rnb_levels and minregions are also used as inputs by recur_hseg( ). Certain variables and arrays are output by recur_hseg( ). They are as follows:

| | |
|---|---|
| sub_nregions[q] | An int variable containing the number of regions in the segmentation of the section of data processed. (For the first quarter of data, q = 0.) |
| rlblmap_sub | An unsigned short array containing the output region label map for the current section of data. This region label map specifies the spatial distribution of the regions. |
| npix_sub | An unsigned int array containing the current region number of pixels list stored as a vector. The $j^{th}$ element of the vector is the number of pixels in region j + 1. |
| sum_sub | A double array containing the current sum of the normalized input data values over all pixels in each region. Element j + sub_nregions[q]*b is the sum value for region j + 1 and band b (first band is band number 0). |
| sumsq_sub | A double array containing the current sum of the square of the normalized input data values over all pixels in each region. (Actually contains values only if spatial_wght > 0.0.) Element j + sub_nregions[q]*b is the sum square value for region j + 1 and band b (first band is band number 0). |
| spatial_sub | A double array containing the current region spatial feature value list stored as a vector. (Actually contains values only if spatial_wght > 0.0.) The $j^{th}$ element of the vector is the spatial feature value for region j + 1. |
| nghbr_sub | An unsigned char array of numbers designating, for the current section of data, whether or not a pair of regions are spatially adjacent (i.e., neighbors). The value of the mask at array element j + max_nregions*k is TRUE if and only if regions j + 1 and k + 1 are spatially adjacent. |

Other data arrays are passed into recur_hseg( ) for use as work space. These are input_sub_sub, mask_sub_sub, rlblmap_sub_sub, spatial_init_sub_sub, rlabel_data, region_list, relabel_list, nghbr_sub_sub, nghbr_tmp, rlblmap_4cols, rlblmap_4rows, sort_store and nbsort_store. The arrays input_sub_sub, mask_sub_sub, rlblmap_sub_sub, spatial_init_sub_sub, and nghbr_sub_sub, are renamed to input_sub, mask_sub, rlblmap_sub, spatial_init_sub, and nghbr_sub internal to recur_hseg( ).

If level==rnb_levels, the function recur_hseg( ) performs hierarchical segmentation on the specified section of data. Otherwise, it makes a further recursive call to lrhseg( ), and then performs hierarchical segmentation on the resulting data. The internal operations of the function recur_hseg( ) are described in a later section.

The outputs from recur_hseg( are now translated into the data arrays for the current reassembled section of data. The nghbr_mask is updated as follows (for the first quarter of data, q=0 and roffset=0):

```
for (index = 0; index < sub_nregions[q]; index++)
    for (subindex = 0; subindex < sub_nregions[q]; subindex++)
        nghbr_mask[(index+roffset)*max_nregions + (subindex+
        roffset)] =
                nghbr_sub[index*max_nregions + subindex];
```

The rlblmap_sub data is also loaded into the upper left quarter of the rlblmap_data array. The npix_data, sum_data, sumsq_data and spatial_data, arrays are updated automatically by the way the npix_sub, sum_sub, sumsq_sub and spatial_sub arrays are specified.

Processing is now initiated for the second subsection of data (out of four). The data arrays input_sub, mask_sub (if provided), spatial_init sub (if provided), and rlblmap_sub (if provided) and loaded with data from the upper right quadrant of the input data arrays input_data, mask_data, spatial_init, and rlblmap_data, respectively, and the npix_sub, sum_sub, sumsq_sub, and spatial_sub arrays are incremented as follows (here q=0):

```
npix_sub += sub_nregions[q];
   sum_sub += sub_nregions[q]*nbands;
if (spatial_wght > 0.0)
{
sumsq_sub += sub_nregions[q]*nbands;
   spatial_sub += sub_nregions[q];
}
```

The function recur_hseg( ) is now called in the same manner as for the first quarter of data except that q=1 and roffset=sub_nregions[0].

The outputs from recur_hseg( ) are now translated into the data arrays for the current reassembled section of data. The nghbr_mask is updated as follows (for the second quarter of data, q=1 and roffset=sub_nregions[0]):

```
for (index = 0; index < sub_nregions[q]; index++)
    for (subindex = 0; subindex < sub_nregions[q]; subindex++)
        nghbr_mask[(index+roffset)*max_nregions + (subindex+
        roffset)] =
                nghbr_sub[index*max_nregions + subindex];
```

The rlblmap_sub data is also loaded into the upper right quarter of the rlblmap_data array. The npix_data, sum_data, sumsq_data and spatial_data, arrays are updated automatically by the way the npix_sub, sum_sub, sumsq_sub and spatial_sub arrays are specified.

Processing is now initiated for the third subsection of data (out of four). The data arrays input_sub, mask_sub (if provided), spatial_init_sub (if provided), and rlblmap_sub (if provided) and loaded with data from the lower left quadrant of the input data arrays input_data, mask_data, spatial_init, and rlblmap_data, respectively, and the npix_sub, sum_sub, sumsq_sub, and spatial_sub arrays are incremented as follows (here q=1):

```
npix_sub += sub_nregions[q];
sum_sub += sub_nregions[q]*nbands;
if (spatial_wght > 0.0)
{
  sumsq_sub += sub_nregions[q]*nbands;
  spatial_sub += sub_nregions[q];
}
```

The function recur_hseg( ) is now called in the same manner as for the first quarter of data except that q=2 and roffset=sub_nregions[0]+sub_nregions[1].

The outputs from recur_hseg( ) are now translated into the data arrays for the current reassembled section of data. The nghbr_mask is updated as follows (for the third quarter of data, q=2 and roffset=sub_nregions[0]+sub_nregions[1]):

```
for (index = 0; index < sub_nregions[q]; index++)
    for (subindex = 0; subindex < sub_nregions[q]; subindex++)
        nghbr_mask[(index+roffset)*max_nregions + (subindex+
            roffset)] =
                nghbr_sub[index*max_nregions + subindex];
```

The rlblmap_sub data is also loaded into the lower left quarter of the rlblmap_data array. The npix_data, sum_data, sumsq_data and spatial_data, arrays are updated automatically by the way the npix_sub, sum_sub, sumsq_sub and spatial_sub arrays are specified.

Processing is now initiated for the fourth subsection of data (out of four). The data arrays input_sub, mask_sub (if provided), spatial_init_sub (if provided), and rlblmap_sub (if provided) and loaded with data from the lower right quadrant of the input data arrays input_data, mask_data, spatial_init, and rlblmap_data, respectively, and the npix_sub, sum_sub, sumsq_sub, and spatial_sub arrays are incremented as follows (here q=2):

```
npix_sub += sub_nregions[q];      sum_sub +=
    sub_nregions[q]*nbands;
if (spatial_wght > 0.0)
{
    sumsq_sub += sub_nregions[q]*nbands;
    spatial_sub += sub_nregions[q];
}
```

The function recur_hseg( ) is now called in the same manner as for the first quarter of data except that q=3 and roffset=sub_nregions[0]+sub_nregions[1]+sub_nregion[2].

The outputs from recur_hseg( ) are now translated into the data arrays for the current reassembled section of data. The nghbr_mask is updated as follows (for the fourth quarter of data, q=3 and roffset=sub_nregions[0]+sub_nregions[1]+sub_nregion[2]):

```
for (index = 0; index < sub_nregions[q]; index++)
    for (subindex = 0; subindex < sub_nregions[q]; subindex++)
        nghbr_mask[(index+roffset)*max_nregions + (subindex+
            roffset)] =
                nghbr_sub[index*max_nregions + subindex];
```

The rlblmap_sub data is also loaded into the lower right quarter of the rlblmap_data array. The npix_data, sum_data, sumsq_data and spatial_data, arrays are updated automatically by the way the npix_sub, sum_sub, sumsq_sub and spatial_sub arrays are specified.

Finally, the function lrhseg( ) sets nregions=sub_nregions[0]+sub_nregions[1]+sub_nregions[2]+sub_nregions[3] and returns to the calling function.

Functional description of the recur_hseg( ) function: If level==rnb_levels, the function recur_hseg( ) calls the region_data_init( ) function with the following input variable and array data:

| | |
|---|---|
| input_data | An unsigned short array containing the current section of input image data |
| mask_data | An unsigned char array containing the current section mask data (if any) |
| rlblmap_data | An unsigned short array containing the current section of input region label map data (if any). (Will be overwritten by the output region label map data.) |
| spatial_init | A float array containing the current section of input spatial feature data (local image variance or standard deviation - if any) |
| ncols | An int variable containing the number of columns in the current section of input image data |
| nrows | An int variable containing the number of rows in the current section of input image data |

The global variables mask_flag, rlblmap_in_flag, nbands, max_nregions, scale, offset, maxmdir, spatial_wght and spatial_type are also used as inputs by region_data_init( ). The following variables and arrays are output by region_data_init( ):

| | |
|---|---|
| nregions | An int variable containing the initial number of regions in the current section of data. |
| rlblmap_data | An unsigned short array containing the initial output region label map for the current section of data. This region label map specifies the initial spatial distribution of the regions. |
| npix_data | An unsigned int array containing the initial region number of pixels list stored as a vector for the current section of data. The $j^{th}$ element of the vector is the number of pixels in region j + 1. |
| sum_data | A double array containing the initial sum of the normalized input data values over all pixels in each region for the current section of data. Element j + nregions*b is the sum value for region j + 1 and band b (first band is band number 0). |
| sumsq_data | A double array containing the initial sum of the square of the normalized input data values over all pixels in each region for the current section of data. (Actually contains values only if spatial_wght > 0.0.) Element j + nregions*b is the sum square value for region j + 1 and band b (first band is band number 0). |
| spatial_data | A double array containing the initial region spatial feature value list stored as a vector for the current section of data. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors) for the current section of data. The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region for the current section of data. |

The array rlabel_data is also passed to the function region_data_init( ) for use as work space. See above for a functional description of the region_data_init( ) function. The purpose of the region_data_init( ) function is to initialize the variables and arrays output by the region_data_init( ) function based on the input variable and array data.

The function lrhseg( ) is now called with the following input variable and array data:

| | |
|---|---|
| input_data | An unsigned short array containing the current section of input image data |
| mask_data | An unsigned char array containing the current section of mask data (if any) |

-continued

| | |
|---|---|
| rlblmap_data | An unsigned short array containing the current section of input region label map data (if any). (Will be overwritten by the output region label map data.) |
| spatial_init | A float array containing the current section of input spatial feature data (local image variance or standard deviation - if any) |
| ncols | An int variable containing the number of columns in the current section of input image data |
| nrows | An int variable containing the number of rows in the current section of input image data |
| level | An int variable containing the value of the current level of recursion |

The global variables mask_flag, rlblmap_in_flag, nbands, sub_ncols, sub_nrows, max_nregions, scale, offset, maxmdir, simcrit, extmean, spclust, spatial_wght, spatial_type, rnb_levels and minregions are also used as inputs by lrhseg( ). Certain variables and arrays are output by lrhseg( ). They are as follows:

| | |
|---|---|
| nregions | An int variable containing the number of regions in the segmentation of the section of data processed. |
| rlblmap_data | An unsigned short array containing the output region label map for the current section of data. This region label map specifies the spatial distribution of the regions. |
| npix_data | An unsigned int array containing the current region number of pixels list stored as a vector. The $j^{th}$ element of the vector is the number of pixels in region $j + 1$. |
| sum_data | A double array containing the current sum of the normalized input data values over all pixels in each region. Element $j + nregions*b$ is the sum value for region $j + 1$ and band b (first band is band number 0). |
| sumsq_data | A double array containing the current sum of the square of the normalized input data values over all pixels in each region. (Actually contains values only if spatial_wght > 0.0.) Element $j + nregions*b$ is the sum square value for region $j + 1$ and band b (first band is band number 0). |
| spatial_data | A double array containing the current region spatial feature value list stored as a vector. (Actually contains values only if spatial_wght > 0.0.) The $j^{th}$ element of the vector is the spatial feature value for region $j + 1$. |
| nghbr_mask | An unsigned char array of numbers designating, for the current section of data, whether or not a pair of regions are spatially adjacent (i.e., neighbors). The value of the mask at array element $j + max\_nregions*k$ is TRUE if and only if regions $j + 1$ and $k + 1$ are spatially adjacent. |

Other data arrays are passed into lrhseg( ) for use as work space. These are input_sub, mask_sub, rlblmap_sub, spatial_init_sub, rlabel_data, region_list, relabel_list, nghbr_sub, nghbr_tmp, rlblmap_4cols, rlblmap_4rows, sort_store and nbsort_store.

The purpose of the lrhseg( ) function is to divide up the input data into four equal quadrants and to call the function recur_hseg( ) for each quadrant. The results from recur_hseg( ) are assembled together by lrhseg( ) and returned to the calling function. The internal operations of the function lrhseg( ) are described in a previous section.

The arrays rlblmap_4cols and rlblmap_4rows are now loaded with values from rlblmap_data. The array rlblmap_4cols contains the first, middle two and last columns from rlblmap_data, and the array rlblmap_4rows contains the first, middle two and last rows from rlblmap_data. The function update_nghbr_mask( ) is now called with the following input variables and data:

| | |
|---|---|
| ncols | An int variable containing the number of columns in the current section of input image data |
| nrows | An int variable containing the number of rows in the current section of input image data |
| nregions | An int variable containing the current value of the number of regions is the current section of segmented data |
| rlblmap_4cols | An unsigned short array containing the first, middle two and last columns of the current region label map data. |
| rlblmap_4rows | An unsigned short array containing the first, middle two and last rows of the current region label map data. |
| nghbr_mask | An unsigned char array of numbers designating, for the current section of data, whether or not a pair of regions are spatially adjacent (i.e., neighbors). The value of the mask at array element $j + max\_nregions*k$ is TRUE if and only if regions $j + 1$ and $k + 1$ are spatially adjacent. |

The function update_nghbr_mask( ) modifies the input nghbr_mask array so that it includes the neighbor relationship across the middle two columns and rows of the current region label map. The nghbr_mask array had been previously lacking this information. See a previous section for a functional description of update nghbr_mask( ).

The function region_list_init( ) is now called with the following input variable:

| | |
|---|---|
| nregions | An int variable containing the number of regions in the current section of segmented data |

The following data array is output by region_list_init( ):

| | |
|---|---|
| region_list | A reg_list (R_LIST) structure array pointing to a sequence of reg_struct (REGION) structure elements containing label and comparative information about each region. |

See a previous section for a functional description of the region_list_init( ) function. The purpose of the region_list_init( ) function is to initialize the region_list structure.

After the call to either region_data_init( ) or lrhseg( ), update_nghbr_mask( ) and region_list_list( ) are completed, the following parameters are set: init_flg=TRUE, onregions=nregions and cvnbregs=minregions (note that minregions is a user set parameter). If nregions<=minregions, the calls below to the functions lhseg( ) and read_region_list( ) are skipped. Otherwise, the function recur_hseg( ) calls the function lhseg( ) with the following input variable and array data:

| | |
|---|---|
| init_flag | An int variable which indicates whether or not the region_list has just been initialized (in this case init_flag = TRUE). |
| onregions | An int variable containing the number of regions existing when lhseg( ) is initially called. |
| cvnbregs | An int variable indicating the number of regions at which that this call to lhseg( ) will converge (exit). |
| npix_data | An unsigned int array containing the region number of pixels list stored as a vector. The $j^{th}$ element of the vector is the number of pixels in region $j + 1$. |
| sum_data | A double array containing the sum of the normalized input data values over all pixels in each region. |

-continued

| | |
|---|---|
| | Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables nbands, max_regions, simcrit, extmean, spclust, spatial_wght, and spatial_type are also used as inputs to lhseg( ). The following variables and arrays are modified and output by lhseg( ):

| | |
|---|---|
| nregions | An int variable containing the initial number of regions in the section of data processed. |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The arrays sort_store, and nbsort_store are also passed to the lhseg( ) function to use as work space. See a previous section for a functional description of the lhseg( ) function. The purpose of the lhseg( ) function is to perform multiple iterations of region growing intermixed with spectral clustering (if requested) until the number of regions becomes less than or equal to cvnbregs (in this case, minregions).

After the lhseg function exits, the function read_region_list( ) is called with the following input variable and array data:

| | |
|---|---|
| nregions | An int variable containing the number of regions in the section of data processed. |
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |

The global variables nbands, max_nregions and spatial_wght are also used as input by read_region_list( ). The following variables and arrays are modified and/or output by read_region_list( ):

| | |
|---|---|
| npix_data | An unsigned int array containing the region number of pixels list stored as a vector. The $j^{th}$ element of the vector is the number of pixels in region j + 1. |
| sum_data | A double array containing the sum of the normalized input data values over all pixels in each region. Element j + nregions*b is the sum value for region j + 1 and band b (first band is band number 0). |
| sumsq_data | A double array containing the sum of the square of the normalized input data values over all pixels in each region. (Actually contains values only if spatial_wght > 0.0.) Element j + nregions*b is the sum square value for region j + 1 and band b (first band is band number 0). |
| spatial_data | A double array containing the region spatial feature value list stored as a vector. (Actually contains values only if spatial_wght > 0.0.) The $j^{th}$ element of the vector is the spatial feature value for region j + 1. |
| nghbr_mask | An unsigned char array of numbers designating whether or not a pair of regions are spatially adjacent (i.e., neighbors). The value of the mask at array element j + max_nregions*k is TRUE if and only if regions j + 1 and k + 1 are spatially adjacent. |
| region_list | A reg_list (R_LIST) structure array pointing to a sequence of reg_struct (REGION) structure elements containing label and comparative information about each region. |
| relabel_list | An unsigned short array consisting of pairs of region labelings representing a renumbering of the region map labeling. |

The array nghbr_tmp is also passed to the read_region_list( ) function for use as work space. The read_region_list( ) function finds a renumbering (relabel_list) of the current region map labeling into the smallest possible range of labels starting at label "1," and adjusts the various data arrays and structures accordingly (npix_data, sum_data, nghbr_mask, region_list, and, if necessary, sumsq_data and spatial_data).

After the read_region_list( ) function exits, the variable nelements is found as the number of non-zero elements in the relabel_list array output by read_region_list( ), and the function update_rlblmap( ) is called with the following input variable and array data:

| | |
|---|---|
| ncols | An int variable containing the number of columns in the input image data |
| nrows | An int variable containing the number of rows in the input image data |
| nelements | An int variable containing the number of non-zero elements in the relabel_list array |
| relabel_list | An unsigned short array consisting of pairs of region labelings representing a renumbering of the region map labeling. |
| rlblmap_data | An unsigned short array containing the region label map data as it existed prior to the call to lhseg( ). |

The following data array is modified by update_rlblmap( ):

| | |
|---|---|
| rlblmap_data | An unsigned short array containing the region label map data renumbered according to relabel_list. |

The update_rlblmap( ) function renumbers the rlblmap_data array according to the input relabel_list array. This updates the rlblmap_data to reflect the merges performed by the call to lhseg( ) and the compacting of the region labeling representation performed by the function read_region_list( ).

At this point the function recur_hseg( ) exits returning the number of regions, nregions, to the calling function.

What is claimed is:

1. A method of implementing a recursive hierarchical segmentation algorithm on a parallel computing platform, comprising:
    setting a bottom level of recursion that defines where a recursive division of an image into sections stops dividing;
    setting an intermediate level of recursion where the recursive division changes from a parallel implementation into a serial implementation; and
    implementing the segmentation algorithm according to the set bottom level and the set intermediate level.

2. A method as recited in claim 1, further comprising setting a convergence check level of recursion, wherein after the recursive division is complete, a convergence check is performed which communicates data between processes running at the convergence check level and a top level.

3. A method as recited in claim 2, wherein when the convergence check results in a favorable result, the convergence check level processes send their region label map data to a master program.

4. A method of implementing a recursive hierarchical segmentation algorithm on a parallel computer, comprising:
    dividing an image from a first level of recursion to a bottom level of recursion, by:
        when a current level of recursion is less than a preset intermediate level, recursively dividing an image into sections and spawning a new parallel process for each of the divided sections;
        when a bottom level of recursion is greater than the current level of recursion which is greater than or equal to the preset intermediate level, recursively dividing the image into sections serially; and
    implementing the segmentation algorithm using the divided sections and each section's respective process.

5. A method as recited in claim 4, further comprising performing a convergence check when the current level of recursion equals the first level, and communicating between a preset convergence check level of recursion and the first level in performing the convergence check.

6. A method as recited in claim 5, wherein the convergence check farther comprises communicating dissimilarity criterion values (critvals) from each process at the convergence check level of recursion to a process at the first level of recursion.

7. A method as recited in claim 6, wherein the convergence check further comprises using the process at the first level of recursion, receiving the communicated critvals, summing the received critvals, and calculating a ratio of the summed critvals and the previously summed critvals.

8. A method as recited in claim 7, wherein if the calculated ratio is higher than a preset threshold then the image data from the convergence check level processes are saved by a master program.

9. A method of implementing a recursive hierarchical segmentation algorithm on a parallel computer, comprising:
    recursively dividing an image into sections from a top level of recursion to an intermediate level of recursion using parallel processes;
    recursively dividing the image into sections from the intermediate level of recursion to a bottom level of recursion using serial processing; and
    implementing the segmentation algorithm from the bottom level of recursion to the top level of recursion for each divided section using the section's respective process.

10. A method as recited in claim 9, further comprising: performing a convergence check when a current level of recursion reaches the first level, and communicating between a preset convergence check level of recursion and the first level in performing the convergence check.

11. A method as recited in claim 10, further comprising:
    sending, by processes running at the convergence check level, region label map data to a master program if the convergence check results in a favorable result.

12. A computer readable storage medium, storing a method of implementing a recursive hierarchical segmentation algorithm on a parallel computing platform, the computer readable storage medium instructing a computer to perform:
    setting a bottom level of recursion that defines where a recursive division of an image into sections stops dividing;
    setting an intermediate level of recursion where the recursive division changes from a parallel implementation into a serial implementation; and
    implementing the segmentation algorithm according to the set bottom level and the set intermediate level.

13. A computer readable storage medium as recited in claim 12, further comprising setting a convergence check level of recursion, wherein after the recursive division is complete, a convergence check is performed which communicates data between processes running at the convergence check level and a top level.

14. A computer readable storage medium as recited in claim 13, wherein when the convergence check results in a favorable result, the convergence check level processes send their region label map data to a master program.

15. A computer readable storage medium, storing a method of implementing a recursive hierarchical segmentation algorithm on a parallel computing platform, the computer readable storage medium instructing a computer to perform:

dividing an image from a first level of recursion to a bottom level of recursion, by:

when a current level of recursion is less than a preset intermediate level, recursively dividing an image into sections and spawning a new parallel process for each of the divided sections;

when a bottom level of recursion is greater than the current level of recursion which is greater than or equal to the preset intermediate level, recursively dividing the image into sections serially; and implementing the segmentation algorithm using the divided sections and each section's respective process.

16. A computer readable storage medium as recited in claim 15, further comprising performing a convergence check when the current level of recursion equals the first level, and communicating between a preset convergence check level of recursion and the first level in performing the convergence check.

17. A computer readable storage medium as recited in claim 16, wherein the convergence check further comprises communicating dissimilarity criterion values (critvals) from each process at the convergence check level of recursion to a process at the first level of recursion.

18. A computer readable storage medium as recited in claim 17, wherein the convergence check further comprises using the process at the first level of recursion, receiving the communicated critvals, summing the received critvals, and calculating a ratio of the summed critvals and the previously summed critvals.

19. A computer readable storage medium as recited in claim 18, wherein if the calculated ratio is higher than a preset threshold then the image data from the convergence check level processes are saved by a master program.

20. A computer readable storage medium, storing a method of implementing a recursive hierarchical segmentation algorithm on a parallel computing platform, the computer readable storage medium instructing a computer to perform:

recursively dividing an image into sections from a top level of recursion to an intermediate level of recursion using parallel processes;

recursively dividing the image into sections from the intermediate level of recursion to a bottom level of recursion using serial processing; and implementing the segmentation algorithm from the bottom level of recursion to the top level of recursion for each divided section using the section's respective process.

21. A computer readable storage medium as recited in claim 20, further comprising:

performing a convergence check when a current level of recursion reaches the first level, and communicating between a preset convergence check level of recursion and the first level in performing the convergence check.

22. A computer readable storage medium as recited in claim 21, further comprising:

sending, by processes running at the convergence check level, region label map data to a master program if the convergence check results in a favorable result.

23. An apparatus comprising:

an input unit, inputting a bottom level of recursion that defines where a recursive division of an image into sections stops dividing, and an intermediate level of recursion where the recursive division changes from a parallel implementation into a serial implementation;

a processing unit, implementing a recursive hierarchical segmentation algorithm using the levels input from the input unit.

24. An apparatus as recited in claim 23, wherein the input unit further comprises inputting a convergence check level of recursion, wherein after the recursive division is complete, a convergence check is performed which communicates data between processes running at the convergence check level and a top level.

* * * * *